(12) United States Patent
Frank

(10) Patent No.: US 12,448,461 B2
(45) Date of Patent: Oct. 21, 2025

(54) ABCB5 LIGANDS AND SUBSTRATES

(71) Applicant: Children's Medical Center Corporation, Boston, MA (US)

(72) Inventor: Markus H. Frank, Cambridge, MA (US)

(73) Assignee: Children's Medical Center Corporation, Boston, MA (US)

( * ) Notice: Subject to any disclaimer, the term of this patent is extended or adjusted under 35 U.S.C. 154(b) by 1326 days.

(21) Appl. No.: 17/050,424

(22) PCT Filed: Apr. 25, 2019

(86) PCT No.: PCT/US2019/029235
§ 371 (c)(1),
(2) Date: Oct. 23, 2020

(87) PCT Pub. No.: WO2019/210109
PCT Pub. Date: Oct. 31, 2019

(65) Prior Publication Data
US 2021/0188999 A1 Jun. 24, 2021

Related U.S. Application Data

(60) Provisional application No. 62/662,670, filed on Apr. 25, 2018.

(51) Int. Cl.
| | | |
|---|---|---|
| C07F 9/117 | (2006.01) | |
| A61K 31/6615 | (2006.01) | |
| C07K 14/47 | (2006.01) | |
| C07K 16/30 | (2006.01) | |
| G01N 33/50 | (2006.01) | |

(52) U.S. Cl.
CPC ...... *C07K 16/3053* (2013.01); *A61K 31/6615* (2013.01); *C07F 9/117* (2013.01); *C07K 14/4702* (2013.01); *G01N 33/5041* (2013.01); *C07K 2317/21* (2013.01); *C07K 2317/76* (2013.01)

(58) Field of Classification Search
CPC .................................................... C07F 9/117
See application file for complete search history.

(56) References Cited

U.S. PATENT DOCUMENTS

| | | | |
|---|---|---|---|
| 6,152,142 A | 11/2000 | Tseng | |
| 6,355,239 B1 | 3/2002 | Bruder et al. | |
| 6,387,367 B1 | 5/2002 | Davis-Sproul et al. | |
| 6,464,983 B1 | 10/2002 | Grotendorst | |
| 6,541,024 B1 | 4/2003 | Kadiyala et al. | |
| 6,673,606 B1 | 1/2004 | Tennekoon et al. | |
| 6,797,269 B2 | 9/2004 | Mosca et al. | |
| 6,846,883 B2 | 1/2005 | Frank et al. | |
| 6,875,430 B2 | 4/2005 | McIntosh et al. | |
| 7,029,666 B2 | 4/2006 | Bruder et al. | |
| 7,465,554 B2 | 12/2008 | Frank et al. | |
| 7,928,202 B2 | 4/2011 | Frank et al. | |
| 8,076,091 B2 | 12/2011 | Frank et al. | |
| 8,288,378 B2 | 10/2012 | Kim et al. | |
| 8,425,876 B2 | 4/2013 | Frank et al. | |
| 8,455,245 B2 | 6/2013 | Frank et al. | |
| 8,507,273 B2 | 8/2013 | Frank et al. | |
| 8,697,072 B2 | 4/2014 | Frank et al. | |
| 9,266,946 B2 | 2/2016 | Frank et al. | |
| 9,561,264 B2 | 2/2017 | Frank et al. | |
| 9,801,912 B2 | 10/2017 | Frank et al. | |
| 9,855,342 B2 | 1/2018 | Frank et al. | |
| 9,879,226 B2 | 1/2018 | Suh et al. | |
| 10,017,738 B2 | 7/2018 | Frank et al. | |
| 10,316,085 B2 | 6/2019 | Frank et al. | |
| 11,129,854 B2 | 9/2021 | Frank et al. | |
| 11,446,331 B2 | 9/2022 | Orgill et al. | |
| 11,542,328 B2 | 1/2023 | Frank et al. | |
| 11,624,054 B2 | 4/2023 | Frank | |
| 2004/0175366 A1 | 9/2004 | Badylak | |
| 2007/0116691 A1 | 5/2007 | Cambier et al. | |
| 2008/0047026 A1 | 2/2008 | Fuchs et al. | |
| 2013/0017175 A1 | 1/2013 | Bartholomew et al. | |
| 2014/0302031 A1 | 10/2014 | Frank et al. | |
| 2017/0312317 A1 | 11/2017 | Stewart et al. | |
| 2019/0085288 A1 | 3/2019 | Moore et al. | |
| 2021/0095254 A1 | 4/2021 | Frank et al. | |
| 2022/0118024 A1 | 4/2022 | Frank et al. | |
| 2022/0184136 A1 | 6/2022 | Frank et al. | |

(Continued)

FOREIGN PATENT DOCUMENTS

| | | |
|---|---|---|
| CN | 108699542 A | 10/2018 |
| EP | 0 174 810 A2 | 3/1986 |

(Continued)

OTHER PUBLICATIONS

Chen et al., "Synthesis of Photoactivatable 1,2-O-Diacyl-sn-glycerol Derivatives of 1-L-Phosphatidyl-D-myo-inositol 4,5-Bisphosphate (PtdInsP2) and 3,4,5-Trisphosphate (PtdInsP3)" J Org Chem vol. 61 pp. 6305-6312 (Year: 1996).*
U.S. Appl. No. 18/120,301, filed Mar. 10, 2023, Frank.
U.S. Appl. No. 18/063,367, filed Dec. 8, 2022, Frank et al.
U.S. Appl. No. 17/486,855, filed Sep. 27, 2021, Frank et al.
U.S. Appl. No. 17/947,360, filed Sep. 19, 2022, Frank et al.
U.S. Appl. No. 16/835,144, filed Mar. 30, 2020, Frank et al.
U.S. Appl. No. 17/598,848, filed Sep. 27, 2021, Frank et al.
U.S. Appl. No. 17/922,286, filed Oct. 28, 2022, Frank et al.
U.S. Appl. No. 17/915,364, filed Sep. 28, 2022, Kluth et al.
U.S. Appl. No. 17/918,479, filed Oct. 12, 2022, Frank et al.

(Continued)

*Primary Examiner* — Eric Olson
(74) *Attorney, Agent, or Firm* — Wolf, Greenfield & Sacks, P.C.

(57) ABSTRACT

The present invention is directed to methods and compositions for modulating ABCB5+ stem cell activity. The invention also relates to assays and reagents for manipulating and characterizing compounds that modulate ABCB5+ cell signaling.

3 Claims, 14 Drawing Sheets

Specification includes a Sequence Listing.

(56) References Cited

U.S. PATENT DOCUMENTS

| | | | |
|---|---|---|---|
| 2023/0136997 | A1 | 5/2023 | Frank et al. |
| 2023/0148432 | A1 | 5/2023 | Kluth et al. |
| 2023/0149469 | A1 | 5/2023 | Frank et al. |
| 2023/0203153 | A1 | 6/2023 | Frank et al. |
| 2023/0313136 | A1 | 10/2023 | Frank |
| 2023/0340116 | A1 | 10/2023 | Frank et al. |

FOREIGN PATENT DOCUMENTS

| | | | |
|---|---|---|---|
| JP | 2007-524411 A | 8/2007 |
| KR | 10-2007-0001108 A | 1/2007 |
| WO | WO 01/23540 A2 | 4/2001 |
| WO | WO 01/23540 A3 | 4/2001 |
| WO | WO 2005/079145 A2 | 9/2005 |
| WO | WO 2006/103685 A2 | 10/2006 |
| WO | WO 2007/112097 A2 | 10/2007 |
| WO | WO 2007/138334 A2 | 12/2007 |
| WO | WO 2008/013492 A1 | 1/2008 |
| WO | WO 2018/185584 A1 | 10/2018 |
| WO | WO 2021/076043 A1 | 4/2021 |

OTHER PUBLICATIONS

[No Author Listed], CAS 204858-53-7. Sigma-Aldrich. 2024. 1 page. URL:https://www.sigmaaldrich.com/US/en/search/204858-53-7?focus=products&page=1&perpage=30&sort=relevance&term=204858-53-7&type=cas_number [last accessed: Apr. 15, 2024].

[No Author Listed], PtdIns-(1,2-dioctanoyl) (sodium salt). DOPI, Phosphatidylinositol C-8, CAS No. 899827-36-2. Cayman Chemical. 2024. 3 pages. URL:https://www.caymanchem.com/product/10008099 [last accessed: Apr. 15, 2024].

Aggarwal et al., Human mesenchymal stem cells modulate allogeneic immune cell responses. Blood. Feb. 15, 2005;105(4):1815-22. doi: 10.1182/blood-2004-04-1559.

Baer et al., Phase 3 study of the multidrug resistance modulator PSC-833 in previously untreated patients 60 years of age and older with acute myeloid leukemia: Cancer and Leukemia Group B Study 9720. Blood. Aug. 15, 2002;100(4):1224-32.

Daniele, C., "Therapeutic potential of human ABCB5+ cells and different conditioned media in a cisplatin-induced nephrotoxicity model" (Doctoral dissertation), Oct. 28, 2019. Retrieved from: http://www.ub.uni-heidelberg.de/archiv/27307.

Diaz-Borjon et al., Multidrug resistance-1 (MDR-1) in rheumatic autoimmune disorders. Part II: Increased P-glycoprotein activity in lymphocytes from systemic lupus erythematosus patients might affect steroid requirements for disease control. Joint Bone Spine. Jan. 2000;67(1):40-8. Abstract only.

Eveleth, Cell-based therapies for ocular disease. J Ocul Pharmacol Ther. Dec. 2013;29(10):844-54. doi: 10.1089/jop.2013.0028. Epub Sep. 19, 2013.

Formigli et al., Dermal matrix scaffold engineered with adult mesenchymal stem cells and platelet-rich plasma as a potential tool for tissue repair and regeneration. J Tissue Eng Regen Med. Feb. 2012;6(2):125-34.

Frank et al., ABCB5 P-glycoprotein is a molecular marker of the Hoechst 33342 side population phenotype among human fetal skeletal muscle cells. FASEB Journal. 2004;18(4-5):A183. Abstract 144.9.

Frank et al., Immunomodulatory functions of mesenchymal stem cells. Lancet. May 1, 2004;363(9419):1411-2.

Frank et al., Regulation of progenitor cell fusion by ABCB5 P-glycoprotein, a novel human ATP-binding cassette transporter. J Biol Chem. Nov. 21, 2003;278(47):47156-65. Epub Sep. 7, 2003.

Frank et al., Specific MDR1 P-glycoprotein blockade inhibits human alloimmune T cell activation in vitro. J Immunol. Feb. 15, 2001;166(4):2451-9.

Frassoni et al., Cord blood transplantation provides better reconstitution of hematopoietic reservoir compared with bone marrow transplantation. Blood. Aug. 1, 2003;102(3):1138-41. Epub Apr. 10, 2003.

Gulshan et al., PI(4,5)P2 Is Translocated by ABCA1 to the Cell Surface Where It Mediates Apolipoprotein A1 Binding and Nascent HDL Assembly. Circ Res. Sep. 16, 2016;119(7):827-38.

Jiang et al., Suppression of Neutrophil-Mediated Tissue Damage—A Novel Skill of Mesenchymal Stem Cells. Stem Cells. Sep. 2016;34(9):2393-406.

Juncosa-Melvin et al., The effect of autologous mesenchymal stem cells on the biomechanics and histology of gel-collagen sponge constructs used for rabbit patellar tendon repair. Tissue Eng. Feb. 2006;12(2):369-79.

Kerstan et al., Ex vivo-expanded highly pure ABCB5+ mesenchymal stromal cells as Good Manufacturing Practice-compliant autologous advanced therapy medicinal product for clinical use: process validation and first in-human data. Cytotherapy. Feb. 2021;23(2):165-175.

Kim et al., Identification of human ABCB5(+) dermal progenitor cells with multipotent differentiation plasticity. Apr. 1, 2010;130(Suppl 1):S107. Abstract.

Kleffel et al., ABCB5 inhibition sensitizes Merkel cell carcinoma cells to chemotherapy-induced apoptosis. J Invest Dermatol. 2014;134:S18. Meeting abstract.

Kleffel et al., ABCB5-Targeted Chemoresistance Reversal Inhibits Merkel Cell Carcinoma Growth. J Invest Dermatol. Apr. 2016;136(4):838-846.

Kleffel et al., Melanoma cell-intrinsic PD-1 receptor functions promote tumor growth. Cell. 2015(162)1242-1256.

Kobayahsi et al., In vitro response of the bone marrow-derived mesenchymal stem cells seeded in a type-I collagen-glycosaminoglycan scaffold for skin wound repair under the mechanical loading condition. Mol Cell Biomech. Dec. 2009;6(4):217-27.

Ksander et al., ABCB5 is a limbal stem cell gene required for corneal development and repair. Nature. Jul. 17, 2014;511(7509):353-7. doi: 10.1038/nature13426. Epub Jul. 2, 2014.

Liu et al., Tissue-engineered skin containing mesenchymal stem cells improves burn wounds. Artif Organs. Dec. 2008;32(12):925-31.

Ma et al., Reconstruction of chemically burned rat corneal surface by bone marrow-derived human mesenchymal stem cells. Stem Cells. Feb. 2006;24(2):315-21. Epub Aug. 18, 2005.

Meier et al., Progressive decrease in number and change in niche preference of the ABCB5(+) mesenchymal stem cell subset in the skin during aging. Sep. 1, 2010;130(Suppl. 2):S88. Abstract.

Moitra et al., Molecular evolutionary analysis of ABCB5: the ancestral gene is a full transporter with potentially deleterious single nucleotide polymorphisms. PLoS One. Jan. 27, 2011;6(1):e16318.

Pendse et al., P-Glycoprotein Functions as a Differentiation Switch in Antigen Presenting Cell Maturation. Am J Transplant Dec. 2008; 6(12):2884-93.

Picchianti-Diamanti et al., P-glycoprotein and drug resistance in systemic autoimmune diseases. Int J Mol Sci. Mar. 20, 2014;15(3):4965-76. doi: 10.3390/ijms15034965.

Rojas et al., Bone marrow-derived mesenchymal stem cells in repair of the injured lung. Am J Respir Cell Mol Biol. Aug. 2005;33(2):145-52.

Sayegh et al., The role of T-cell costimulatory activation pathways in transplant rejection. N Engl J Med. Jun. 18, 1998;338(25):1813-21.

Schatton et al., In vivo immunomodulatory function of abcb5+ dermal mesenchymal stem cells. Transplantation. Jul. 15, 2006; 82(1): 185-86. Abstract #351.

Schoenlein et al., Double minute chromosomes carrying the human multidrug resistance 1 and 2 genes are generated from the dimerization of submicroscopic circular DNAs in colchicine-selected KB carcinoma cells. Mol Biol Cell. May 1992;3(5):507-20.

Sharom, The P-glycoprotein efflux pump: how does it transport drugs? J Membr Biol. Dec. 1, 1997;160(3):161-75.

Shi et al., Transplantation of dermal multipotent cells promotes the hematopoietic recovery in sublethally irradiated rats. J Radiat Res (Tokyo). Mar. 2004;45(1):19-24.

Tappenbeck et al., In vivo safety profile and biodistribution of GMP-manufactured human skin-derived ABCB5-positive mesenchymal stromal cells for use in clinical trials. Cytotherapy. 2019;21(5):546-560.

(56) References Cited

OTHER PUBLICATIONS

Tietze et al., Assessment of the hepatocytic differentiation ability of human skin-derived ABCB5+ stem cells. Exp Cell Res. 2018;369(2):335-347.

Traynor-Kaplan et al., Fatty-acyl chain profiles of cellular phosphoinositides. Biochim Biophys Acta Mol Cell Biol Lipids. May 2017;1862(5):513-522.

Webber et al., Rapid generation of col. 7a1−/− mouse model of recessive dystrophic epidermolysis bullosa and partial rescue via immunosuppressive dermal mesenchymal stem cells. Lab Invest. 2017;97(10):1218-1224.

Weissman, Translating stem and progenitor cell biology to the clinic: barriers and opportunities. Science. Feb. 25, 2000;287(5457):1442-6.

Woodward et al., Corneal donor tissue preparation for endothelial keratoplasty. J Vis Exp. Jun. 12, 2012;(64):e3847.

Young et al., Adult-derived stem cells and their potential for use in tissue repair and molecular medicine. J Cell Mol Med. Jul.-Sep. 2005;9(3):753-69.

Young et al., Human pluripotent and progenitor cells display cell surface cluster differentiation markers CD10, CD13, CD56, and MHC class-I. Proc Soc Exp Biol Med. May 1999;221(1):63-71.

Zhang et al., Characterization of tet-On Abcb5 (P2A-rtTA) Driver Mice by CRISPR/Cas9-mediated Knock-in Strategy. ARVO Journals. Investigative ophthalmology & visual science. 2017:58(8);2606.

Wilson et al., ABCB5 identifies a therapy-refractory tumor cell population in colorectal cancer patients. Cancer Res. Aug. 1, 2011;71(15):5307-16. Epub Jun. 7, 2011.

\* cited by examiner

SEQUENCE LISTING

<160> NUMBER OF SEQ ID NOS: 4

<210> SEQ ID NO 1
<211> LENGTH: 812
<212> TYPE: PRT
<213> ORGANISM: Artificial Sequence
<220> FEATURE:
<223> OTHER INFORMATION: Synthetic Polypeptide

<400> SEQUENCE: 1

```
Met Val Asp Glu Asn Asp Ile Arg Ala Leu Asn Val Arg His Tyr Arg
1               5                   10                  15

Asp His Ile Gly Val Val Ser Gln Glu Pro Val Leu Phe Gly Thr Thr
                20                  25                  30

Ile Ser Asn Asn Ile Lys Tyr Gly Arg Asp Asp Val Thr Asp Glu Glu
            35                  40                  45

Met Glu Arg Ala Ala Arg Glu Ala Asn Ala Tyr Asp Phe Ile Met Glu
        50                  55                  60

Phe Pro Asn Lys Phe Asn Thr Leu Val Gly Glu Lys Gly Ala Gln Met
65                  70                  75                  80

Ser Gly Gly Gln Lys Gln Arg Ile Ala Ile Ala Arg Ala Leu Val Arg
                85                  90                  95

Asn Pro Lys Ile Leu Ile Leu Asp Glu Ala Thr Ser Ala Leu Asp Ser
            100                 105                 110

Glu Ser Lys Ser Ala Val Gln Ala Ala Leu Glu Lys Ala Ser Lys Gly
        115                 120                 125

Arg Thr Thr Ile Val Val Ala His Arg Leu Ser Thr Ile Arg Ser Ala
    130                 135                 140

Asp Leu Ile Val Thr Leu Lys Asp Gly Met Leu Ala Glu Lys Gly Ala
145                 150                 155                 160

His Ala Glu Leu Met Ala Lys Arg Gly Leu Tyr Tyr Ser Leu Val Met
                165                 170                 175

Ser Gln Asp Ile Lys Lys Ala Asp Glu Gln Met Glu Ser Met Thr Tyr
            180                 185                 190

Ser Thr Glu Arg Lys Thr Asn Ser Leu Pro Leu His Ser Val Lys Ser
        195                 200                 205

Ile Lys Ser Asp Phe Ile Asp Lys Ala Glu Glu Ser Thr Gln Ser Lys
    210                 215                 220
```

-continued

Glu Ile Ser Leu Pro Glu Val Ser Leu Leu Lys Ile Leu Lys Leu Asn
225                 230                 235                 240

Lys Pro Glu Trp Pro Phe Val Val Leu Gly Thr Leu Ala Ser Val Leu
            245                 250                 255

Asn Gly Thr Val His Pro Val Phe Ser Ile Ile Phe Ala Lys Ile Ile
                260                 265                 270

Thr Met Phe Gly Asn Asn Asp Lys Thr Thr Leu Lys His Asp Ala Glu
        275                 280                 285

Ile Tyr Ser Met Ile Phe Val Ile Leu Gly Val Ile Cys Phe Val Ser
    290                 295                 300

Tyr Phe Met Gln Gly Leu Phe Tyr Gly Arg Ala Gly Glu Ile Leu Thr
305                 310                 315                 320

Met Arg Leu Arg His Leu Ala Phe Lys Ala Met Leu Tyr Gln Asp Ile
                325                 330                 335

Ala Trp Phe Asp Glu Lys Glu Asn Ser Thr Gly Gly Leu Thr Thr Ile
            340                 345                 350

Leu Ala Ile Asp Ile Ala Gln Ile Gln Gly Ala Thr Gly Ser Arg Ile
                355                 360                 365

Gly Val Leu Thr Gln Asn Ala Thr Asn Met Gly Leu Ser Val Ile Ile
370                 375                 380

Ser Phe Ile Tyr Gly Trp Glu Met Thr Phe Leu Ile Leu Ser Ile Ala
385                 390                 395                 400

Pro Val Leu Ala Val Thr Gly Met Ile Glu Thr Ala Ala Met Thr Gly
                405                 410                 415

Phe Ala Asn Lys Asp Lys Gln Glu Leu Lys His Ala Gly Lys Ile Ala
            420                 425                 430

Thr Glu Ala Leu Glu Asn Ile Arg Thr Ile Val Ser Leu Thr Arg Glu
        435                 440                 445

Lys Ala Phe Glu Gln Met Tyr Glu Glu Met Leu Gln Thr Gln His Arg
    450                 455                 460

Asn Thr Ser Lys Lys Ala Gln Ile Ile Gly Ser Cys Tyr Ala Phe Ser
465                 470                 475                 480

His Ala Phe Ile Tyr Phe Ala Tyr Ala Ala Gly Phe Arg Phe Gly Ala
                485                 490                 495

Tyr Leu Ile Gln Ala Gly Arg Met Thr Pro Glu Gly Met Phe Ile Val
            500                 505                 510

Phe Thr Ala Ile Ala Tyr Gly Ala Met Ala Ile Gly Glu Thr Leu Val
        515                 520                 525

Leu Ala Pro Glu Tyr Ser Lys Ala Lys Ser Gly Ala Ala His Leu Phe
    530                 535                 540

Ala Leu Leu Glu Lys Lys Pro Asn Ile Asp Ser Arg Ser Gln Glu Gly
545                 550                 555                 560

Lys Lys Pro Asp Thr Cys Glu Gly Asn Leu Glu Phe Arg Glu Val Ser
                565                 570                 575

Phe Phe Tyr Pro Cys Arg Pro Asp Val Phe Ile Leu Arg Gly Leu Ser
            580                 585                 590

Leu Ser Ile Glu Arg Gly Lys Thr Val Ala Phe Val Gly Ser Ser Gly
        595                 600                 605

Cys Gly Lys Ser Thr Ser Val Gln Leu Leu Gln Arg Leu Tyr Asp Pro
    610                 615                 620

Val Gln Gly Gln Val Leu Phe Asp Gly Val Asp Ala Lys Glu Leu Asn
625                 630                 635                 640

Val Gln Trp Leu Arg Ser Gln Ile Ala Ile Val Pro Gln Glu Pro Val
                645                 650                 655

Leu Phe Asn Cys Ser Ile Ala Glu Asn Ile Ala Tyr Gly Asp Asn Ser
            660                 665                 670

Arg Val Val Pro Leu Asp Glu Ile Lys Glu Ala Ala Asn Ala Ala Asn
        675                 680                 685

Ile His Ser Phe Ile Glu Gly Leu Pro Glu Lys Tyr Asn Thr Gln Val
    690                 695                 700

Gly Leu Lys Gly Ala Gln Leu Ser Gly Gly Gln Lys Gln Arg Leu Ala
705                 710                 715                 720

Ile Ala Arg Ala Leu Leu Gln Lys Pro Lys Ile Leu Leu Leu Asp Glu
                725                 730                 735

Ala Thr Ser Ala Leu Asp Asn Asp Ser Glu Lys Val Val Gln His Ala
            740                 745                 750

Leu Asp Lys Ala Arg Thr Gly Arg Thr Cys Leu Val Val Thr His Arg
        755                 760                 765

Leu Ser Ala Ile Gln Asn Ala Asp Leu Ile Val Val Leu His Asn Gly
    770                 775                 780

Lys Ile Lys Glu Gln Gly Thr His Gln Glu Leu Leu Arg Asn Arg Asp
785                 790                 795                 800

Ile Tyr Phe Lys Leu Val Asn Ala Gln Ser Val Gln
                805                 810

<210> SEQ ID NO 2
<211> LENGTH: 4375
<212> TYPE: DNA
<213> ORGANISM: Artificial Sequence
<220> FEATURE:
<223> OTHER INFORMATION: Synthetic Polynucleotide

<400> SEQUENCE: 2
attgcttctc ggccttttgg ctaagatcaa gtgtaatctg tgttctttt tatttggtca      60
tatcttccat tctttcttac ctaattcctc taatatctct ctgtgagcct aaaccaataa     120
ttatatatta cattctattg tctttcttat ataactgcag aaagataaat atcactttgt     180
ttgttcctgt aggttttctt tagtgtaatc catagcagtt attgcattgg agcagcagtc     240
cctcactttg aaaccttcgc aatagcccga ggagctgcct ttcatatttt ccaggttatt     300
gataagaaac ccagtataga taactttcc acagctggat ataaacctga atccatagaa      360
ggaactgtgg aatttaaaaa tgtttctttc aattatccat caagaccatc tatcaagatt     420
ctgaaaggtc tgaatctcag aattaagtct ggagagacac tcgccttggt cggtctcaat     480
ggcagtggga agagtacggt agtccagctt ctgcagaggt tatatgatcc ggatgatggc     540
tttatcatgg tggatgagaa tgacatcaga gctttaaatg tgcggcatta tcgagaccat     600
attggagtgg ttagtcaaga gcctgttttg ttcgggacca ccatcagtaa caatatcaag     660
tatgacgag atgatgtgac tgatgaagag atggagagag cagcaaggga agcaaatgcg      720
tatgatttta tcatggagtt tcctaataaa tttaatacat ggtaggggga aaaggagct     780
caaatgagtg gagggcagaa acagaggatc gcaattgctc gtgccttagt tcgaaacccc     840
aagattctga ttttagatga ggctacgtct gccctggatt cagaaagcaa gtcagctgtt     900
caagctgcac tggagaaggc gagcaaaggt cggactacaa tcgtggtagc acaccgactt     960
tctactattc gaagtgcaga tttgattgtg accctaaagg atggaatgct ggcggagaaa    1020
ggagcacatg ctgaactaat ggcaaaacga ggtctatatt attcacttgt gatgtcacag    1080

```
gatattaaaa aagctgatga acagatggag tcaatgacat attctactga agaaagacc    1140 aactcacttc ctctgcactc tgtgaagagc atcaagtcag acttcattga caaggctgag    1200
gaatccaccc aatctaaaga gataagtctt cctgaagtct ctctattaaa aattttaaag    1260
ttaaacaagc ctgaatggcc ttttgtggtt ctggggacat tggcttctgt tctaaatgga    1320
actgttcatc cagtattttc catcatcttt gcaaaaatta taaccatgtt tggaaataat    1380
gataaaacca cattaaagca tgatgcagaa atttattcca tgatattcgt cattttgggt    1440
gttatttgct ttgtcagtta tttcatgcag ggattatttt acggcagagc aggggaaatt    1500
ttaacgatga gattaagaca cttggccttc aaagccatgt tatatcagga tattgcctgg    1560
tttgatgaaa aggaaaacag cacaggaggc ttgacaacaa tattagccat agatatagca    1620
caaattcaag gagcaacagg ttccaggatt ggcgtcttaa cacaaaatgc aactaacatg    1680
ggactttcag ttatcatttc ctttatatat ggatgggaga tgacattcct gattctgagt    1740
attgctccag tacttgccgt gacaggaatg attgaaaccg cagcaatgac tggatttgcc    1800
aacaaagata agcaagaact taagcatgct ggaaagatag caactgaagc tttggagaat    1860
atacgtacta tagtgtcatt aacaagggaa aaagccttcg agcaaatgta tgaagagatg    1920
cttcagactc aacacagaaa tacctcgaag aaagcacaga ttattggaag ctgttatgca    1980
ttcagccatg cctttatata ttttgcctat gcggcagggt ttcgatttgg agcctattta    2040
attcaagctg gacgaatgac cccagagggc atgttcatag tttttactgc aattgcatat    2100
ggagctatgg ccatcggaga aacgctcgtt ttggctcctg aatattccaa agccaaatcg    2160
ggggctgcgc atctgtttgc cttgttggaa aagaaaccaa atatagacag ccgcagtcaa    2220
gaagggaaaa agccagacac atgtgaaggg aatttagagt ttcgagaagt ctctttcttc    2280
tatccatgtc gcccagatgt tttcatcctc cgtggcttat ccctcagtat tgagcgagga    2340
aagacagtag catttgtggg gagcagcggc tgtgggaaaa gcacttctgt tcaacttctg    2400
cagagacttt atgaccccgt gcaaggacaa gtgctgtttg atggtgtgga tgcaaaagaa    2460
ttgaatgtac agtggctccg ttcccaaata gcaatcgttc ctcaagagcc tgtgctcttc    2520
aactgcagca ttgctgagaa catcgcctat ggtgacaaca gccgtgtggt gccattagat    2580
gagatcaaag aagccgcaaa tgcagcaaat atccattctt ttattgaagg tctccctgag    2640
aaatacaaca cacaagttgg actgaaagga gcacagcttt ctggcggcca gaaacaaaga    2700
ctagctattg caagggctct tctccaaaaa cccaaaattt tattgttgga tgaggccact    2760
tcagccctcg ataatgacag tgagaaggtg gttcagcatg cccttgataa agccaggacg    2820
ggaaggacat gcctagtggt cactcacagg ctctctgcaa ttcagaacgc agatttgata    2880
gtggttctgc acaatggaaa gataaaggaa caaggaactc atcaagagct cctgagaaat    2940
cgagacatat attttaagtt agtgaatgca cagtcagtgc agtgatgctg ttgaggtagc    3000
acatattttg atgttcgtgt aatgcaaaga aggagtactt aataattact tggcaagctt    3060
tgatctcttt tattgcatat atcaatacct agaatcatgc tactcaagta catacatgtt    3120
ctattcacac accatctgac cttcagattt ttaaaggaa gcaaaaattt gcttatttca    3180
tgtaagtgaa ataatgctta tatccttcac tttataaaac tattctagca catttgcttg    3240
taaagcagtt ttctacaagg tgaatttatt tcccatcaac ttctgctata aaatcggaaa    3300
tatgtttcca gggggaatat tatccaatta accatgttga aggttttagc aaaggcagtg    3360
taagatagag tggggcctgt agcattgcag ggagagtgtc tttcacttgg aattttgttt    3420
tgcagcacat attacagtag ttttgctagt cccttttctc cagaccgtag ggatttctct    3480
```

```
caataagtat tcactatttc tctaaatttt attctatttt tttgttgagc agggaataga    3540
aaggattacg atgtaaaatt tctgggagga ttaggtagct atctcctact tcaccagtaa    3600
gtgaagtgcc tcacatgagc catcccaaag attcattatt ccaaaccttg ggtttggcag    3660
tataagtcac aggcctacct gtttatgaaa acttacttac ttaaaataag agctactttt    3720
gggccgggtg cggtggctca cgcctgtaat cccagaactt tgggaggccg aggagggcgg    3780
atcacttgag gtcaggagtt cgagaccagc ctggccaaca tggtgaaacc ccgtctctac    3840
taaaaacaca aaaattagcc aatcttggtg gcgggcacct ggaatcccag ctacttggga    3900
ggctgaggca ggagaatcat ttgaacctag gaggcagagg ttgcagtgag ccgagatctc    3960
accactgcac tccagcctgc gcaacagagc gagactccat ctcaaaaaat aataaataag    4020
agctaatttt attgtgggtg aaaattttta aacgtctttc tctataataa aataatttcc    4080
ttaaatttta tatatacttt atcatatata atgtgtgaat gattttaaag ttctgtgtaa    4140
ataacaatat tggtaaaatg agttacattt tcaacttact taaatatgta atgtcacctg    4200
gtgattttat ctttattctt cagtgtattt tcttccattt acacatttag ctagcctccc    4260
taaagtgtac tctaccaata attgaaatct tgttaaacaa aattaaaacc atttatatat    4320
tatgctgctt tctttaaaat gcaaaataaa aataagattg gggacttgag aatca         4375
```

<210> SEQ ID NO 3
<211> LENGTH: 812
<212> TYPE: PRT
<213> ORGANISM: Artificial Sequence
<220> FEATURE:
<223> OTHER INFORMATION: Synthetic Polypeptide

<400> SEQUENCE: 3

```
Met Val Asp Glu Asn Asp Ile Arg Ala Leu Asn Val Arg His Tyr Arg
1               5                   10                  15

Asp His Ile Gly Val Val Ser Gln Glu Pro Val Leu Phe Gly Thr Thr
            20                  25                  30

Ile Ser Asn Asn Ile Lys Tyr Gly Arg Asp Asp Val Thr Asp Glu Glu
        35                  40                  45

Met Glu Arg Ala Ala Arg Glu Ala Asn Ala Tyr Asp Phe Ile Met Glu
    50                  55                  60

Phe Pro Asn Lys Phe Asn Thr Leu Val Gly Glu Lys Gly Ala Gln Met
65                  70                  75                  80

Ser Gly Gly Gln Lys Gln Arg Ile Ala Ile Ala Arg Ala Leu Val Arg
                85                  90                  95

Asn Pro Lys Ile Leu Ile Leu Asp Glu Ala Thr Ser Ala Leu Asp Ser
            100                 105                 110

Glu Ser Lys Ser Ala Val Gln Ala Ala Leu Glu Lys Ala Ser Lys Gly
        115                 120                 125

Arg Thr Thr Ile Val Val Ala His Arg Leu Ser Thr Ile Arg Ser Ala
    130                 135                 140

Asp Leu Ile Val Thr Leu Lys Asp Gly Met Leu Ala Glu Lys Gly Ala
145                 150                 155                 160

His Ala Glu Leu Met Ala Lys Arg Gly Leu Tyr Tyr Ser Leu Val Met
                165                 170                 175

Ser Gln Asp Ile Lys Lys Ala Asp Glu Gln Met Glu Ser Met Thr Tyr
            180                 185                 190

Ser Thr Glu Arg Lys Thr Asn Ser Leu Pro Leu His Ser Val Lys Ser
        195                 200                 205
```

Ile Lys Ser Asp Phe Ile Asp Lys Ala Glu Glu Ser Thr Gln Ser Lys
210                 215                 220

Glu Ile Ser Leu Pro Glu Val Ser Leu Leu Lys Ile Leu Lys Leu Asn
225                 230                 235                 240

Lys Pro Glu Trp Pro Phe Val Val Leu Gly Thr Leu Ala Ser Val Leu
            245                 250                 255

Asn Gly Thr Val His Pro Val Phe Ser Ile Ile Phe Ala Lys Ile Ile
                260                 265                 270

Thr Met Phe Gly Asn Asn Asp Lys Thr Thr Leu Lys His Asp Ala Glu
        275                 280                 285

Ile Tyr Ser Met Ile Phe Val Ile Leu Gly Val Ile Cys Phe Val Ser
290                 295                 300

Tyr Phe Met Gln Gly Leu Phe Tyr Gly Arg Ala Gly Glu Ile Leu Thr
305                 310                 315                 320

Met Arg Leu Arg His Leu Ala Phe Lys Ala Met Leu Tyr Gln Asp Ile
            325                 330                 335

Ala Trp Phe Asp Glu Lys Glu Asn Ser Thr Gly Leu Thr Thr Ile
                340                 345                 350

Leu Ala Ile Asp Ile Ala Gln Ile Gln Gly Ala Thr Gly Ser Arg Ile
            355                 360                 365

Gly Val Leu Thr Gln Asn Ala Thr Asn Met Gly Leu Ser Val Ile Ile
370                 375                 380

Ser Phe Ile Tyr Gly Trp Glu Met Thr Phe Leu Ile Leu Ser Ile Ala
385                 390                 395                 400

Pro Val Leu Ala Val Thr Gly Met Ile Glu Thr Ala Ala Met Thr Gly
                405                 410                 415

Phe Ala Asn Lys Asp Lys Gln Glu Leu Lys His Ala Gly Lys Ile Ala
            420                 425                 430

Thr Glu Ala Leu Glu Asn Ile Arg Thr Ile Val Ser Leu Thr Arg Glu
        435                 440                 445

Lys Ala Phe Glu Gln Met Tyr Glu Glu Met Leu Gln Thr Gln His Arg
450                 455                 460

Asn Thr Ser Lys Lys Ala Gln Ile Ile Gly Ser Cys Tyr Ala Phe Ser
465                 470                 475                 480

His Ala Phe Ile Tyr Phe Ala Tyr Ala Ala Gly Phe Arg Phe Gly Ala
            485                 490                 495

Tyr Leu Ile Gln Ala Gly Arg Met Thr Pro Glu Gly Met Phe Ile Val
        500                 505                 510

Phe Thr Ala Ile Ala Tyr Gly Ala Met Ala Ile Gly Lys Thr Leu Val
        515                 520                 525

Leu Ala Pro Glu Tyr Ser Lys Ala Lys Ser Gly Ala Ala His Leu Phe
530                 535                 540

Ala Leu Leu Glu Lys Lys Pro Asn Ile Asp Ser Arg Ser Gln Glu Gly
545                 550                 555                 560

Lys Lys Pro Asp Thr Cys Glu Gly Asn Leu Glu Phe Arg Glu Val Ser
            565                 570                 575

Phe Phe Tyr Pro Cys Arg Pro Asp Val Phe Ile Leu Arg Gly Leu Ser
            580                 585                 590

Leu Ser Ile Glu Arg Gly Lys Thr Val Ala Phe Val Gly Ser Ser Gly
        595                 600                 605

Cys Gly Lys Ser Thr Ser Val Gln Leu Leu Gln Arg Leu Tyr Asp Pro
610                 615                 620

Val Gln Gly Gln Val Leu Phe Asp Gly Val Asp Ala Lys Glu Leu Asn
625                 630                 635                 640

Val Gln Trp Leu Arg Ser Gln Ile Ala Ile Val Pro Gln Glu Pro Val
            645                 650                 655

Leu Phe Asn Cys Ser Ile Ala Glu Asn Ile Ala Tyr Gly Asp Asn Ser
                660                 665                 670

Arg Val Val Pro Leu Asp Glu Ile Lys Glu Ala Ala Asn Ala Ala Asn
            675                 680                 685

Ile His Ser Phe Ile Glu Gly Leu Pro Glu Lys Tyr Asn Thr Gln Val
        690                 695                 700

Gly Leu Lys Gly Ala Gln Leu Ser Gly Gly Gln Lys Gln Arg Leu Ala
705                 710                 715                 720

Ile Ala Arg Ala Leu Leu Gln Lys Pro Lys Ile Leu Leu Leu Asp Glu
                725                 730                 735

Ala Thr Ser Ala Leu Asp Asn Asp Ser Glu Lys Val Val Gln His Ala
                740                 745                 750

Leu Asp Lys Ala Arg Thr Gly Arg Thr Cys Leu Val Val Thr His Arg
            755                 760                 765

Leu Ser Ala Ile Gln Asn Ala Asp Leu Ile Val Val Leu His Asn Gly
        770                 775                 780

Lys Ile Lys Glu Gln Gly Thr His Gln Glu Leu Leu Arg Asn Arg Asp
785                 790                 795                 800

Ile Tyr Phe Lys Leu Val Asn Ala Gln Ser Val Gln
                805                 810

<210> SEQ ID NO 4
<211> LENGTH: 4375
<212> TYPE: DNA
<213> ORGANISM: Artificial Sequence
<220> FEATURE:
<223> OTHER INFORMATION: Synthetic Polynucleotide

<400> SEQUENCE: 4
attgcttctc ggcctttttgg ctaagatcaa gtgtaatctg tgttcttttt tatttggtca    60
tatcttccat tctttcttac ctaattcctc taatatctct ctgtgagcct aaaccaataa   120
ttatatatta cattctattg tctttcttat ataactgcag aaagataaat atcactttgt   180
ttgttcctgt aggttttctt tagtgtaatc catagcagtt attgcattgg agcagcagtc   240
cctcactttg aaaccttcgc aatagcccga ggagctgcct ttcatatttt ccaggttatt   300
gataagaaac ccagtataga taacttttcc acagctggat ataaacctga atccatagaa   360
ggaactgtgg aatttaaaaa tgtttctttc aattatccat caagaccatc tatcaagatt   420
ctgaaaggtc tgaatctcag aattaagtct ggagagacag tcgccttggt cggtctcaat   480
ggcagtggga agagtacggt agtccagctt ctgcagaggt tatatgatcc ggatgatggc   540
tttatcatgg tggatgagaa tgacatcaga gctttaaatg tgcggcatta tcgagaccat   600
attggagtgg ttagtcaaga gcctgttttg ttcgggacca ccatcagtaa caatatcaag   660
tatggacgag atgatgtgac tgatgaagag atggagagag cagcaaggga agcaaatgcg   720
tatgatttta tcatggagtt tcctaataaa tttaatacat ggtagggga aaaggagct   780
caaatgagtg gagggcagaa acagaggatc gcaattgctc gtgccttagt tcgaaacccc   840
aagattctga ttttagatga ggctacgtct gccctggatt cagaaagcaa gtcagctgtt   900
caagctgcac tggagaaggc gagcaaaggt cggactacaa tcgtggtagc acaccgactt   960
tctactattc gaagtgcaga tttgattgtg accctaaagg atggaatgct ggcggagaaa  1020

```
ggagcacatg ctgaactaat ggcaaaacga ggtctatatt attcacttgt gatgtcacag   1080
gatattaaaa aagctgatga acagatggag tcaatgacat attctactga agaaagacc    1140 aactcacttc ctctgcactc tgtgaagagc atcaagtcag acttcattga caaggctgag   1200
gaatccaccc aatctaaaga gataagtctt cctgaagtct ctctattaaa aattttaaag   1260
ttaaacaagc ctgaatggcc ttttgtggtt ctggggacat tggcttctgt tctaaatgga   1320
actgttcatc cagtattttc catcatcttt gcaaaaatta taaccatgtt tggaaataat   1380
gataaaacca cattaaagca tgatgcagaa atttattcca tgatattcgt cattttgggt   1440
gttatttgct ttgtcagtta tttcatgcag ggattatttt acggcagagc aggggaaatt   1500
ttaacgatga gattaagaca cttggccttc aaagccatgt tatatcagga tattgcctgg   1560
tttgatgaaa aggaaaacag cacaggaggc ttgacaacaa tattagccat agatatagca   1620
caaattcaag gagcaacagg ttccaggatt ggcgtcttaa cacaaaatgc aactaacatg   1680
ggactttcag ttatcatttc ctttatatat ggatgggaga tgacattcct gattctgagt   1740
attgctccag tacttgccgt gacaggaatg attgaaaccg cagcaatgac tggatttgcc   1800
aacaaagata agcaagaact taagcatgct ggaaagatag caactgaagc tttggagaat   1860
atacgtacta tagtgtcatt aacaagggaa aaagccttcg agcaaatgta tgaagagatg   1920
cttcagactc aacacagaaa tacctcgaag aaagcacaga ttattggaag ctgttatgca   1980
ttcagccatg cctttatata ttttgcctat gcggcagggt ttcgatttgg agcctattta   2040
attcaagctg gacgaatgac cccagagggc atgttcatag tttttactgc aattgcatat   2100
ggagctatgg ccatcggaaa aacgctcgtt ttggctcctg aatattccaa agccaaatcg   2160
ggggctgcgc atctgtttgc cttgttggaa aagaaaccaa atatagacag ccgcagtcaa   2220
gaagggaaaa agccagacac atgtgaaggg aatttagagt ttcgagaagt ctctttcttc   2280
tatccatgtc gcccagatgt tttcatcctc cgtggcttat ccctcagtat tgagcgagga   2340
aagacagtag catttgtggg gagcagcggc tgtgggaaaa gcacttctgt tcaacttctg   2400
cagagacttt atgaccccgt gcaaggacaa gtgctgtttg atggtgtgga tgcaaaagaa   2460
ttgaatgtac agtggctccg ttcccaaata gcaatcgttc ctcaagagcc tgtgctcttc   2520
aactgcagca ttgctgagaa catcgcctat ggtgacaaca gccgtgtggt gccattagat   2580
gagatcaaag aagccgcaaa tgcagcaaat atccattctt ttattgaagg tctccctgag   2640
aaatacaaca cacaagttgg actgaaagga gcacagcttt ctggcggcca gaaacaaaga   2700
ctagctattg caagggctct tctccaaaaa cccaaaattt tattgttgga tgaggccact   2760
tcagccctcg ataatgacag tgagaaggtg gttcagcatg cccttgataa agccaggacg   2820
ggaaggacat gcctagtggt cactcacagg ctctctgcaa ttcagaacgc agatttgata   2880
gtggttctgc acaatggaaa gataaaggaa caaggaactc atcaagagct cctgagaaat   2940
cgagacatat attttaagtt agtgaatgca cagtcagtgc agtgatgctg ttgaggtagc   3000
acatattttg atgttcgtgt aatgcaaaga aggagtactt aataattact tggcaagctt   3060
tgatctcttt tattgcatat atcaataacct agaatcatgc tactcaagta catacatgtt   3120
ctattcacac accatctgac cttcagattt ttaaaaggaa gcaaaatttt gcttatttca   3180
tgtaagtgaa ataatgctta tatccttcac tttataaaac tattctagca catttgcttg   3240
taaagcagtt ttctacaagg tgaatttatt tcccatcaac ttctgctata aaatcggaaa   3300
tatgtttcca gggggaatat tatccaatta accatgttga aggttttagc aaaggcagtg   3360
```

```
taagatagag tggggcctgt agcattgcag ggagagtgtc tttcacttgg aattttgttt    3420
tgcagcacat attacagtag ttttgctagt cccttttctc cagaccgtag ggatttctct    3480
caataagtat tcactatttc tctaaatttt attctatttt tttgttgagc agggaataga    3540
aaggattacg atgtaaaatt tctgggagga ttaggtagct atctcctact tcaccagtaa    3600
gtgaagtgcc tcacatgagc catcccaaag attcattatt ccaaaccttg ggtttggcag    3660
tataagtcac aggcctacct gtttatgaaa acttacttac ttaaaataag agctactttt    3720
gggccgggtg cggtggctca cgcctgtaat cccagaactt tgggaggccg aggagggcgg    3780
atcacttgag gtcaggagtt cgagaccagc ctggccaaca tggtgaaacc ccgtctctac    3840
taaaaacaca aaaattagcc aatcttggtg gcgggcacct ggaatcccag ctacttggga    3900
ggctgaggca ggagaatcat ttgaacctag gaggcagagg ttgcagtgag ccgagatctc    3960
accactgcac tccagcctgc gcaacagagc gagactccat ctcaaaaaat aataaataag    4020
agctaatttt attgtgggtg aaaatttta aacgtctttc tctataataa aataatttcc    4080
ttaaatttta tatatacttt atcatatata atgtgtgaat gattttaaag ttctgtgtaa    4140
ataacaatat tggtaaaatg agttacattt tcaacttact taaatatgta atgtcacctg    4200
gtgattttat ctttattctt cagtgtattt tcttccattt acacatttag ctagcctccc    4260
taaagtgtac tctaccaata attgaaatct tgttaaacaa aattaaaacc atttatatat    4320
tatgctgctt tctttaaaat gcaaaataaa aataagattg gggacttgag aatca         4375
```

ABCB5 LIGANDS AND SUBSTRATES

RELATED APPLICATIONS

This application is a National Stage filing under 35 U.S.C. § 371 of International Application No. PCT/US2019/029235, filed Apr. 25, 2019, which claims the benefit under 35 U.S.C. § 119 (e) to U.S. provisional application No. 62/662,670, filed Apr. 25, 2018, the entire contents of each of which is incorporated by reference herein in its entirety.

FIELD OF INVENTION

The present invention is directed at methods and compositions for modulating stem cell activity for treating disease and related assays and reagents. The present invention is also directed at methods and compositions for wound healing and tissue engineering, involving ABCB5 positive cells.

BACKGROUND OF INVENTION

Tumor development and progression have been associated, at the DNA level, with cumulative alterations in oncogenes, tumor suppressor genes, and repair/stability genes. At the cellular level, human cancers have been recognized to consist of phenotypically heterogeneous cell populations with variable ability for self-renewal and tumor propagation. This observation led to the development of the cancer stem cell (CSC) model of tumor initiation and growth, which has been broadly confirmed in multiple malignancies, including melanoma and colorectal cancer. CSC have been shown to contribute to the failure of existing therapies to consistently eradicate malignant tumors through diverse molecular mechanisms, including epithelial-mesenchymal transition (EMT) associated with the ability of human cancers to invade the vasculature and disseminate to novel anatomic locations leading to tumor progression and therapeutic resistance.

ABCB5 is a multidrug resistance (MDR) mediator expressed in diverse human malignancies, where it is specifically overexpressed on therapy-resistant CD133(+) tumor subpopulations previously found to represent CSC. ABCB5 confers cancer cell drug resistance to chemotherapeutic agents such as 5-fluorouracil (5-FU).

ABCB5+ stem cells are also found in normal tissue and have a role in tissue regeneration and aging. Regenerative medicine involves the repair, regeneration, maintenance, and replacement of tissues and organs using exogenous materials such as scaffolds. The scaffolds may be seeded with cells, such as primary cells or stem cells, and various factors to encourage tissue growth. However, a number of challenges remain in the design of appropriate material for regenerative medicine and tissue engineering.

SUMMARY OF INVENTION

The present invention, in some aspects, is directed to methods and compositions for modulating ABCB5+ stem cell activity. The invention also relates to assays and reagents for manipulating and characterizing compounds that modulate ABCB5+ cell signaling.

Aspects of the invention relate to a method of enhancing ABCB5-positive cell function, comprising administering to a subject in need thereof an effective amount of a composition that enhances ABCB5-PIP2 pathway.

In some embodiments, the invention further comprises assessing ABCB5-PIP2 binding following administration of the composition.

In some embodiments, the composition is PIP2 or a PIP2 agonist.

In some embodiments, the subject is a human or a non-human animal comprising a goat, sheep, bison, camel, cow, pig, rabbit, buffalo, horse, rat, mouse, cat, dog llama, or primate, e.g., monkey.

In some embodiments, the composition comprises a phospholipid.

In some embodiments, the composition comprises [PIP2 (6:0/18:0)-H]$^-$ and a pharmaceutically acceptable carrier.

In some embodiments, the composition comprises a phospholipid, comprising a compound having the structure as described herein. In some embodiments, the structure comprises an R1 and R2 groups. In some embodiments, R1 and R2 are independent fatty acid chains. In some embodiments, the structure comprises R1 and R2 has a length that is at least twice as long as the other of R1 and R2. In some embodiments, the structure has a total fatty acid chain of 22:0-26:0. In some embodiments, the structure has a total fatty acid chain of 24:0.

In some embodiments, the subject is a healthy subject. In some embodiments, the composition promotes wound healing. In some embodiments, the composition promotes tissue regeneration. In some embodiments, the composition promotes angiogenesis. In some embodiments, the composition promotes cell survival. In some embodiments, the composition suppresses cell death. In some embodiments, the composition is administered by oral, intravenous, subcutaneous, topical, parenteral, intratumoral, intramuscular, intranasal, intracranial, sublingual, intratracheal, ocular, or intrathecal route.

Aspects of the invention relate to a method of inhibiting ABCB5-positive cancer cell function, comprising administering to a subject in need thereof an effective amount of a composition that inhibits ABCB5-PIP2 pathway and further comprising assessing ABCB5-PIP2 binding following administration of the composition.

Other aspects of the invention relate to a method of inhibiting ABCB5-positive cancer cell function, comprising administering to a subject in need thereof an effective amount of a composition that inhibits ABCB5-PIP2 binding wherein the composition is selected from a group comprising a small molecule, a lipid analog, an anti-ABCB5 antibody or fragment having specificity for the cyclical form or the linear form of an extracellular polypeptide of the protein, an enzyme, and an anti-ABCB5 antibody or fragment thereof that alters the conformation of ABCB5 PIP2 binding site.

In some embodiments, the anti-ABCB5 antibody or fragment thereof that alters the conformation of ABCB5 PIP2 binding site, inhibits the production of PIP3. In some embodiments, the anti-ABCB5 antibody or fragment thereof that alters the conformation of ABCB5 PIP2 binding site, inhibits PI3K pathway.

In some embodiments, ABCB5-PIP2 binding is assessed following administration of the composition.

In some embodiments, the composition is a PIP2 antagonist. In some embodiments, the composition is selected from a group comprising a small molecule, a lipid analog, an anti-ABCB5 antibody or fragment having specificity for the cyclical form or the linear form of an extracellular polypeptide of the protein, and an enzyme. In some embodiments, the composition is a small molecule. In some embodiments, the composition is an ABCB5 antibody or fragment having specificity for the cyclical form or the linear form of an extracellular polypeptide of the protein. In some embodiments, the composition is an ABCB5 antibody or fragment that alters the conformation of ABCB5 PIP2 binding site. In some embodiments, the composition is a lipid analog. In some embodiments, the composition is an enzyme.

In some embodiments, the subject is human or a non-human animal comprising a goat, sheep, bison, camel, cow, pig, rabbit, buffalo, horse, rat, mouse, cat, dog llama, or primate, e.g., monkey.

In some embodiments, the composition is administered by oral, intravenous, subcutaneous, topical, parenteral, intratumoral, intramuscular, intranasal, intracranial, sublingual, intratracheal, ocular, or intrathecal route.

Aspects of the invention relate to a method for identifying an enhancer or inhibitor of ABCB5-PIP2 pathway, comprising. In some embodiments, the invention comprises contacting an ABCB5+ cell with a putative composition that modulates ABCB5-PIP2 binding; determining a level of a PIP2 pathway product compound and comparing the level with a baseline level of the PIP2 pathway product compound. In some embodiments, the putative composition is identified as an ABCB5-PIP2 pathway enhancer if the level is greater than the baseline level. In some embodiments, the putative composition is identified as an ABCB5-PIP2 pathway inhibitor if the level of PIP2 pathway product compound is lower than the baseline level, the putative composition is an ABCB5-PIP2.

In some embodiments, the putative composition that modulates ABCB5-PIP2 pathway is PIP2 or PIP2 agonist. In some embodiments, the putative composition that modulates ABCB5-PIP2 pathway is a small molecule. In some embodiments, the putative composition that modulates ABCB5-PIP2 pathway is an anti-ABCB5 antibody or fragment thereof. In some embodiments, the PIP2 pathway compound is PIP3. In some embodiments, the PIP2 pathway compound is a member of the PI3K pathway. In some embodiments, the ABCB5+ cell comprises an ABCB5 isoform 1 wherein an amino acid at position 970 is lysine. In some embodiments, the ABCB5+ cell comprises an ABCB5 isoform 2 wherein an amino acid at position 525 is lysine.

In some embodiments, the assay involves determining the number of ABCB5 alleles and then testing how many are positive for K and how many are positive for E, i.e. an allele-specific quantitation procedure that extracts both copy number and allelotype information.

Aspects of the invention relate to a composition comprising a synthetic phospholipid, comprising a compound having the structure as described herein. In some embodiments, the structure comprises R1 and R2 groups. In some embodiments, R1 and R2 are independent fatty acid chains. In some embodiments, R1 and R2 have a length that is at least twice as long as the other of R1 and R2. In some embodiments, the phospholipid has a total fatty acid chain of 22:0-26:0. In some embodiments, the phospholipid has a total fatty acid chain of 24:0. In some embodiments, the phospholipid has a formula: $C_{33}H_{65}O_{19}P_3$. In some embodiments, the phospholipid comprises [PIP2 (6:0/18:0)-H] and a pharmaceutically acceptable carrier.

In some embodiments, the composition comprises a PIP2 analog. In some embodiments, the composition enhances ABCB5-PIP2 pathway. In some embodiments, the composition promotes wound healing. In some embodiments, the composition promotes tissue regeneration. In some embodiments, the composition promotes angiogenesis. In some embodiments, the composition promotes cell survival. In some embodiments, the composition suppresses cell death.

In some embodiments, the phospholipid comprises phosphorylated PIP3 (6:0/18:0)-H$^-$ ($C_{33}H_{65}O_{19}P_4$) and a pharmaceutically acceptable carrier.

Aspects of the invention relate to a human anti-ABCB5 antibody or ABCB5-binding fragment thereof that inhibits ABCB5-PIP2 pathway, wherein the anti-ABCB5 antibody or ABCB5-binding fragment thereof binds to an extracellular loop of a three dimensional configuration of ABCB5.

In some embodiments, the human anti-ABCB5 antibody or ABCB5-binding fragment is preparable by a method comprising affinity maturation to bind specifically to the extracellular loop of a non-linear form of the ABCB5. In some embodiments, the human anti-ABCB5 antibody or ABCB5-binding fragment has a sequence that corresponds to an antibody preparable by a method comprising affinity maturation to bind specifically to the extracellular loop of a non-linear form of the ABCB5.

Aspects of the invention relate to a method of preparing a human anti-ABCB5 antibody or ABCB5-binding fragment as described herein that inhibits ABCB5-PIP2 pathway. In some embodiments, the anti-ABCB5 antibody or ABCB5-binding fragment is subjected to affinity maturation to bind specifically to the extracellular loop of a non-linear form of the protein.

Aspects of the invention relate to a method for identifying an antibody or fragment that inhibits ABCB5-PIP2 pathway. In some embodiments, the antibody or fragment that inhibits ABCB5-PIP2 pathway is identified by contacting ABCB5+ cell with a putative antibody or fragment that binds ABCB5; assessing ABCB5-PIP2 binding following treatment with the antibody or fragment; determining a level of a PIP2 pathway product compound and comparing the level with a baseline level of the PIP2 pathway product compound.

In some embodiments, the putative antibody or fragment is an inhibitor of ABCB5-PIP2 pathway if the level of the PIP2 pathway product compound is lower than the baseline level. In some embodiments, the PIP2 pathway compound is PIP3. In some embodiments, the PIP2 pathway compound is a member of the PI3K pathway.

Aspects of the invention relate to an ABCB5 isoform 1 comprising two transmembrane domains (TMDs) and 12 transmembrane helices (TMs 1-12). In some embodiments, the Glutamic Acid at position 970 TM12 has been mutated to lysine or position 970 TM12 is Glutamic Acid.

Aspects of the invention relate to an ABCB5 isoform 2 comprising one transmembrane domain (TMD) and 6 transmembrane helices (TMs 1-6). In some embodiments, the Glutamic Acid at position 525 TM6 has been mutated to lysine or position 525 TM12 is Glutamic Acid.

Aspects of the invention relate to a human anti-ABCB5 isoform antibody or binding fragment thereof that inhibits ABCB5-PIP2 pathway. In some embodiments, the anti-ABCB5 antibody or ABCB5-binding fragment thereof specifically binds to the ABCB5 isoform 1 as described herein or the ABCB5 isoform 2 as described herein.

Aspects of the invention relate to a human anti-ABCB5 isoform antibody or binding fragment thereof that inhibits ABCB5-PIP2 pathway. In some embodiments, the anti-ABCB5 antibody or ABCB5-binding fragment thereof specifically binds to the ABCB5 isoform 1 or the ABCB5 isoform 2 as described herein.

Aspects of the invention relate to a method for identifying an enhancer or inhibitor of ABCB5-PIP2 pathway. In some embodiments, the method comprises contacting the ABCB5 isoform 1 or the ABCB5 isoform 2 as described herein with a putative composition that modulates ABCB5-PIP2 binding; determining a level of a PIP2 pathway product compound and comparing the level with a baseline level of the PIP2 pathway product compound. In some embodiments, the putative composition is an ABCB5-PIP2 pathway enhancer if the level is greater than the baseline level. In some embodiments, the putative composition is an ABCB5-PIP2 inhibitor if the level of PIP2 pathway compound is lower than the baseline level.

In some embodiments, the putative composition that modulates ABCB5-PIP2 pathway is PIP2 or PIP2 agonist. In some embodiments, the putative composition that modulates ABCB5-PIP2 pathway is a small molecule. In some embodiments, the putative composition that modulates ABCB5-PIP2 pathway is an anti-ABCB5 antibody or fragment thereof. In some embodiments, the PIP2 pathway compound is PIP3. In some embodiments, the PIP2 pathway compound is a member of the PI3K pathway. In some embodiments, the ABCB5 isoforms are expressed recombinantly.

Aspects of the invention relate to a method for treating a cancer in a subject. In some embodiments, the method comprises disrupting an endogenous ABCB5 gene in a cell using gene editing. In some embodiments, the editing comprises contacting the cell with a Cas protein, a CRISPR RNA that hybridizes to the endogenous ABCB5 gene, and a tracrRNA. In some embodiments, the endogenous ABCB5 gene is modified such that a AAA sequence in the region of the gene encoding the terminal transmembrane helix of the ABCB5 gene is replaced with a GAA following contact with the Cas protein, CRISPR RNA, and tracrRNA. In some embodiments, the gene editing treats the cancer in the subject.

In some embodiments, the subject has an ABCB+ stem cell associated with the cancer prior to gene editing that is ABCB5 homozygous isoform 2 K525/K525. In some embodiments, the cancer is melanoma or glioblastoma.

Aspects of the invention relate to a method for treating a cancer in a subject. In some embodiments, the method comprises administering to the subject an ABCB1 inhibitor in an effective amount to inhibit ABCB5-PIP2 pathway function to treat the cancer in the subject. In some embodiments. In some embodiments, the cancer is comprised of cancer cells and the cancer cells express negligible or no ABCB1. In some embodiments, the method further comprises detecting the presence of an ABCB5+ stem cell prior to the administration step. In some embodiments, the ABCB1 inhibitor is a pump inhibitor and the cancer is not concurrently treated with a chemotherapeutic agent. In some embodiments, the method further comprises assessing ABCB5-PIP2 binding following administration of the composition.

In some embodiments, the subject has an ABCB+ stem cell associated with the cancer prior to gene editing that is ABCB5 homozygous isoform 2 K525/K525. In some embodiments, the cancer is melanoma or glioblastoma.

Aspects of the invention relate to a method for characterizing a cancer. In some embodiments, the method comprises isolating a cancer cell from a subject, determining whether the cancer cell is ABCB5 homozygous isoform 2 K525/K525, is ABCB5 homozygous isoform 2 E525/E525, or is ABCB5 heterozygous isoform 2 K525/E525 in order to characterize the cancer.

Each of the limitations of the invention can encompass various embodiments of the invention. It is, therefore, anticipated that each of the limitations of the invention involving any one element or combinations of elements can be included in each aspect of the invention. This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1C shows that all of PIP1, PIP2 and PIP3 bound to recombinant human ABCB5 as well as murine Abcb5, with absent binding detection in Abcb5 knockout mouse tissue. Binding of PIP2 and PIP3 to ABCB5 was hereby more efficient than that of PIP1 to ABCB5.

DETAILED DESCRIPTION OF THE INVENTION

Figure 1A:
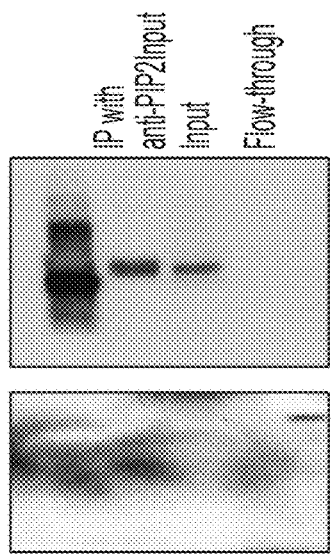
FIGS. 1A to 1C. PIP2 and PIP3 are biological ligands for ABCB5, which serves as a receptor for PIP2 and PIP3. Immunoblotting using ABCB5 monoclonal antibody (FIG. 1A, upper panel) shows that immunoprecipitation from human ABCB5-expressing melanoma cells of PIP2 using anti-PIP2 antibody pulldown revealed co-precipitation of ABCB5 protein. PIP2 pulldown was confirmed using immunoblotting with PIP2 antibody (FIG. 1A, lower panel). Immunoblotting using ABCB5 monoclonal antibody (FIG. 1B) shows that immunoprecipitation from human ABCB5-expressing melanoma cells of PIP3 using anti-PIP3 antibody pulldown revealed co-precipitation of ABCB5 protein.
Figure 1B:
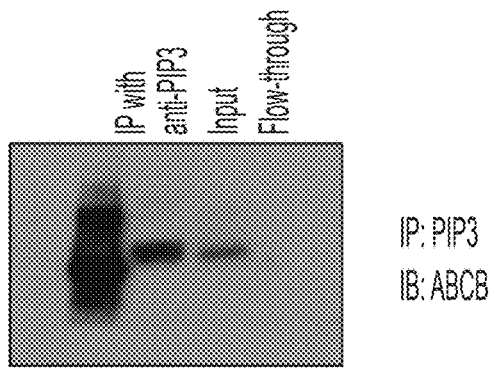

The invention in some aspects relates to the discovery that ATP-binding cassette, sub-family B (MDR/TAP), member 5 (ABCB5) [Frank, N.Y. et al. Regulation of progenitor cell fusion by ABCB5 P-glycoprotein, a novel human ATP-binding cassette transporter. J Biol Chem 278, 47156-65 (2003). and Schatton, T. et al. Identification of cells initiating human melanomas. Nature 451, 345-9 (2008).], preferentially expressed at high levels in the plasma membrane of cancer stem cells and normal tissue-specific stem cells, serves as a receptor for Phosphatidylinositol 4,5-bisphosphate (PtdIns (4,5) P2, also known simply as PIP2), and, to a lesser degree, PIP1 and PIP3. "ABCB5 (+) stem cells," as used herein, refers to cells having the capacity to self-renew and to differentiate into mature cells of multiple adult cell lineages, and characterized by the expression of ABCB5 on the cell surface. PIP2 is a minor phosphoinositol phospholipid component of cell membranes enriched at the plasma membrane, where it is a substrate for a number of important signaling proteins, regulating, for example, signaling through receptor tyrosine kinases (RTKs) through the PI3K pathway, or the IP3/DAG pathway of G-protein-coupled receptors. Inhibition of ABCB5-PIP2 pathway through inhibition of ABCB5, blocks PIP2 binding to ABCB5 and subsequently PIP2 phosphorylation to produce PIP3. Thus interruption of this pathway results in the inhibition of down-stream PI3K signaling of tyrosine kinase receptors (for example, VEGFR1, EGFR and AXL), with abrogation of their stem cell-specific functions. ABCB5 PIP2 binding can be assessed using various methods known in the art. For example, ABCB5 PIP2 binding can be assessed by methods comprising immunoprecipitation, western blotting, enzyme-linked immunosorbent assay (ELISA), immunofluorescence, microscopy, and spectroscopy (See FIGS. 1-3)

Aspects of the invention relate to methods for enhancing ABCB5-positive cell function. As used herein, "ABCB5-positive cell function" refers to activities of ABCB5 in a healthy subject, and having a positive effect on the subject. For example, ABCB5-positive cell function comprises promoting wound healing, tissue regeneration, angiogenesis, cell survival, and suppressing cell death. It should be understood that wound healing, tissue regeneration, angiogenesis, cell survival, and cell death are determined by comparing the levels or rate of each relative to the levels or rate in a control sample. A "control sample" herein refers to a sample lacking ABCB5 function. A "healthy subject" as used herein is a subject otherwise free of disease.

The phrase "stem cell-specific function," as used herein relates to the activity of ABCB5 associated with stem cells. For example, skin-associated healthy ABCB5+ stem cells use ABCB5-enhanced PI3K signaling and downstream AKT phosphorylation and mTOR signaling for angiogenesis and anti-apoptotic signaling, leading to stem cell survival and vascular differentiation, among other downstream functions, required for normal wound healing. ABCB5+ limbal stem cells utilize this pathway for anti-apoptotic signaling required for stem cell maintenance. ABCB5+ cancer stem cells, for example in melanoma or colorectal cancer, utilize this pathway for cell survival, vasculogenic mimicry, drug resistance and EMT and metastatic invasion (as shown in FIG. 1 i.e., inhibition of pAKT phosphorylation and EMT and invasiveness by ABCB5 blockade).

ABCB5 binding of PIP2 can serve, among other functions, to increase its rate of phosphorylation to PIP3 and thus represents a stem cell-specific interaction to enhance the signaling roles of PIP2 in cells that do not express ABCB5. ABCB5-PIP2 binding can also be inhibited by small molecule ABCB5 competitive ligands or substrates, or compositions comprising the same, which also inhibit downstream signaling of key ABCB5-dependent biological stem cell functions. Thus, the invention has several important utilities.

Thus, the invention described herein can be useful for promoting regeneration in a healthy subject.

The invention can also be useful in the treatment of a subject having or at risk of having a disease, for example a subject having or at risk of having cancer.

A subject shall mean a human or vertebrate mammal including but not limited to a goat, sheep, bison, camel, cow, pig, rabbit, buffalo, horse, rat, mouse, cat, dog, llama and primate, e.g., monkey. Thus, the invention can also be used to treat diseases or conditions in non-human subjects. For instance, cancer is one of the leading causes of death in companion animals (i.e., cats and dogs). Preferably the subject is a human.

A subject at risk of developing a cancer is one who has a high probability of developing cancer. These subjects include, for instance, subjects having a genetic abnormality, the presence of which has been demonstrated to have a correlative relation to a higher likelihood of developing a cancer and subjects exposed to cancer causing agents such as tobacco, asbestos, or other chemical toxins, or a subject who has previously been treated for cancer and is in apparent remission. A subject at risk of having cancer also includes a subject having precancerous lesions. A precancerous lesion is an area of tissue that has altered properties and carries the risk of turning into skin cancer. Precancerous lesions may be caused by, for instance, UV radiation, genetics, exposure to carcinogens such as arsenic, tar or x-ray radiation.

A subject having a cancer is a subject that has detectable cancerous cells. The cancer may be a malignant or non-malignant cancer. Cancers or tumors include but are not limited to biliary tract cancer; brain cancer; breast cancer; cervical cancer; choriocarcinoma; colon cancer; endometrial cancer; esophageal cancer; gastric cancer; intraepithelial neoplasms; lymphomas; liver cancer; lung cancer (e.g. small cell and non-small cell); melanoma; neuroblastomas; oral cancer; ovarian cancer; pancreas cancer; prostate cancer; rectal cancer; sarcomas; skin cancer; testicular cancer; thyroid cancer; and renal cancer, as well as other carcinomas and sarcomas. Preferably the cancer includes cancer stem cells that express ABCB5.

Optionally, prior to the treatment the presence of ABCB5 positive stem cells can be detected using the binding molecules described herein. The detection or diagnosis methods provided by the invention generally involve contacting one or more molecules of the invention with a sample in or from a subject. Preferably, the sample is first harvested from the subject, although in vivo detection methods are also envisioned. The sample may include any body tissue or fluid that is suspected of harboring the cancer stem cells. For example, the stem cells are commonly found in or around the tumor mass.

ABCB5 or ATP Binding Cassette Subfamily B Member 5

As its name indicates, ABCB5 is a member of the ATP-binding cassette transporters sub-family B. It is a transmembrane protein encoded by the ABCB5 gene. ATP-binding cassette (ABC) transporters play a pivotal role in physiology and pathology. They are involved in the transport of structurally diverse molecules ranging from small ions, sugars, and peptides to more complex organic molecules (Chen et al. 2005).

"ABCB5+ stem cells" or "ABCB5+ cells," as used herein, refers to cells having the capacity to self-renew and to differentiate into mature cells of multiple adult cell lineages. In some embodiments, these cells are characterized by the expression of ABCB5. In some embodiments of the invention, ABCB5+ cells are cancer stem cells. In some embodiments of the invention, ABCB5+ cells are healthy stem cells.

Aspects of the invention relate to the identification of ABCB5 isoforms involved in cancer. In some embodiments, the ABCB5 isoforms are involved in melanoma or glioblastoma. As used herein, an "ABCB5 isoform" is an ABCB5 protein have one variant of ABCB5 structure. In some embodiments, the ABCB5 isoform is ABCB5 isoform 1 (1257 amino acids). ABCB5 isoform 1 comprises two transmembrane domains (TMDs) with 6 transmembrane (TM) helices each, i.e. it comprises altogether 12 transmembrane helices (TMs 1-12). In some embodiments, the ABCB5 isoform is isoform 2 (812 amino acids). ABCB5 isoform 2 comprises one TMD with 6 transmembrane (TM) helices (TMs 1-6). TMs 1-6 of ABCB5 isoform 2 correspond to TMs 7-12 of ABCB5 isoform 1. In further embodiments, the presence of the lysine residue at specific locations in the 2 isoforms is associated with cancer prevalence. In further embodiments, the residue is 970 in TM12 of ABCB5 isoform 1 and 525 in TM6 of ABCB5 isoform 2. A non-synonymous single nucleotide polymorphism (SNP) in the coding region of ABCB5, providing for AA 970 E>K in TM12 of ABCB5 isoform 1 and corresponding to AA 525 E>K in TM6 of ABCB5 isoform 2, was revealed herein to be important for ABCB5 function in cancer cells. For example 970 in TM12 of ABCB5 isoform 1 and 525 in TM6 of ABCB5 isoform 2 are important for ABCB5-positive stem cell function. In further embodiments, these residues are required for ABCB5-positive cancer stem cell function.

Additional residues involved in ABCB5 substrate binding are N702 and H706 in TM7 of ABCB5 isoform 1 corresponding to N257 and H261 in TM1 of ABCB5 isoform 2, as well as 857 A>T (rs80123476) in TM10 of ABCB5 isoform 1 corresponding to 412 A>T (rs80123476) in TM4 of ABCB5 isoform 2.

Genes encoding either the higher functional ABCB5 isoform 2-K525 protein sequence, or the ABCB5 isoform 2-K525 protein itself, as well as genes encoding the lower functional ABCB5 isoform 2-E525 protein sequence, or the ABCB5 isoform 2-E525 protein itself, are useful compositions. These compositions can be used, for example, to 1. recombinantly express ABCB5 isoform 2-K525 or ABCB5 isoform 2-E525; 2. employ ABCB5 isoform 2-K525 and ABCB5 isoform 2-E525 in docking and binding experiments to identify novel sequence-specific ABCB5 ligands and substrates; employ ABCB5 isoform 2-K525 or ABCB5 isoform 2-E525 in molecular screens to identify synthetic compounds and naturally occurring substances that competitively inhibit PIP1,PIP2 or PIP3 binding to ABCB5 and thus also ABCB5-dependent receptor tyrosine kinase and G Protein coupled receptor signal transduction; employ ABCB5 isoform 2-K525 or ABCB5 isoform 2-E525 in molecular screens to identify novel ABCB5 monoclonal antibodies that inhibit PIP1, PIP2 or PIP3 binding to ABCB5 and thus also ABCB5-dependent receptor tyrosine kinase and G Protein coupled receptor signal transduction.

Compounds competitively inhibit PIP1, PIP2 or PIP3 binding to ABCB5 and thus inhibit ABCB5-dependent signal transduction are useful according to the invention. In some embodiments these compounds include but are not limited to PtdIns-(1,2-dioctanoyl), a synthetic analog of natural phosphatidylinositol (PtdIns) containing C8:0 fatty acids at the sn-1 and sn-2 positions (CAS Registry Number 899827-36-2). These compounds are useful for treating cancers associated with ABCB5+ stem cells.

In some aspects, the invention is a method of treating cancer by administering an ABCB1 inhibitor to a subject having cancer. It has been discovered herein that ABCB1 inhibitors are also useful for treating ABCB5+ cancers. These compounds competitively inhibit PIP1, PIP2 or PIP3 binding to ABCB5 and thus inhibit ABCB5-dependent signal transduction.

An ABCB1 inhibitor, as used herein, is a compound that reduces or eliminates ABCB1 function in a cell. ABCB1 inhibitors are known in the art and include anti-ABCB1 antibodies and functional fragments thereof and small molecules. Some ABCB1 inhibitors are ABCB1 agents for the treatment of heart disease or vessel disease, ABCB1 agents for the treatment of ABCB1+ cancers, ABCB1 agents for the treatment of infectious disease, ABCB1 agents for the treatment of gastric disease, and ABCB1 agents for the treatment of miscellaneous disease. In some embodiments the ABCB1 inhibitor includes, for example, PSC 833 (Valspodar), Zosuquidar, Tariquidar, and Laniquidar, i.e. substrates and/or inhibitors of the related substrate binding site of the highly homologous ABCB1 molecule.

ABCB 1 substrates or inhibitors are known for the treatment of various diseases. Based on the discovery of a novel ABCB5 isoform 2-AA525 substrate binding site for PIP1, PIP2, or PIP3, these compounds can therefore be used as small molecule inhibitors of ABCB5-dependent PIP1, PIP2 or PIP3 binding and PIP-dependent signal transduction and pAKT phosphorylation in order to, for example, therapeutically inhibit ABCB5-driven human cancer growth and progression in ABCB5-expressing cancers through functional ABCB5 blockade.

In some embodiments, the ABCB1 inhibitor useful in the method of treating cancer is an ABCB1 agent for the treatment of heart disease/vessel disease. Non-limiting examples of these compounds are shown in the list below.

ABCB1 Agents for the treatment of Heart disease/Vessel disease:

| | | |
|---|---|---|
| Verapamil | Acebutolol | Ticagrelor |
| Reserpine | Acetylsalicylic | Apixaban |
| Nifedipine | acid | Cobimetinib |
| Digoxin | Timolol | Selexipag |
| Quinidine | Nadolol | Ambrisentan |
| Nicardipine | Debrisoquine | Metoprolol |
| Prazosin | Ezetimibe | Atenolol |
| Diltiazem | Tolvaptan | Bromocriptine |
| Amitriptyline | Pitavastatin | Amlodipine |
| Losartan | Canagliflozin | |
| Pravastatin | Clopidogrel | |

In some embodiments, the ABCB1 inhibitor useful in the method of treating cancer is an ABCB1 Agent for the treatment of of Infectious disease. Non-limiting examples of these compounds are shown in the list below.

| ABCB1 agents for the treatment of infectious disease | | |
|---|---|---|
| Ivermectin | Ketoconazole | Saquinavir |
| Clarithromycin | Ritonavir | Nelfinavir |
| Indinavir | Levomilnacipran | Sofosbuvir |
| Rifampicin | Simeprevir | Voxilaprevir |
| Ciprofloxacin, | Zidovudine | Pibrentasvir |
| Rifamycin | Atazanavir | Glecaprevir |
| Sparfloxacin, | Telaprevir | Letermovir |
| Levofloxacin, | Fidaxomicin, | Dolutegravir |
| Grepafloxacin | Lamivudine | |

In some embodiments, the ABCB1 inhibitor useful in the method of treating cancer is an ABCB1 Agent for the treatment of cancer. In some embodiments the cancer is an ABCB5+ cancer and the cancer has no or negligible ABCB1. Non-limiting examples of these compounds are shown in the lists below.

| ABCB1 inhibitors for the treatment of ABCB5+ cancers | | |
|---|---|---|
| Vinblastine | Erlotinib | Fluciclovine |
| Tamoxifen | Conjugated | (18F) |
| Mitoxantrone | estrogens | Octreotide |
| Doxorubicin | Ethinylestradiol | Ondansetron |
| Daunorubicin | Cabazitaxel | Regorafenib |
| Etoposide | Temsirolimus | Melphalan |
| Paclitaxel | Romidepsin | Vinorelbine |
| Dactinomycin | Afatinib | Vemurafenib |
| Dasatinib | Dabrafenib | Duvelisib |
| Gefitinib | Crizotinib | Progesterone |
| Nilotinib | Pazopanib | Ibuprofen |
| Cisplatin | Axitinib | Gilteritinib |
| Camptothecin | Trastuzumab | Talazoparib |
| Diethylstilbestrol | emtansine | Toremifene |
| Clonidine | Irinotecan | Dacomitinib |
| Estradiol | Ceritinib | Glasdegib |
| Docetaxel | Lenvatinib | Olaparib |
| Methotrexate | Osimertinib | Palbociclib |
| Gemcitabine | Rucaparib | |
| Topotecan | Abemaciclib | |

In some embodiments, the ABCB1 inhibitor useful in the method of treating cancer is an ABCB1 Agent for the treatment of gastric disease. Non-limiting examples of these compounds are shown in the list below.

| ABCB1 Agents for gastric disease: |
|---|
| Omeprazole |
| Nizatidine |
| Domperidone |
| Lansoprazole |
| Ranitidine |
| Pantoprazole |

Other miscellaneous ABCB1 inhibitors useful in the methods of the invention include but are not limited to: Ciclosporin, Cimetidine, Aldosterone, Tacrolimus, Phenobarbital, Dexamethasone, Carbamazepine, Colchicine, Loperamide, Imipramine, Hydrocortisone, Citalopram, Taurocholic Acid, Fexofenadine, Prednisone, Estrone, Diazepam, Digitoxin, Methylprednisolone, Quetiapine, Olanzapine, Clozapine, Prednisolone, Betamethasone, Alitretinoin, Vecuronium, Stanolone, Epinastine, Estriol, Sphingosine, Cerivastatin, Levetiracetam, Phenytoin, Lamotrigine, Sitagliptin, Ketazolam, Silodosin, Rivaroxaban, Dabigatran etexilate, Fesoterodine, Indacaterol, Clobazam, Linagliptin, Mirabegron, Bosutinib, Fluticasone furoate, Mycophenolate mofetil, Dapagliflozin, Umeclidinium, Edoxaban, Nintedanib, Ombitasvir, Elbasvir, Grazoprevir, Odanacatib, Baricitinib, Ubidecarenone, Ertugliflozin, Stanolone acetate, Estradiol acetate, Estradiol benzoate, Estradiol cypionate, Estradiol dienanthate, Estradiol valerate, Testosterone propionate, Asunaprevir, Somatostatin, Avatrombopag, Venlafaxine, Trimipramine, Tacrine, Eletriptan, Sumatriptan, Sirolimus, Paritaprevir, Dasabuvir, Erythromycin, Gramicidin D, Itraconazole, Tetracycline, Valinomycin, Topiramate, Terfenadine, Amprenavir, Celiprolol, Talinolol, Flupentixol, Trifluoperazine, Rhodamine 6G, Simvastatin, Valspodar, Cerliponase alfa, Curcumin, Ascorbic acid, Chlorpromazine, Phenothiazine, Atorvastatin, Bromperidol, Morphine, Pentazocine, Propranolol, Neostigmine, Moxidectin, Mefloquine, Fluticasone, Fluticasone propionate, Elagolix, Chloroquine, Paliperidone, Lusutrombopag, Posaconazole, Dipyridamole, Quinine, Indometacin, Acetaminophen, Haloperidol, Naloxone, Mannitol, Betrixaban, Clomifene, Omadacycline, Grapiprant, Larotrectinib, Revefenacin, Tenofovir disoproxil, Tenofovir alafenamide, Tenofovir, Ledipasvir, Sildenafil, Vardenafil, Cabergoline, Prucalopride, Risperidone, Tramadol, Azithromycin, Fluconazole, Ranolazine, Cetirizine, Tegaserod, and Doxepin.

PIP2 or Phosphatidylinositol 4,5-bisphosphate

PIP2 is a phospholipid present at low levels in cells, but involved in various important cellular processes. Some of PIP2 cellular functions include regulation of endocytosis, exocytosis, phagocytosis, and cell signaling (Czech et al., 2000).

As used herein, "PIP2" refers to a phospholipid which binds to ABCB5.

Aspects of the invention is a method for augmentation of ABCB5/PIP2-dependent signaling in normal stem cells through ABCB5-PIP2 binding enhancers, to enhance ABCB5 normal stem cell function. Such method comprises administering to a subject in need thereof an effective amount of a composition that enhances ABCB5-PIP2 pathway, and assessing ABCB5-PIP2 binding following administration of the composition. In some embodiments, the composition comprises PIP2, a PIP2 agonist, a phospholipid, and [PIP2 (6:0/18:0)-H]⁻. In some embodiments, the composition comprises a phospholipid, comprising a compound having the structure:

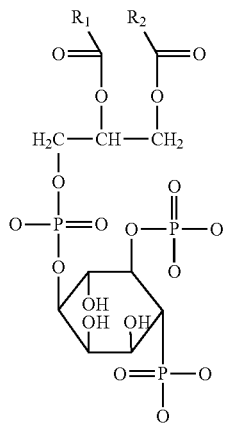

In some embodiments, R1 and R2 are independent fatty acid chains. In some embodiments, R1 and R2 has a length that is at least twice as long as the other of R1 and R2. In some embodiments, the structure has a total fatty acid chain of 22:0-26:0. In some embodiments, the structure has a total fatty acid chain of 22:0, 23:0, 24:0, 25:0, or 26:0. In some embodiments of the invention, the composition is administered to a healthy subject. The subject may be a human or a non-human animal comprising a goat, sheep, bison, camel, cow, pig, rabbit, buffalo, horse, rat, mouse, cat, dog, llama, or primate, e.g., monkey. In some embodiments, the composition is used in a subject to promotes wound healing, tissue regeneration, angiogenesis, and cell survival, to decrease aging, and to suppresses cell death. In some embodiments of the invention, the composition is administered by oral, intravenous, subcutaneous, topical, parenteral, intratumoral, intramuscular, intranasal, intracranial, sublingual, intratracheal, ocular, or intrathecal route. In some embodiments, the composition further comprises a pharmaceutically acceptable carrier.

Figure 12:
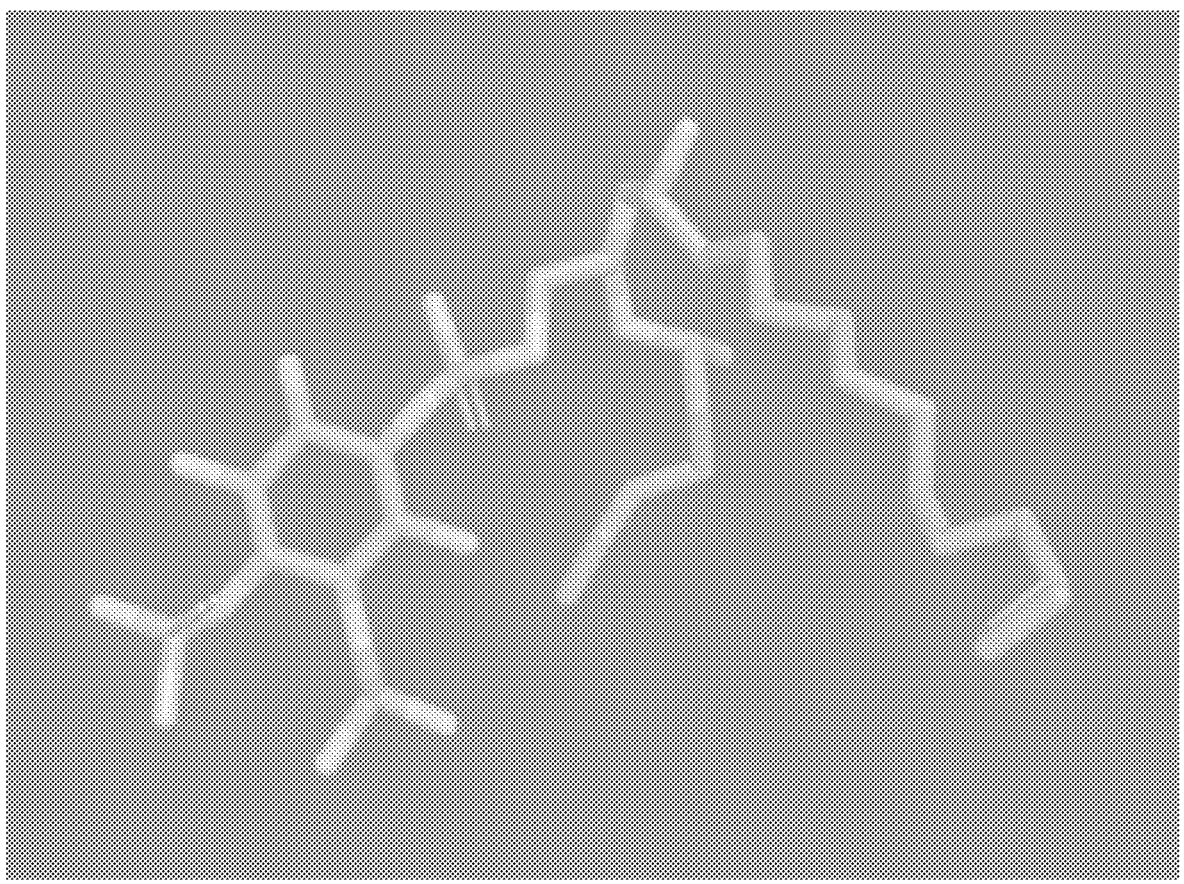
FIG. 12. The compound structure of a PIP2 agonist.

In some embodiments, the composition comprises a PIP2 agonist. In some embodiments, the composition comprises the compound structure shown in FIG. 12.

One advantage of the methods of the invention is that it allows for selective targeting of tissues that have ABCB5 expressing stem cells. While existing therapies that target tyrosine kinase pathways have potential for broad side effects, the methods which target ABCB5/PIP2 binding (enhancers or inhibitors) that also modulate PI3K signaling, would be restricted in their effect to cellular subsets that also express ABCB5. Thus the methods should provide for lower rates of potential side effects. ABCB5 targeting may be employed as either a stand-alone therapeutic approach to disseminated disease, or as an adjunctive therapy to sensitize cancer cells to chemotherapeutic agents, especially in those patients with currently refractory metastatic disease.

Aspects of the invention relate to a method for inhibition of ABCB5-PIP2 binding through inhibitory molecules comprised in a composition, to inhibit ABCB5-dependent cancer stem cell function. Such method represents a functional blockade of ABCB5 and further comprises assessing ABCB5-PIP2 binding following administration of the composition. In some embodiments, the composition inhibits PI3K pathway, and suppresses tumorigenesis, metastasis and/or resistance to drugs that modulate PI3K signaling, for example, melanoma resistance to vemurafenib that is mediated by PI3K signaling, or cancer resistance to EGFR inhibitors that is mediated through upregulation of ABCB5-enhanced PI3K signaling.

In some embodiments, the composition comprises a PIP2 antagonist. In some embodiments, the composition is selected from a group comprising a small molecule, a lipid analog, an anti-ABCB5 antibody or ABCB5-binding fragment having specificity for the cyclical form or the linear form of an extracellular polypeptide of the protein, and an enzyme. In some embodiments, the composition comprises an ABCB5 antibody or ABCB5-binding fragment having specificity for the cyclical form or the linear form of an extracellular polypeptide of the ABCB5. In some embodiments, the composition comprises an ABCB5 antibody or ABCB5-binding fragment that alters the conformation of ABCB5 PIP2 binding site. In some embodiments, the ABCB5 antibody is selected for example from a list comprising, monoclonal antibodies, polyclonal antibodies, human antibodies, chimeric antibodies, humanized antibodies, single-chain antibodies, F(ab') 2, Fab, Fd, Fv or single-chain Fv fragments. In some embodiments, the ABCB5 antibody is a human anti-ABCB5 antibody or ABCB5-binding fragment that binds to an extracellular loop of a three dimensional configuration of ABCB5. In some embodiments the human anti-ABCB5 antibody is subjected to an affinity maturation to recognize and bind specifically to the extracellular loop of a non-linear form of ABCB5. The human anti-ABCB5 antibody or ABCB5-binding fragment described herein has a sequence that corresponds to an antibody preparable by a method comprising affinity maturation to bind specifically to the extracellular loop of a non-linear form of the ABCB5.

Aspects of the invention relate to the generation (for example preparation) of a human anti-ABCB5 antibody or ABCB5-binding fragment that inhibits ABCB5-PIP2 pathway. In some embodiments, the anti-ABCB5 antibody or ABCB5-binding fragment is subjected to affinity maturation to bind specifically to the extracellular loop of a non-linear form of the protein. The affinity maturation process may occur by: a. phage display, yeast display or ribosome display; or b. a panning technique. For instance, once antibodies have been raised to the linear extracellular loop peptide, by presenting and allowing the peptide protein to undergo processing by an antigen presenting cell, the resulting antibodies can be matured using a display approach.

In some embodiments of the invention, the composition is administered to a healthy subject.

In some embodiments, the subject may be a human or a non-human animal comprising a goat, sheep, bison, camel, cow, pig, rabbit, buffalo, horse, rat, mouse, cat, dog, llama, or primate, e.g., monkey. In some embodiments of the invention, the composition inhibits drug resistance, cell survival, epithelial to mesenchymal transition (EMT), and metastasis, and promotes cell death. In some embodiments of the invention, the composition is administered by oral, intravenous, subcutaneous, topical, parenteral, intratumoral, intramuscular, intranasal, intracranial, sublingual, intratracheal, ocular, or intrathecal route.

Aspects of the invention relate to a method for inhibition of ABCB5-dependent cancer stem cell function through administering to a subject in need thereof an effective amount of a composition that inhibits ABCB5-PIP2 binding. Such method represents a functional blockade of ABCB5 and further comprises assessing ABCB5-PIP2 binding following administration of the composition. In some embodiments, the composition inhibits PI3K pathway, and suppresses tumorigenesis, metastasis and/or resistance to drugs that modulate PI3K signaling, for example, melanoma resistance to vemurafenib that is mediated by PI3K signaling, or cancer resistance to EGFR inhibitors that is mediated through upregulation of ABCB5-enhanced PI3K signaling.

In some embodiments, the composition comprises a PIP2 antagonist. In some embodiments, the composition is selected from a group comprising a small molecule, a lipid analog, an anti-ABCB5 antibody or ABCB5-binding fragment having specificity for the cyclical form or the linear form of an extracellular polypeptide of the protein, and an enzyme. In some embodiments, the composition comprises an ABCB5 antibody or ABCB5-binding fragment having specificity for the cyclical form or the linear form of an extracellular polypeptide of the ABCB5. In some embodiments, the composition comprises an ABCB5 antibody or ABCB5-binding fragment that alters the conformation of ABCB5 PIP2 binding site. In some embodiments of the invention, the composition is administered to a healthy subject.

In some embodiments, the subject may be a human or a non-human animal comprising a goat, sheep, bison, camel, cow, pig, rabbit, buffalo, horse, rat, mouse, cat, dog, llama, or primate, e.g., monkey. In some embodiments of the invention, the composition inhibits drug resistance, cell survival, epithelial to mesenchymal transition (EMT), and metastasis, and promotes cell death. In some embodiments of the invention, the composition is administered by oral, intravenous, subcutaneous, topical, parenteral, intratumoral, intramuscular, intranasal, intracranial, sublingual, intratracheal, ocular, or intrathecal route.

In an aspect, the invention is useful as a screening tool in a method for the discovery of molecular compounds that inhibit or enhance ABCB5-PIP2 binding, thus representing functional ABCB5 blockers or enhancers. Such compounds include lipid analogs, PIP2 or PIP2 agonist, small molecule drugs such as PSC833, as well as a new subset of ABCB5 inhibitory monoclonal antibodies that bind to ABCB5 and block PIP2 binding through induced steric alterations of the molecule, and inhibit pAKT phosphorylation and downstream signaling/effector pathways. The method of the invention further comprises contacting an ABCB5+ cell with a putative composition comprising a compound that modulates ABCB5-PIP2 binding, determining a level of a PIP2 pathway product compound. If the level is greater than the baseline level, the putative composition is an ABCB5-PIP2 pathway enhancer and if the level of PIP2 pathway compound is lower than the baseline level, the putative composition is an ABCB5-PIP2 inhibitor. In some embodiments, the PIP2 pathway product compound is PIP3, or a compound member of the PI3K pathway. A "baseline level" as used herein refers to a level of a PIP2 pathway product compound of a sample that was not exposed to the putative composition comprising a compound that modulates ABCB5-PIP2 binding.

Aspects of the invention disclose a novel phospholipid analog of PIP2 that has been characterized by mass spectrometry. The PIP2 analog has a fatty acid chain composition that represents a novel endogenously occurring PIP2 variant compound (formula $C_{33}H_{65}O_{19}P_3$, PIP2 with total fatty acid chain of 24:0, identified as [PIP2 (6:0/18:0)-H]). This analog is specifically enriched in ABCB5 knockout cells, demonstrating that ABCB5 is functionally required for efficient PIP2 conversion.

PIP2 has the chemical formula: $C_{47}H_{80}O_{19}P_3$ and the following structure:

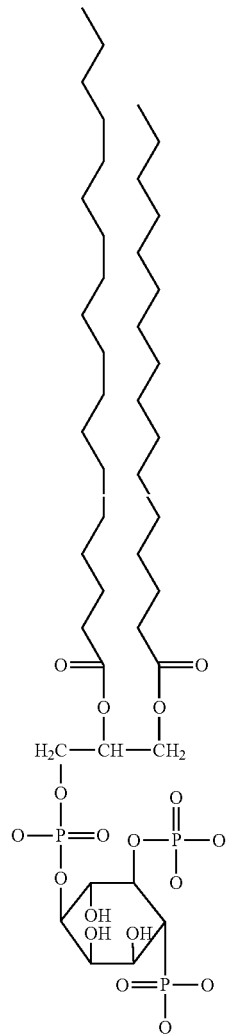

In other aspects the invention is a novel compound that is a functional analog of PIP2 and having the structure [PIP2 (6:0/18:0)-H]⁻ with the formula $C_{33}H_{65}O_{19}P_3$ and total fatty acid chain of 24:0. In some embodiments, the compound inhibits ABCB5-PIP2 pathway. In some embodiments of the invention, the compound inhibits drug resistance, cell survival, epithelial to mesenchymal transition (EMT), and metastasis, and promotes cell death.

In some aspects the invention is a compound having the structure:

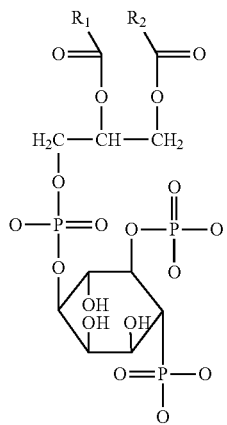

Wherein R1 and R2 are independently fatty acid chains, such that the structure has a total fatty acid chain of 22:0-26:0, and wherein one of $R_1$ and $R_2$ has a length that is at least twice as long as the other of $R_1$ and $R_2$. In some embodiments, the structure has a total fatty acid chain of 22:0, 23:0, 24:0, 25:0, or 26:0. In some embodiments, the compound inhibits ABCB5-PIP2 pathway. In some embodiments of the invention, the compound inhibits drug resistance, cell survival, epithelial to mesenchymal transition (EMT), and metastasis, and promotes cell death.

In some aspects the invention is a method for a screening for ABCB5 antagonists and enhancers using one of the novel compositions of the invention or PIP2 or other PIP2 analogs. The method of the invention further comprises contacting an ABCB5+ cell with a putative composition that modulates ABCB5-PIP2 binding, determining a level of a PIP2 pathway product compound. If the level is greater than the baseline level, the putative composition is an ABCB5-PIP2 pathway enhancer and if the level of PIP2 pathway product compound is lower than the baseline level, the putative composition is an ABCB5-PIP2 inhibitor. In some embodiments, the PIP2 pathway compound is PIP3, or a compound member of the PI3K pathway.

In some embodiments, the ABCB5+ cell comprises an ABCB5 isoform 1 that has a lysine at amino acid position 970. In some embodiments, the ABCB5+ cell comprises an ABCB5 isoform 2 that has a lysine at amino acid position 525. ABCB5 expressing this SNP is found most frequently in human cancers.

In other aspects the compositions are tools for such screening assays.

In other aspects the invention is a method for use of the novel compositions or PIP2 or other PIP2 analogs as therapeutic compounds to enhance ABCB5-dependent stem cell functions when exogenously administered.

Effective Amount

In the methods described herein, the terms "effective amount" refers to an amount of the composition that can realize a desired therapeutic effect, for examples enhancing or suppressing ABCB5-PIP2 pathway.

In some embodiments, the composition comprises PIP2, a PIP2 agonist, a PIP2 antagonist, a phospholipid, or [PIP2 (6:0/18:0)-H]$^-$. In some embodiments, the composition comprises PIP2. In some embodiments, the amount of PIP2 in the composition is between 1 and 100%. In some embodiments, the PIP2 amount in the composition is at least 1%, at least 20%, at least 30%, at least 40%, at least 50%, at least 60%, at least 70%, at least 80%, at least 90%, or at least 95% or more. In some embodiments, the composition comprises a PIP2 agonist. In some embodiments, the amount of the PP2 agonist in the composition is between 1 and 100%. In some embodiments, the PIP2 agonist amount in the composition is at least 1%, at least 20%, at least 30%, at least 40%, at least 50%, at least 60%, at least 70%, at least 80%, at least 90%, or at least 95% or more.

In some embodiments, the composition comprises a PIP2 antagonist. In some embodiments, the amount of the PIP2 antagonist in the composition is between 1 and 100%. In some embodiments, the PIP2 antagonist amount in the composition is at least 1%, at least 20%, at least 30%, at least 40%, at least 50%, at least 60%, at least 70%, at least 80%, at least 90%, or at least 95% or more.

In some embodiments, the composition comprises a phospholipid. In some embodiments, the amount of the phospholipid in the composition is between 1 and 100%. In some embodiments, the phospholipid amount in the composition is at least 1%, at least 20%, at least 30%, at least 40%, at least 50%, at least 60%, at least 70%, at least 80%, at least 90%, or at least 95% or more. In some embodiments, the composition comprises [PIP2 (6:0/18:0)-H]$^-$. In some embodiments, the amount of [PIP2 (6:0/18:0)-H]$^-$ in the composition is between 1 and 100%. In some embodiments, the [PIP2 (6:0/18:0)-H]$^-$ amount in the composition is at least 1%, at least 20%, at least 30%, at least 40%, at least 50%, at least 60%, at least 70%, at least 80%, at least 90%, or at least 95% or more.

Pharmaceutical Compositions

The compounds, antibodies, as well as the encoding nucleic acids or nucleic acid sets, vectors comprising such, or host cells comprising the vectors, as described herein can be mixed with a pharmaceutically acceptable carrier (excipient) to form a pharmaceutical composition for use in treating a target disease. "Acceptable" means that the carrier must be compatible with the active ingredient of the composition (and preferably, capable of stabilizing the active ingredient) and not deleterious to the subject to be treated. Pharmaceutically acceptable excipients (carriers) including buffers, which are well known in the art. See, e.g., Remington: The Science and Practice of Pharmacy 20th Ed. (2000) Lippincott Williams and Wilkins, Ed. K. E. Hoover.

The pharmaceutical compositions to be used in the present methods can comprise pharmaceutically acceptable carriers, excipients, or stabilizers in the form of lyophilized formulations or aqueous solutions. (Remington: The Science and Practice of Pharmacy 20th Ed. (2000) Lippincott Williams and Wilkins, Ed. K. E. Hoover). Acceptable carriers, excipients, or stabilizers are nontoxic to recipients at the dosages and concentrations used, and may comprise buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrans; chelating agents such as EDTA; sugars such as sucrose, mannitol, trehalose or sorbitol; salt-forming counter-ions such as sodium; metal complexes (e.g. Zn-protein complexes); and/or non-ionic surfactants such as TWEEN™, PLURON-ICS™ or polyethylene glycol (PEG).

In some examples, the pharmaceutical composition described herein comprises liposomes containing the compounds or antibodies (or the encoding nucleic acids) which can be prepared by methods known in the art, such as described in Epstein, et al., Proc. Natl. Acad. Sci. USA 82:3688 (1985); Hwang, et al., Proc. Natl. Acad. Sci. USA 77:4030 (1980); and U.S. Pat. Nos. 4,485,045 and 4,544,545. Liposomes with enhanced circulation time are disclosed in U.S. Pat. No. 5,013,556. Particularly useful liposomes can be generated by the reverse phase evaporation method with a lipid composition comprising phosphatidylcholine, cholesterol and PEG-derivatized phosphatidylethanolamine (PEG-PE). Liposomes are extruded through filters of defined pore size to yield liposomes with the desired diameter.

The compounds or antibodies, or the encoding nucleic acid(s), may also be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nano-particles and nanocapsules) or in macroemulsions. Such techniques are known in the art, see, e.g., Remington, The Science and Practice of Pharmacy 20th Ed. Mack Publishing (2000).

In other examples, the pharmaceutical composition described herein can be formulated in sustained-release format. Suitable examples of sustained-release preparations include semipermeable matrices of solid hydrophobic polymers containing the compounds or antibody, which matrices are in the form of shaped articles, e.g. films, or microcapsules. Examples of sustained-release matrices include polyesters, hydrogels (for example, poly(2-hydroxyethyl-methacrylate), or poly(v nylalcohol)), polylactides (U.S. Pat. No. 3,773,919), copolymers of L-glutamic acid and 7 ethyl-L-glutamate, non-degradable ethylene-vinyl acetate, degradable lactic acid-glycolic acid copolymers such as the LUPRON DEPOT™ (injectable microspheres composed of lactic acid-glycolic acid copolymer and leuprolide acetate), sucrose acetate isobutyrate, and poly-D-(−)-3-hydroxybutyric acid.

In other examples, the pharmaceutical composition described herein can be formulated in a sustained release format, which affects binding selectively to tissue or tumors by implementing certain protease biology technology, for example, by peptide masking of an antibody's antigen binding site to allow selective protease cleavability by one or multiple proteases in the tumor microenvironment, such as Probody™ or Conditionally Active Biologics™. An activation may be formulated to be reversible in a normal microenvironment.

The pharmaceutical compositions to be used for in vivo administration must be sterile. This is readily accomplished by, for example, filtration through sterile filtration membranes. Therapeutic compounds or antibody compositions are generally placed into a container having a sterile access port, for example, an intravenous solution bag or vial having a stopper pierceable by a hypodermic injection needle.

The pharmaceutical compositions described herein can be in unit dosage forms such as tablets, pills, capsules, powders, granules, solutions or suspensions, or suppositories, for oral, parenteral or rectal administration, or administration by inhalation or insufflation. For preparing solid compositions such as tablets, the principal active ingredient can be mixed with a pharmaceutical carrier, e.g., conventional tableting ingredients such as corn starch, lactose, sucrose, sorbitol, talc, stearic acid, magnesium stearate, dicalcium phosphate or gums, and other pharmaceutical diluents, e.g., water, to form a solid preformulation composition containing a homogeneous mixture of a compound of the present invention, or a non-toxic pharmaceutically acceptable salt thereof. When referring to these preformulation compositions as homogeneous, it is meant that the active ingredient is dispersed evenly throughout the composition so that the composition may be readily subdivided into equally effective unit dosage forms such as tablets, pills and capsules. This solid preformulation composition is then subdivided into unit dosage forms of the type described above containing from 0.1 to about 500 mg of the active ingredient of the present invention. The tablets or pills of the novel composition can be coated or otherwise compounded to provide a dosage form affording the advantage of prolonged action. For example, the tablet or pill can comprise an inner dosage and an outer dosage component, the latter being in the form of an envelope over the former. The two components can be separated by an enteric layer that serves to resist disintegration in the stomach and permits the inner component to pass intact into the duodenum or to be delayed in release. A variety of materials can be used for such enteric layers or coatings, such materials including a number of polymeric acids and mixtures of polymeric acids with such materials as shellac, cetyl alcohol and cellulose acetate.

Suitable surface-active agents include, in particular, non-ionic agents, such as polyoxyethylenesorbitans (e.g., Tween™ 20, 40, 60, 80 or 85) and other sorbitans (e.g., Span™ 20, 40, 60, 80 or 85). Compositions with a surface-active agent will conveniently comprise between 0.05 and 5% surface-active agent, and can be between 0.1 and 2.5%. It will be appreciated that other ingredients may be added, for example mannitol or other pharmaceutically acceptable vehicles, if necessary.

Suitable emulsions may be prepared using commercially available fat emulsions, such as Intralipid™, Liposyn™, Infonutrol™, Lipofundin™ and Lipiphysan™. The active ingredient may be either dissolved in a pre-mixed emulsion composition or alternatively it may be dissolved in an oil (e.g., soybean oil, safflower oil, cottonseed oil, sesame oil, corn oil or almond oil) and an emulsion formed upon mixing with a phospholipid (e.g., egg phospholipids, soybean phospholipids or soybean lecithin) and water. It will be appreciated that other ingredients may be added, for example glycerol or glucose, to adjust the tonicity of the emulsion. Suitable emulsions will typically contain up to 20% oil, for example, between 5 and 20%. The fat emulsion can comprise fat droplets between 0.1 and 1.0.im, particularly 0.1 and 0.5.im, and have a pH in the range of 5.5 to 8.0.

The emulsion compositions can be those prepared by mixing a compound or an antibody with Intralipid™ or the components thereof (soybean oil, egg phospholipids, glycerol and water).

Pharmaceutical compositions for inhalation or insufflation include solutions and suspensions in pharmaceutically acceptable, aqueous or organic solvents, or mixtures thereof, and powders. The liquid or solid compositions may contain suitable pharmaceutically acceptable excipients as set out above. In some embodiments, the compositions are administered by the oral or nasal respiratory route for local or systemic effect.

Compositions in preferably sterile pharmaceutically acceptable solvents may be nebulized by use of gases. Nebulized solutions may be breathed directly from the nebulizing device or the nebulizing device may be attached to a face mask, tent or intermittent positive pressure breathing machine. Solution, suspension or powder compositions may be administered, preferably orally or nasally, from devices which deliver the formulation in an appropriate manner.

Therapeutic Applications

Any of the compounds or antibodies, as well as the encoding nucleic acids or nucleic acid sets, vectors comprising such, or host cells comprising the vectors, described herein are useful for treating cancer, inflammation, infectious diseases, or other malignancies requiring stimulation of the immune response.

To practice the method disclosed herein, an effective amount of the pharmaceutical composition described herein can be administered to a subject (e.g., a human) in need of the treatment via a suitable route, such as intravenous administration, e.g., as a bolus or by continuous infusion over a period of time, by intramuscular, intraperitoneal, intracerebrospinal, subcutaneous, intra-articular, intrasynovial, intrathecal, oral, inhalation or topical routes. Commercially available nebulizers for liquid formulations, including jet nebulizers and ultrasonic nebulizers are useful for administration. Liquid formulations can be directly nebulized and lyophilized powder can be nebulized after reconstitution. Alternatively, the compounds or antibodies as described herein can be aerosolized using a fluorocarbon formulation and a metered dose inhaler, or inhaled as a lyophilized and milled powder.

The subject to be treated by the methods described herein may be a human patient having, at risk for, or suspected of having cancer, or other malignancies requiring stimulation of the immune response. A subject having a target disease or disorder can be identified by routine medical examination, e.g., laboratory tests, organ functional tests, CT scans, or ultrasounds. A subject suspected of having any of such target disease/disorder might show one or more symptoms of the disease/disorder. A subject at risk for the disease/disorder can be a subject having one or more of the risk factors for that disease/disorder.

The methods and compositions described herein may be used to treat cancer. Examples of cancers that may be treated with the methods and compositions described herein include, but are not limited to: lung cancer, melanoma, renal cancer, liver cancer, myeloma, prostate cancer, breast cancer, colorectal cancer, gastric cancer, pancreatic cancer, thyroid cancer, hematological cancer, lymphoma, leukemia, skin cancer, ovarian cancer, bladder cancer, urothelial carcinoma, head and neck cancer, metastatic lesion(s) of the cancer, and all types of cancer which are diagnosed for high mutational burden. In a particular embodiment, the cancer has a high mutation burden. Subjects having or at risk for various cancers can be identified by routine medical procedures.

In some examples, the human patient has microsatellite instability-high (MSI-H) or mismatch repair deficient (dMMR), found in soft tissue cancer, glioblastoma, esophageal and EGJ carcinoma, breast carcinoma, non-small cell lung cancer, ovarian surface epithelial carcinomas, cancer of unknown primary, small cell lung cancer, non-epithelial ovarian cancer, pancreatic adenocarcinoma, other female genital tract malignancies, uveal melanoma, retroperitoneal or peritoneal sarcoma, thyroid carcinoma, uterine sarcoma, cholangiocarcinoma, prostate adenocarcinoma, hepatocellular carcinoma, neuroendocrine tumors, cervical cancer, colorectal adenocarcinoma, small intestinal malignancies, gastric adenocarcinoma and endometrial cancer.

Effective amounts vary, as recognized by those skilled in the art, depending on the particular condition being treated, the severity of the condition, the individual patient parameters including age, physical condition, size, gender and weight, the duration of the treatment, the nature of concurrent therapy (if any), the specific route of administration and like factors within the knowledge and expertise of the health practitioner. Empirical considerations, such as the half-life, generally will contribute to the determination of the dosage. For example, antibodies that are compatible with the human immune system, such as humanized antibodies or fully human antibodies, may be used to prolong half-life of the antibody and to prevent the antibody being attacked by the host's immune system. Frequency of administration may be determined and adjusted over the course of therapy, and is generally, but not necessarily, based on treatment and/or suppression and/or amelioration and/or delay of a target disease/disorder. Alternatively, sustained continuous release formulations of an antibody may be appropriate. Various formulations and devices for achieving sustained release are known in the art.

In one example, dosages for a compound or an antibody as described herein may be determined empirically in individuals who have been given one or more administration(s) of the compound or antibody. Individuals are given incremental dosages of the compound. To assess efficacy of the compound, an indicator of the disease/disorder can be followed.

Generally, for administration of any of the compounds or antibodies described herein, an initial candidate dosage can be about 2 mg/kg. For the purpose of the present disclosure, a typical daily, weekly, every two weeks, or every three weeks dosage might range from about any of 0.1 µg/kg to 3 µg/kg to 30 µg/kg to 100 µg/kg to 300 µg/kg to 0.6 mg/kg, 1 mg/kg, 3 mg/kg, to 10 mg/kg, to 30 mg/kg to 100 mg/kg or more, depending on the factors mentioned above. For repeated administrations over several days, weeks, months, or longer, depending on the condition, the treatment is sustained until a desired suppression of symptoms occurs or until sufficient therapeutic levels are achieved to alleviate a target disease or disorder, or a symptom thereof. An exemplary dosing regimen comprises administering an initial dose of about 3 mg/kg every 3 weeks, followed by a maintenance dose of about 1 mg/kg of the compound or antibody once in 6 weeks, or followed by a maintenance dose of about 1 mg/kg every 3 weeks. However, other dosage regimens may be useful, depending on the pattern of pharmacokinetic decay that the practitioner wishes to achieve. For example, dosing of 1 mg/kg once in every 3 weeks in combination treatment with at least one additional immune therapy agent is contemplated. In some embodiments, dosing ranging from about 3 µg/mg to about 3 mg/kg (such as about 3 µg/mg, about 10 µg/mg, about 30 µg/mg, about 100 µg/mg, about 300 µg/mg, about 1 mg/kg, and about 3 mg/kg) may be used. In some embodiments, dosing frequency is once every week, every 2 weeks, every 3 weeks, every 4 weeks, every 5 weeks, every 6 weeks, every 7 weeks, every 8 weeks, every 9 weeks, or every 10 weeks; or once every month, every 2 months, or every 3 months, or longer. The progress of this therapy is easily monitored by conventional techniques and assays. The dosing regimen (including the compound or antibody used) can vary over time.

In some embodiments, for an adult patient of normal weight, doses ranging from about 0.1 to 5.0 mg/kg may be administered. In some examples, the dosage described herein can be 10 mg/kg. The particular dosage regimen, i.e., dose, timing and repetition, will depend on the particular individual and that individual's medical history, as well as the properties of the individual agents (such as the half-life of the agent, and other considerations well known in the art).

For the purpose of the present disclosure, the appropriate dosage of a compound or antibody as described herein will depend on the specific compound or antibody, antibodies, and/or non-antibody peptide (or compositions thereof) employed, the type and severity of the disease/disorder, whether the compound or antibody is administered for preventive or therapeutic purposes, previous therapy, the patient's clinical history and response to the antagonist, and the discretion of the attending physician. Typically the clinician will administer a compound or an antibody, until a dosage is reached that achieves the desired result. In some embodiments, the desired result is a reduction of the size of the tumor, increased progression-free survival period and/or overall survival. Methods of determining whether a dosage resulted in the desired result would be evident to one of skill in the art. Administration of one or more compounds or antibodies can be continuous or intermittent, depending, for example, upon the recipient's physiological condition, whether the purpose of the administration is therapeutic or prophylactic, and other factors known to skilled practitioners. The administration of a compound or an antibody may be essentially continuous over a preselected period of time or may be in a series of spaced dose, e.g., either before, during, or after developing a target disease or disorder.

As used herein, the term "treating" refers to the application or administration of a composition including one or more active agents to a subject, who has a target disease or disorder, a symptom of the disease/disorder, or a predisposition toward the disease/disorder, with the purpose to cure, heal, alleviate, relieve, alter, remedy, ameliorate, improve, or affect the disorder, the symptom of the disease, or the predisposition toward the disease or disorder. Alleviating a target disease/disorder includes delaying the development or progression of the disease, or reducing disease severity. Treatment decreases the likelihood that the subject will develop the disease as well as a treatment after the subject has developed the disease in order to fight the disease, prevent the disease from becoming worse, or slow the progression of the disease compared to in the absence of the therapy.

Alleviating the disease does not necessarily require curative results. As used therein, "delaying" the development of a target disease or disorder means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of a target disease or disorder includes initial onset and/or recurrence.

In some embodiments, the compounds or antibodies described herein are administered to a subject in need of the treatment at an amount sufficient to inhibit the activity of ABCB5 or other products in the ABCB5-PIP2 pathway by at least 20% (e.g., 30%, 40%, 50%, 60%, 70%, 80%, 90% or greater) in vivo. In other embodiments, the compound or antibody is administered in an amount effective in reducing the activity level of ABCB5 or other products in the ABCB5-PIP2 pathway by at least 20% (e.g., 30%, 40%, 50%, 60%, 70%, 80%, 90% or greater).

Conventional methods, known to those of ordinary skill in the art of medicine, can be used to administer the pharmaceutical composition to the subject, depending upon the type of disease to be treated or the site of the disease. This composition can also be administered via other conventional routes, e.g., administered parenterally, topically, orally, by inhalation spray, rectally, nasally, buccally, vaginally or via an implanted reservoir. The term "parenteral" as used herein includes subcutaneous, intracutaneous, intravenous, intraperitoneal, intratumor, intramuscular, intraarticular, intraarterial, intrasynovial, intrasternal, intrathecal, intralesional, and intracranial injection or infusion techniques. In addition, it can be administered to the subject via injectable depot routes of administration such as using 1-, 3-, or 6-month depot injectable or biodegradable materials and methods. In some examples, the pharmaceutical composition is administered intraocularly or intravitreally.

Injectable compositions may contain various carriers such as vegetable oils, dimethylactamide, dimethyformamide, ethyl lactate, ethyl carbonate, isopropyl myristate, ethanol, and polyols (glycerol, propylene glycol, liquid polyethylene glycol, and the like). For intravenous injection, water soluble compounds or antibodies can be administered by the drip method, whereby a pharmaceutical formulation containing the compounds or antibody and a physiologically acceptable excipient is infused. Physiologically acceptable excipients may include, for example, 5% dextrose, 0.9% saline, Ringer's solution or other suitable excipients. Intramuscular preparations, e.g., a sterile formulation of a suitable soluble salt form of the compounds or antibody, can be dissolved and administered in a pharmaceutical excipient such as Water-for-Injection, 0.9% saline, or 5% glucose solution.

In one embodiment, a compound or an antibody is administered via site-specific or targeted local delivery techniques. Examples of site-specific or targeted local delivery techniques include various implantable depot sources of the compounds or antibody or local delivery catheters, such as infusion catheters, an indwelling catheter, or a needle catheter, synthetic grafts, adventitial wraps, shunts and stents or other implantable devices, site specific carriers, direct injection, or direct application. See, e.g., PCT Publication No. WO 00/53211 and U.S. Pat. No. 5,981,568.

Targeted delivery of therapeutic compositions containing an antisense polynucleotide, expression vector, or subgenomic polynucleotides can also be used. Receptor-mediated DNA delivery techniques are described in, for example, Findeis et al., Trends Biotechnol. (1993) 11:202; Chiou et al., Gene Therapeutics: Methods and Applications of Direct Gene Transfer (J. A. Wolff, ed.) (1994); Wu et al., J. Biol. Chem. (1988) 263:621; Wu et al., J. Biol. Chem. (1994) 269:542; Zenke et al., Proc. Natl. Acad. Sci. USA (1990) 87:3655; Wu et al., J. Biol. Chem. (1991) 266:338.

Therapeutic compositions containing a polynucleotide (e.g., those encoding the antibodies or other proteins described herein) are administered in a range of about 100 ng to about 200 mg of DNA for local administration in a gene therapy protocol. In some embodiments, concentration ranges of about 500 ng to about 50 mg, about 1 µg to about 2 mg, about 5 µg to about 500 µg, and about 20 µg to about 100 µg of DNA or more can also be used during a gene therapy protocol.

The therapeutic polynucleotides and polypeptides described herein can be delivered using gene delivery vehicles. The gene delivery vehicle can be of viral or non-viral origin (see generally, Jolly, Cancer Gene Therapy (1994) 1:51; Kimura, Human Gene Therapy (1994) 5:845; Connelly, Human Gene Therapy (1995) 1:185; and Kaplitt, Nature Genetics (1994) 6:148). Expression of such coding sequences can be induced using endogenous mammalian or heterologous promoters and/or enhancers. Expression of the coding sequence can be either constitutive or regulated.

Viral-based vectors for delivery of a desired polynucleotide and expression in a desired cell are well known in the art. Exemplary viral-based vehicles include, but are not limited to, recombinant retroviruses (see, e.g., PCT Publication Nos. WO 90/07936; WO 94/03622; WO 93/25698; WO 93/25234; WO 93/11230; WO 93/10218; WO 91/02805; U.S. Pat. Nos. 5,219,740 and 4,777,127; GB Patent No. 2,200,651; and EP Patent No. 0 345 242), alphavirus-based vectors (e.g., Sindbis virus vectors, Semliki forest virus (ATCC VR-67; ATCC VR-1247), Ross River virus (ATCC VR-373; ATCC VR-1246) and Venezuelan equine encephalitis virus (ATCC VR-923; ATCC VR-1250; ATCC VR 1249; ATCC VR-532)), and adeno-associated virus (AAV) vectors (see, e.g., PCT Publication Nos. WO 94/12649, WO 93/03769; WO 93/19191; WO 94/28938; WO 95/11984 and WO 95/00655). Administration of DNA linked to killed adenovirus as described in Curiel, Hum. Gene Ther. (1992) 3:147 can also be employed.

Non-viral delivery vehicles and methods can also be employed, including, but not limited to, polycationic condensed DNA linked or unlinked to killed adenovirus alone (see, e.g., Curiel, Hum. Gene Ther. (1992) 3:147); ligand-linked DNA (see, e.g., Wu, J. Biol. Chem. (1989) 264:16985); eukaryotic cell delivery vehicles cells (see, e.g., U.S. Pat. No. 5,814,482; PCT Publication Nos. WO 95/07994; WO 96/17072; WO 95/30763; and WO 97/42338) and nucleic charge neutralization or fusion with cell membranes. Naked DNA can also be employed. Exemplary naked DNA introduction methods are described in PCT Publication No. WO 90/11092 and U.S. Pat. No. 5,580,859. Liposomes that can act as gene delivery vehicles are described in U.S. Pat. No. 5,422,120; PCT Publication Nos. WO 95/13796; WO 94/23697; WO 91/14445; and EP Patent No. 0524968. Additional approaches are described in Philip, Mol. Cell. Biol. (1994) 14:2411, and in Woffendin, Proc. Natl. Acad. Sci. (1994) 91:1581.

The particular dosage regimen, i.e., dose, timing and repetition, used in the method described herein will depend on the particular subject and that subject's medical history.

In some embodiments, more than one compound or antibody, or a combination of a compound or an antibody and another suitable therapeutic agent, may be administered to a subject in need of the treatment. The compounds or antibody can also be used in conjunction with other agents that serve to enhance and/or complement the effectiveness of the agents.

Treatment efficacy for a target disease/disorder can be assessed by methods well-known in the art.

The treatment methods involving such as described in the present disclosure may be utilized in conjunction with other types of therapy for the target disease or disorder disclosed herein. Examples include chemotherapy, immune therapy (e.g. therapies involving therapeutic antibodies, antibodies, CAR T cells, or cancer vaccines), surgery, radiation, gene therapy, and so forth, or anti-infection therapy. Such therapies can be administered simultaneously or sequentially (in any order) with the treatment according to the present disclosure. In some instance, the target disease is cancer (e.g., those disclosed herein) and the conjunction therapy involves an immune checkpoint (e.g., inhibitory checkpoint) antagonist. Examples include PD-1/PD-L1 antagonists (e.g., nivolumab, pembrolizumab, avelumab, durvalumab and atezolizumab), LAG3 antagonists, TIM-3 antagonists, VISTA antagonists, TIGIT antagonists, CSFIR antagonists, CD112R (PVRIG) antagonists, PVR (CD155) antagonists, PD-L2 antagonists, A2AR antagonists, B7-H3 antagonists, B7-H4 antagonists or BTLA antagonists. Additional examples include activators that enhance the activity of stimulatory checkpoint such as CD122 (IL2) agonist, 4-1BB, ICOS ligand, GITR, and OX40.

Additional useful agents see also Physician's Desk Reference, 59.sup.th edition, (2005), Thomson P D R, Montvale N.J.; Gennaro et al., Eds. Remington's The Science and Practice of Pharmacy 20th edition, (2000), Lippincott Williams and Wilkins, Baltimore Md.; Braunwald et al., Eds. Harrison's Principles of Internal Medicine, 15.sup.th edition, (2001), McGraw Hill, NY; Berkow et al., Eds. The Merck Manual of Diagnosis and Therapy, (1992), Merck Research Laboratories, Rahway N.J.

When co-administered with an additional therapeutic agent, suitable therapeutically effective dosages for each agent may be lowered due to the additive action or synergy.

The efficacy of the methods described herein may be assessed by any method known in the art and would be evident to a skilled medical professional. For example, the efficacy of the antibody-based immunotherapy may be assessed by survival of the subject or cancer burden in the subject or tissue or sample thereof. In some embodiments, the methods are assessed based on the safety or toxicity of the therapy in the subject, for example by the overall health of the subject and/or the presence of adverse events or severe adverse events.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Unless otherwise defined herein, scientific and technical terms used in connection with the present disclosure shall have the meanings that are commonly understood by those of ordinary skill in the art. Further, unless required by context, singular terms shall include pluralities and plural terms shall include the singular. The methods and techniques of the present disclosure are generally performed according to conventional methods well-known in the art. Generally, nomenclature used in connection with, and techniques of biochemistry, enzymology, molecular and cellular biology, microbiology, genetics and protein and nucleic acid chemistry and hybridization described herein are those well-known and commonly used in the art. The methods and techniques of the present disclosure are generally performed according to conventional methods known in the art and as described in various general and more specific references that are cited and discussed throughout the present specification unless otherwise indicated.

The present invention is further illustrated by the following Examples, which in no way should be construed as further limiting. The entire contents of all of the references (including literature references, issued patents, published patent applications, and co pending patent applications) cited throughout this application are hereby expressly incorporated by reference.

EXAMPLES

Example 1: ABCB5 Promotes Tumor Invasion Through Regulation of AXL

Figure 8:
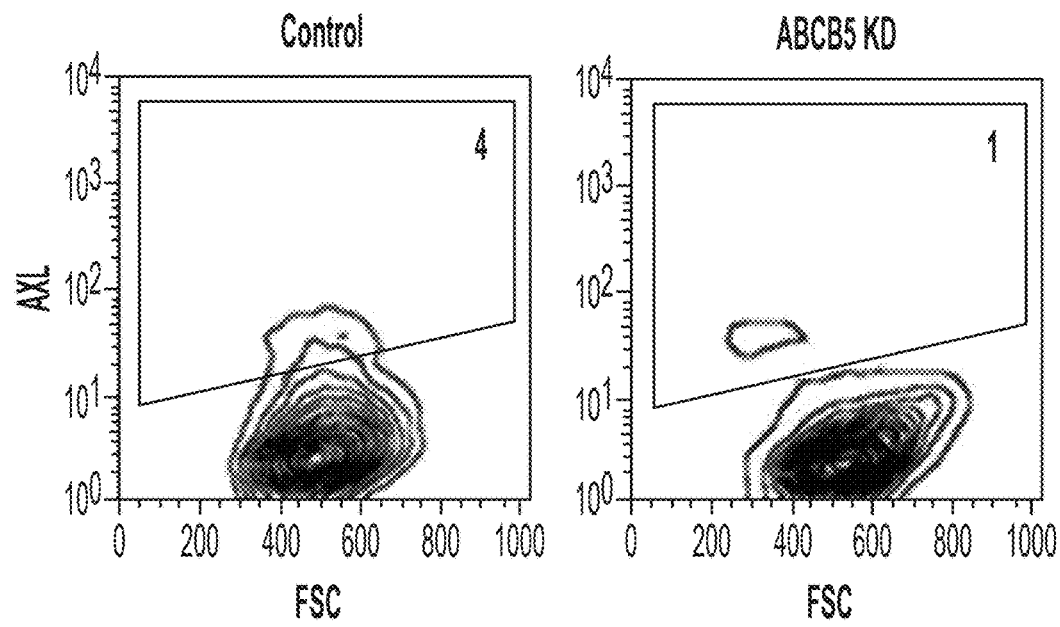
FIG. 8. ABCB5 (+) CRC cells express the EMT-sustaining receptor tyrosine kinase AXL, which serves as a mediator of ABCB5-dependent cancer invasion. A set of scatter plots depicting a representative flow cytometric analysis of AXL protein expression in an ABCB5 KD vs. a control-transfected cell line is shown. Also shown is a bar graph illustrating AXL mRNA expression in ABCB5 KD vs. control-transfected human CRC cells. A Western blot analyses of AXL, AKT and phospho-AKT protein expression in either anti-ABCB5 mAb treated or isotype control-treated CRC cells is also shown. Data were analyzed using unpaired t-tests. Error bars indicate s.e.m. * P<0.05,  P<0.01, * P<0.001.
Figure 8:
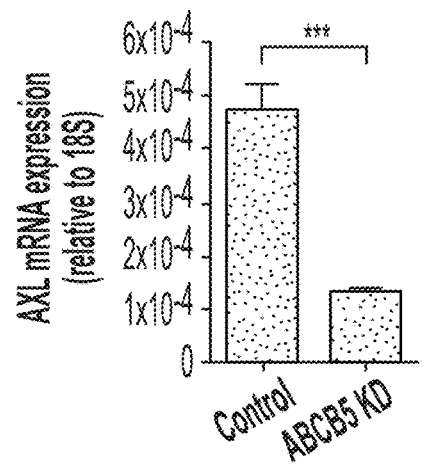
Figure 8:
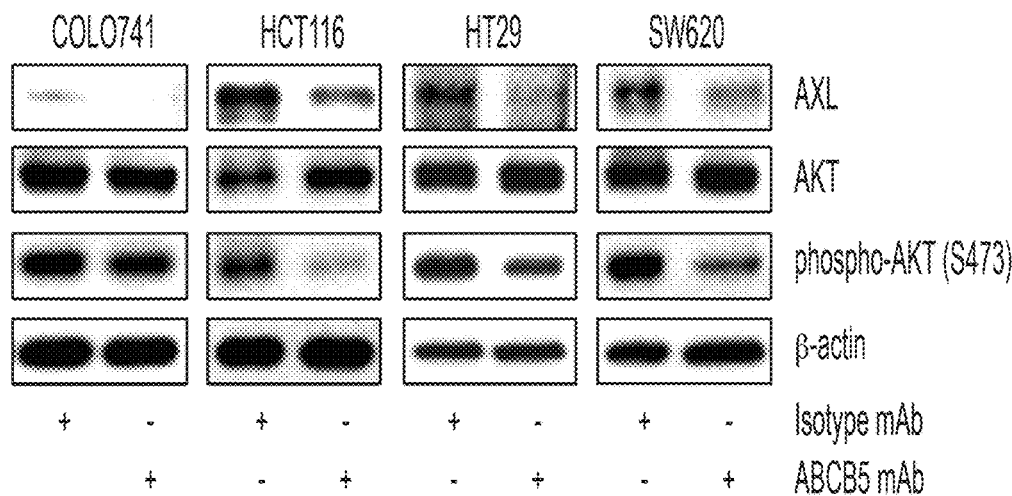

Recent studies have shown that the receptor tyrosine kinase AXL, which correlates with adverse colorectal cancer (CRC) prognosis, is responsible for EMT induction in other malignancies. It is shown herein that AXL mRNA expression was diminished in COLO741 ABCB5 KD CRC cell cultures by >90% and that AXL protein expression was reduced in these cells by >50% compared to control-transfected cells (FIG. 8). Furthermore, mAb-mediated ABCB5 blockade consistently inhibited expression of AXL in all of four CRC cell lines examined (COLO741, SW620, HT29 and HCT116, with ABCB5 (+) tumor cell frequencies ranging from 9% to 27%), as determined by Western Blot analysis (FIG. 8), and also inhibited, to a lesser degree, its downstream target phospho-AKT, demonstrating an important signaling pathway used by ABCB5+ cells. The functional relationship between ABCB5 and AXL was supported by significantly upregulated AXL expression at both mRNA and protein levels in untreated ABCB5 (+) cells sorted from all four cell lines by flow cytometry (FIG. 8).

Moreover, AXL expression (as determined at both mRNA and protein levels) and downstream signaling (p-AKT/AKT ratios) were enhanced in metastasis-derived COLO741MET-vs. parental COLO741 cells (FIG. 8).

Example 2: PIP2 and PIP3 are Natural In Vivo Binding Ligands of ABCB5 as Determined by Immunoprecipitation from Human Tissue Immunoprecipitation from human ABCB5-expressing melanoma cells of PIP2 using anti-PIP2 antibody pulldown revealed co-precipitation of ABCB5 protein, as shown by immunoblotting using ABCB5 monoclonal antibody in FIG. 1A (upper panel). PIP2 pulldown was confirmed using immunoblotting with PIP2 antibody in FIG. 1A (lower panel). Similarly, immunoprecipitation from human ABCB5-expressing melanoma cells of PIP3 using anti-PIP3 antibody pulldown revealed co-precipitation of ABCB5 protein, as shown by immunoblotting using ABCB5 monoclonal antibody in FIG. 1B. These data demonstrate that PIP2 and PIP3 are biological ligands for ABCB5, which serves as a receptor for PIP2 and PIP3.

Examples 3: PIP1, PIP2 and PIP3 Bind ABCB5 as Determined by ELISA

Figure 1C:
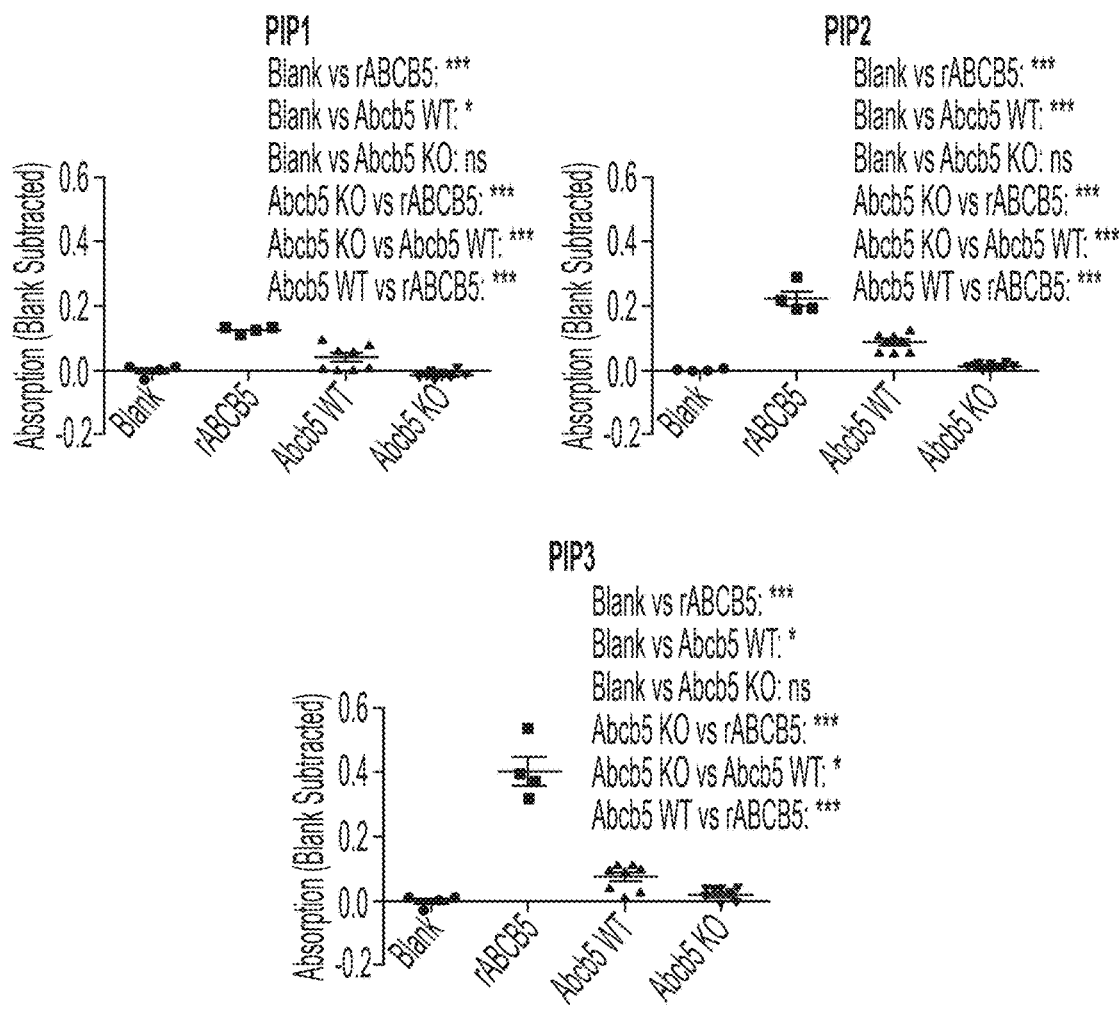

ELISA plates coated with PIP1, PIP2 or PIP3 were incubated with either purified recombinant human ABCB5 isoform 2 (812 aa, NCBI Reference Sequence: NP_848654.3), wildtype mouse Abcb5-expressing skin tissue, or Abcb5 non-expressing skin tissue derived from ABCB5 knockout mice (as a specificity control), followed by bound ABCB5 detection using a murine ABCB5-specific monoclonal antibody (Ksander et al Nature 2014). As shown in FIG. 1C, all of PIP1, PIP2 and PIP3 bound to recombinant human ABCB5 as well as murine Abcb5, with absent binding detection in Abcb5 knockout mouse tissue. Binding of PIP2 and PIP3 to ABCB5 was hereby more efficient than that of PIP1 to ABCB5. These data confirmed ABCB5 binding to PIP2 and PIP3, and also revealed the capacity of ABCB5 to PIP1, albeit with an apparently lesser affinity. Similar results were obtained using the murine ABCB5 mAb clone 3C2-1D12 (Frank NY et al. J Biol Chem. 2003) as a detection antibody.

Figure 2:
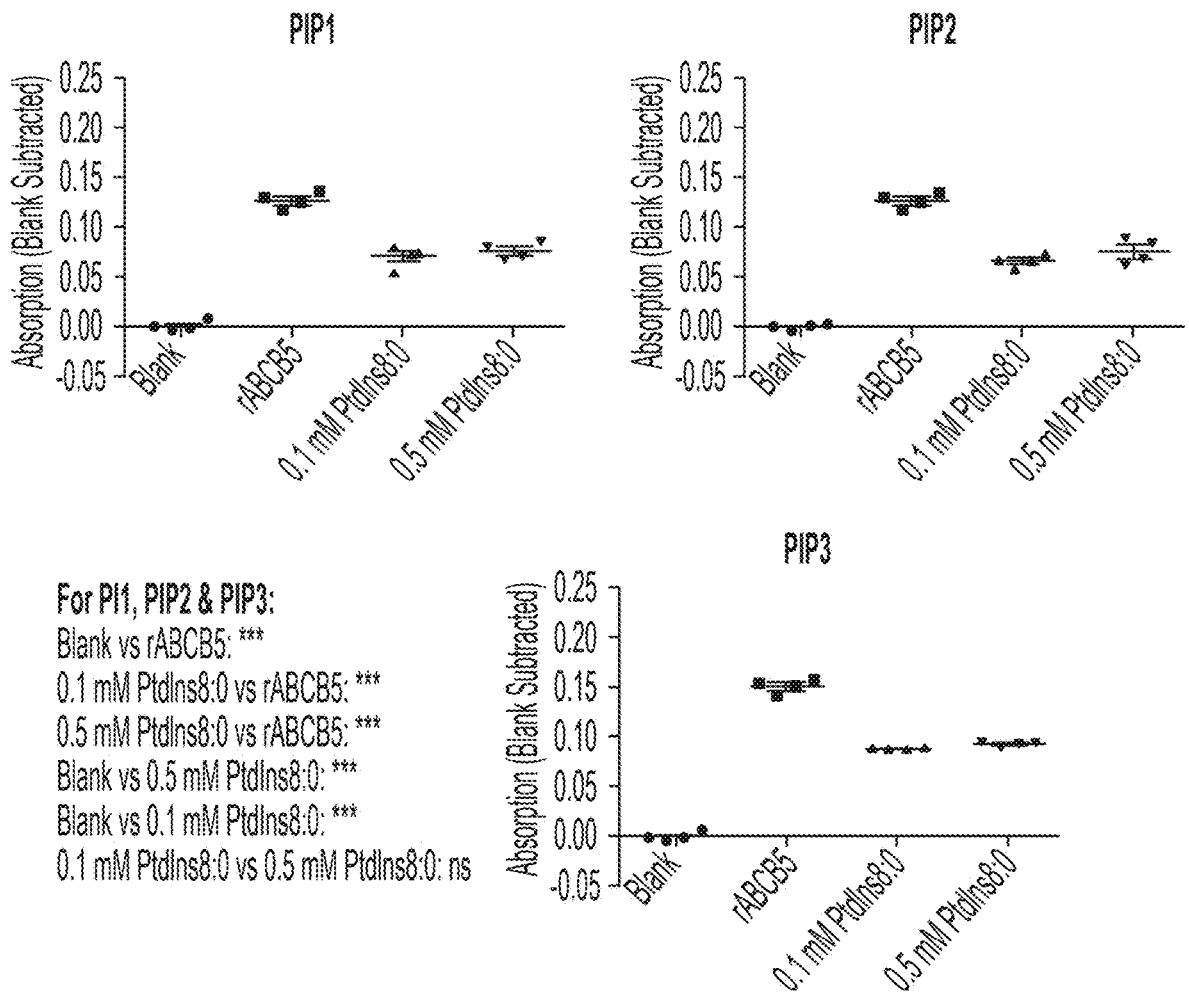
FIG. 2. Binding of PIP1, PIP2 and PIP3 to ABCB5 can be inhibited by a competitive pharmacological ligand. Data shows that PtdIns-(1,2-dioctanoyl) can competitively inhibit binding of PIP1, PIP2 or PIP3 to ABCB5, with apparent saturation of the effect at a concentration as low as 0.1 mM.
Figure 3:
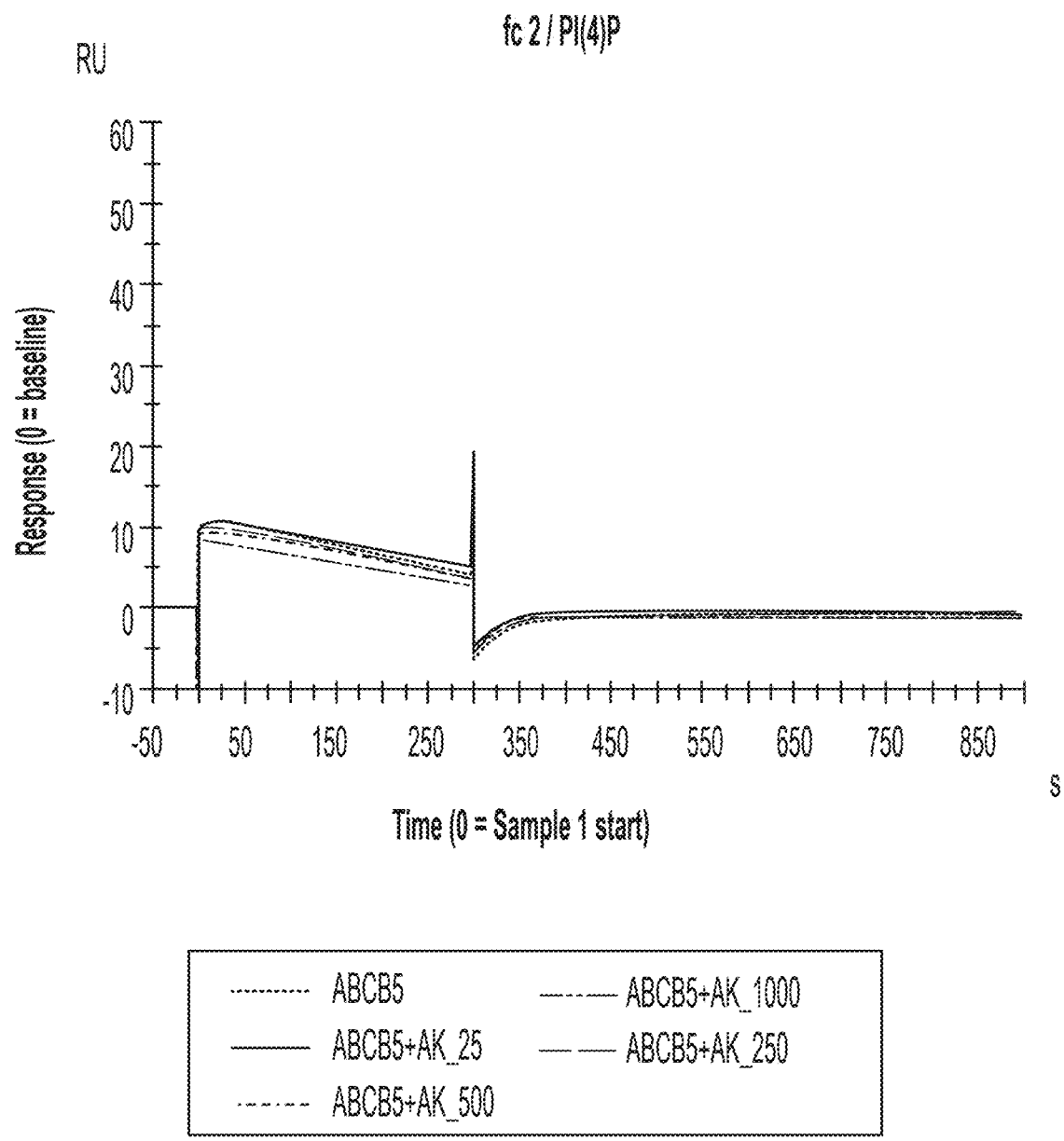
FIG. 3. ABCB5 monoclonal antibodies can block PIP1, PIP2 or PIP3 binding to ABCB5. Surface plasmon resonance (SPR) analysis demonstrated binding of PIP1, PIP2 and PIP3 to ABCB5. Competition with anti-ABCB5 monoclonal antibody resulted in signal reduction in a concentration-dependent manner on all three surfaces (PIP3>PIP2>PIP1), up to 50% on the PIP3 surface.
Figure 3:
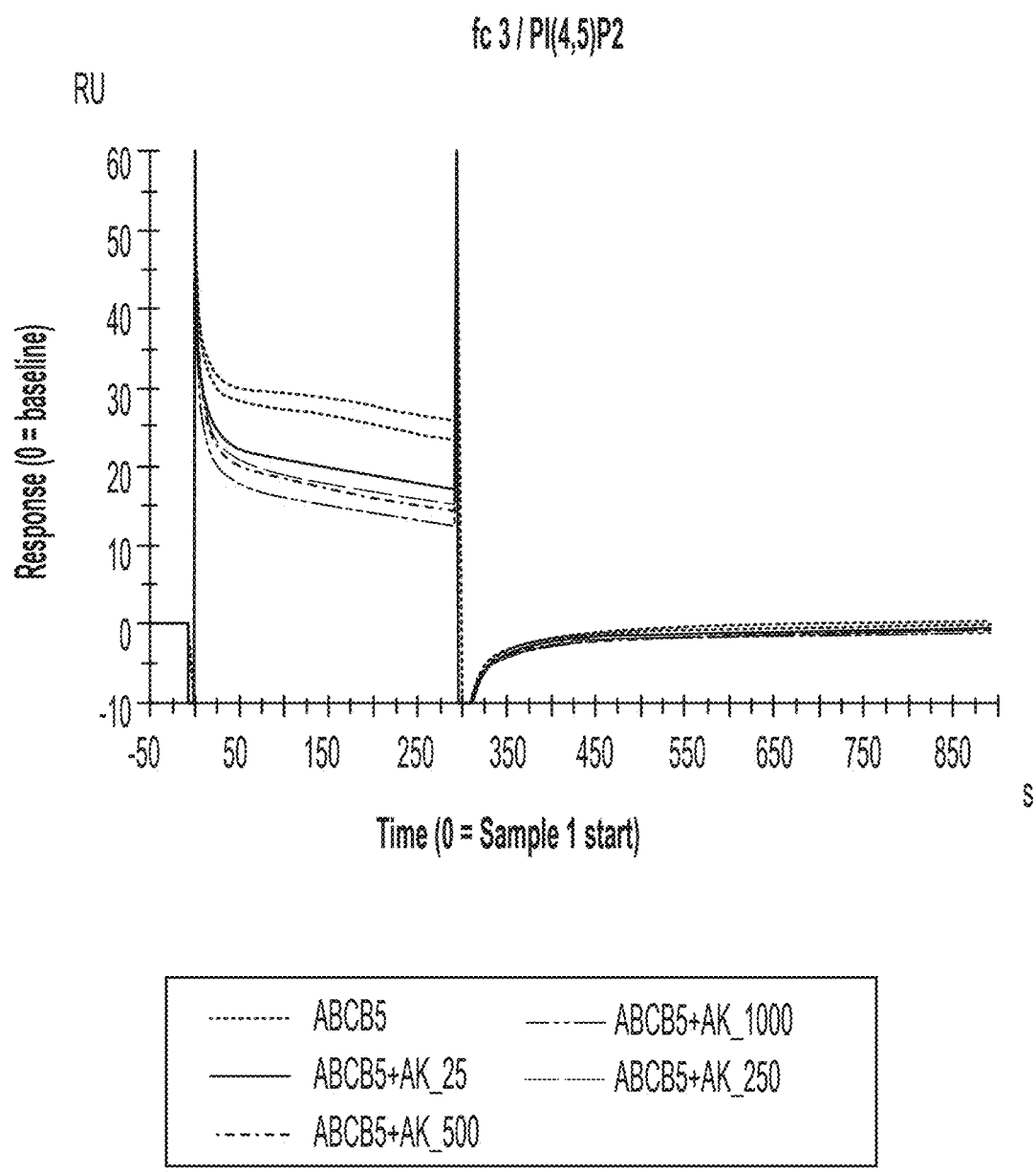
Figure 3:
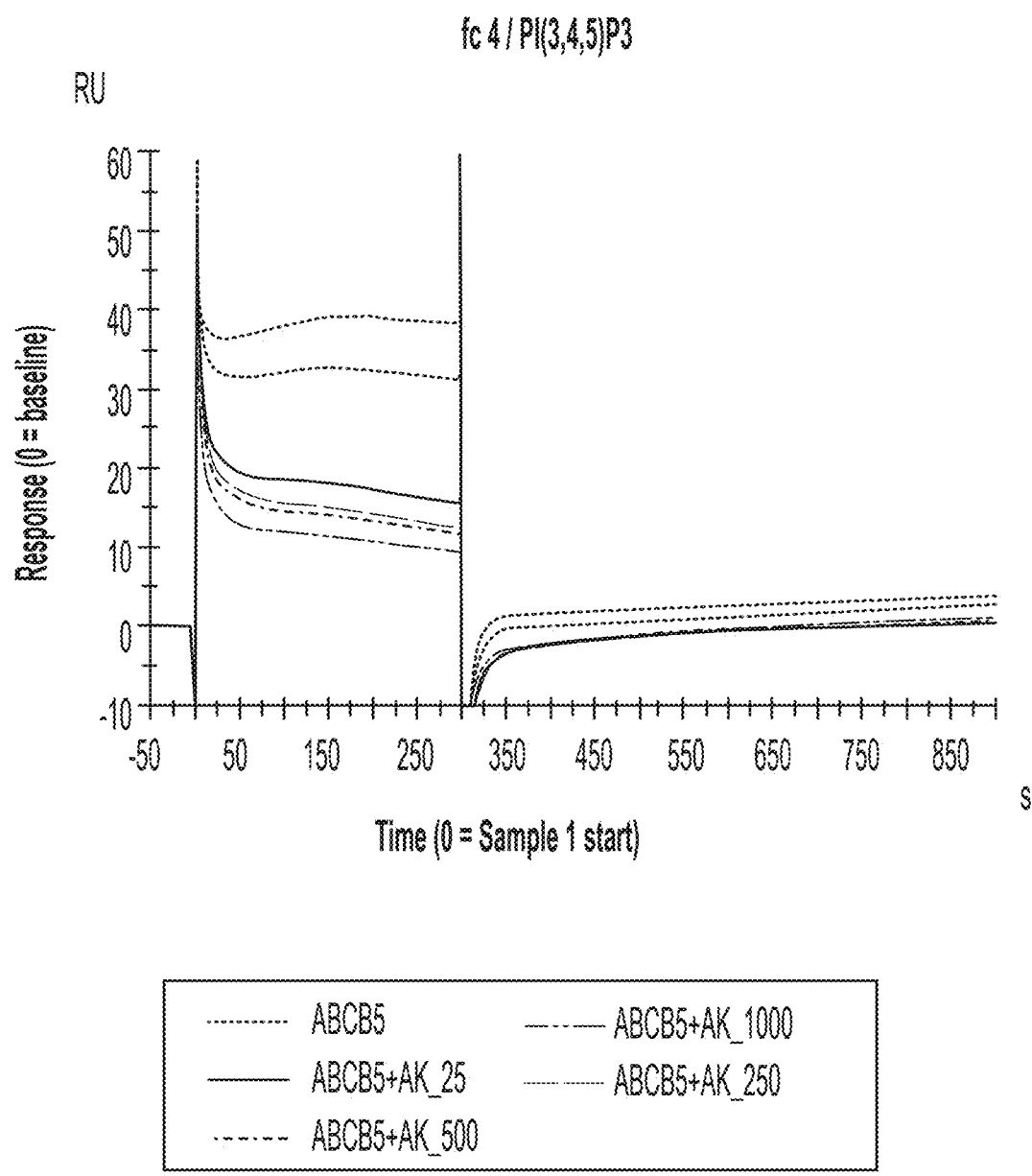

Example 4: Binding of PIP1, PIP2 and PIP3 to ABCB5 can be Inhibited by a Competitive Pharmacological Ligand ELISA plates coated with PIP1, PIP2 or PIP3 were incubated with purified recombinant human ABCB5 (P-glycoprotein ABCB5 [*Homo sapiens*] GenBank: AAO73470.1) for binding, in the absence or presence of increasing doses of PtdIns-(1,2-dioctanoyl), a synthetic analog of natural phosphatidylinositol (PtdIns) containing C8:0 fatty acids at the sn-1 and sn-2 positions (CAS Registry Number 899827-36-2). The data illustrated in FIG. 2 shows that this molecule can competitively inhibit binding of PIP1, PIP2 or PIP3 to ABCB5, with apparent saturation of the effect at a concentration as low as 0.1 mM.

These results provide proof-of-principle that PIP analogues (including PIP2 analogues and chemical PIP2 variants that are incapable of being phosphorylated to biologically active PIP3), or additional synthetic chemical or biological agents that compete with PIP1, PIP2 or PIP3 binding of ABCB5, but unlike PIP1, PIP2 or PIP3 are not functional in the signal transduction of diverse receptor tyrosine kinases (listed in Table below) or various G Protein-coupled receptors, can be employed as therapeutic drugs to modulate ABCB5/PIP1, ABCB5/PIP2 or ABCB5/PIP3 receptor/ligand interactions that are relevant to PIP-dependent signal transduction mechanisms of such receptors in various disease states in which ABCB5 is functional, in particular, but not limited to, human cancer initiation and progression.

| | |
|---|---|
| Type I RTKs: ErbB (EGF) receptor family | EGFR (epidermal growth factor receptor) |
| | HER2 (erb-b2 receptor tyrosine kinase 2) |
| | HER3 (erb-b2 receptor tyrosine kinase 3) |
| | HER4 (erb-b2 receptor tyrosine kinase 4) |
| Type II RTKs: Insulin receptor family | InsR (Insulin receptor) |
| | IGF1R (Insulin-like growth factor I receptor) |
| | IRR (Insulin receptor-related receptor) |

| | |
|---|---|
| Type III RTKs: PDGFR, CSFR, Kit, FLT3 receptor family | PDGFRα (platelet derived growth factor receptor alpha) |
| | PDGFRβ (platelet derived growth factor receptor beta) |
| | Kit (KIT proto-oncogene receptor tyrosine kinase) |
| | CSFR (colony stimulating factor 1 receptor) |
| | FLT3 (fms related tyrosine kinase 3) |
| Type IV RTKs: VEGF (vascular endothelial growth factor) receptor family | VEGFR-1 (fms related tyrosine kinase 1) |
| | VEGFR-2 (kinase insert domain receptor) |
| | VEGFR-3 (fms related tyrosine kinase 4) |
| Type V RTKs: FGF (fibroblast growth factor) receptor family | FGFR1 (fibroblast growth factor receptor 1) |
| | FGFR2 (fibroblast growth factor receptor 2) |
| | FGFR3 (fibroblast growth factor receptor 3) |
| | FGFR4 (fibroblast growth factor receptor 4) |
| Type VI RTKs: PTK7/CCK4 | CCK4 (protein tyrosine kinase 7 (inactive) |
| Type VII RTKs: Neurotrophin receptor/Trk family | trkA (neurotrophic receptor tyrosine kinase 1) |
| | trkB (neurotrophic receptor tyrosine kinase 2) |
| | trkC (neurotrophic receptor tyrosine kinase 3) |
| Type VIII RTKs: ROR family | ROR1 (receptor tyrosine kinase like orphan receptor 1) |
| | ROR2 (receptor tyrosine kinase like orphan receptor 2) |
| Type IX RTKs: MuSK | MuSK (muscle associated receptor tyrosine kinase) |
| Type X RTKs: HGF (hepatocyte growth factor) receptor family | MET (MET proto-oncogene, receptor tyrosine kinase) |
| | Ron (macrophage stimulating 1 receptor) |
| Type XI RTKs: TAM (TYRO3-, AXL- and MER-TK) | Axl (AXL receptor tyrosine kinase) |
| | Tyro3 (TYRO3 protein tyrosine kinase) |
| | Mer (MER proto-oncogene, tyrosine kinase) |
| Type XII RTKs: TIE family of angiopoietin receptors | TIE1 (tyrosine kinase with immunoglobulin like and EGF like domains 1) |
| | TIE2 (TEK receptor tyrosine kinase) |
| Type XIII RTKs: Ephrin receptor family | EphA1 (EPH receptor A1) |
| | EphA2 (EPH receptor A2) |
| | EphA3 (EPH receptor A3) |
| | EphA4 (EPH receptor A4) |
| | EphA5 (EPH receptor A5) |
| | EphA6 (EPH receptor A6) |
| | EphA7 (EPH receptor A7) |
| | EphA8 (EPH receptor A8) |
| | EphA10 (EPH receptor A10) |
| | EphB1 (EPH receptor B1) |
| | EphB2 (EPH receptor B2) |
| | EphB3 (EPH receptor B3) |
| | EphB4 (EPH receptor B4) |
| | EphB6 (EPH receptor B6) |
| Type XIV RTKs: RET | Ret (ret proto-oncogene) |
| Type XV RTKs: RYK | RYK (receptor-like tyrosine kinase) |
| Type XVI RTKs: DDR (collagen receptor) family | DDR1 (discoidin domain receptor tyrosine kinase 1) |
| | DDR2 (discoidin domain receptor tyrosine kinase 2) |
| Type XVII RTKs: ROS receptors | ROS (c-ros oncogene 1, receptor tyrosine kinase) |
| Type XVIII RTKs: LMR family | Lmr1 (apoptosis associated tyrosine kinase) |
| | Lmr2 (lemur tyrosine kinase 2) |
| | Lmr3 (lemur tyrosine kinase 3) |
| Type XIX RTKs: Leukocyte tyrosine kinase (LTK) receptor family | LTK (leukocyte receptor tyrosine kinase) |
| | ALK (ALK receptor tyrosine kinase) |
| Type XX RTKs: STYK1 | STYK1 (serine/threonine/tyrosine kinase 1) |

Example 5: Binding of PIP1, PIP2 and PIP3 to ABCB5 can be Inhibited by ABCB5 Monoclonal Antibodies Surface plasmon resonance (SPR) analysis also demonstrated binding of PIP1, PIP2 and PIP3 to ABCB5. Competition with anti-ABCB5 monoclonal antibody resulted in signal reduction in a concentration-dependent manner on all three surfaces (PIP3>PIP2>PIP1), up to 50% on the PIP3 surface (see FIG. 3). Isotype control monoclonal antibodies showed no significant effects (not illustrated). These results demonstrate that ABCB5 monoclonal antibodies can block PIP1, PIP2 or PIP3 binding to ABCB5.

Example 6: ABCB5 is Required for More Efficient PIP2 Conversion to PIP3

Figure 4:
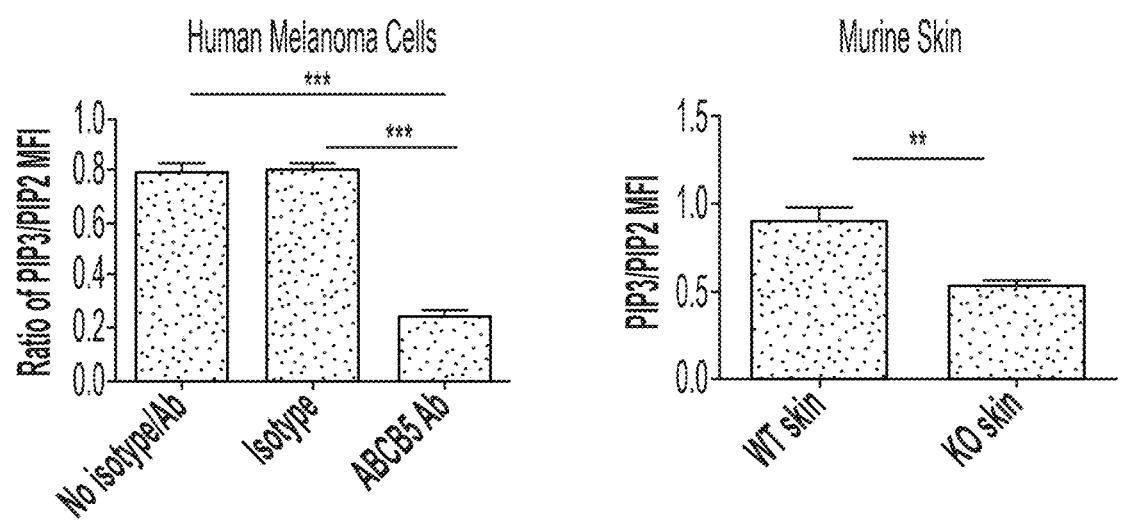
FIG. 4. ABCB5 is functionally required for more efficient PIP2 conversion to PIP3. ABCB5 monoclonal antibody, but not isotype control antibody, significantly lowered the PIP3/PIP2 ratio in human melanoma cells (left panel). Moreover, examination of murine ABCB5 knockout skin tissue also revealed the presence significantly decreased PIP3/PIP2 ratios compared to ABCB5 wildtype skin (right panel).

Functional experiments involving ABCB5 blockade using ABCB5 monoclonal antibodies in human melanoma cells, or ABCB5 functional ablation in ABCB5 knockout mouse-derived tissues, revealed that ABCB5 is functionally required for more efficient PIP2 conversion to PIP3, likely through its function as a PIP2 docking receptor. As is illustrated in FIG. 4, ABCB5 monoclonal antibody, but not isotype control antibody, significantly lowered the PIP3/PIP2 ratio in human melanoma cells (left). Moreover, examination of murine ABCB5 knockout skin tissue also revealed the presence of significantly decreased PIP3/PIP2 ratios compared to ABCB5 wildtype skin (right).

Along with the findings from the SPR analyses, which show that ABCB5 monoclonal antibodies can block ABCB5/PIP2 receptor/ligand interactions, these results show that ABCB5/PIP2 binding interactions are functionally required for more efficient PIP2 phosphorylation to PIP3, implicating a critical role for ABCB5 in PIP2-dependent signal transduction for receptor tyrosine kinase and G protein coupled receptor signaling in ABCB5-expressing cells, which comprise cancer stem cells involved in tumor formation, cancer progression and therapeutic resistance in diverse malignancies, including melanoma, colorectal cancer, glioblastoma multiforme, Merkel cell carcinoma, SCCs and hepatocellular carcinomas, amongst others. Moreover, physiological tissue-specific stem cells, including skin, ocular and intestinal stem cells express ABCB5 at high levels and depend on receptor tyrosine kinase and G protein coupled receptor signaling to execute their tissue-regenerative functions. Thus, the current discovery provides for a means to block ABCB5-dependent PIP2 binding and phosphorylation to PIP3 in receptor tyrosine kinase signaling, or processing to IP3 and DAG in G protein coupled receptor signaling, by either ABCB5 monoclonal antibodies or small molecule/chemical inhibitors of ABCB5/PIP2 binding, resulting in inhibition of cancer initiation/progression/therapeutic resistance-associated receptor tyrosine kinase signaling (e.g. AXL (see Guo et al. J Biol Chem. 2018), EGFR), or inhibition of G protein coupled receptor signaling-dependent mechanisms of cancer initiation/progression/therapeutic resistance. Moreover, enhancement of ABCB5/PIP2 binding interactions, for example through ABCB5 expression/binding augmentation or by exogenous PIP2 addition, would enhance biological stem cell function to treat stem cell deficiency-associated disorders.

Figure 5:
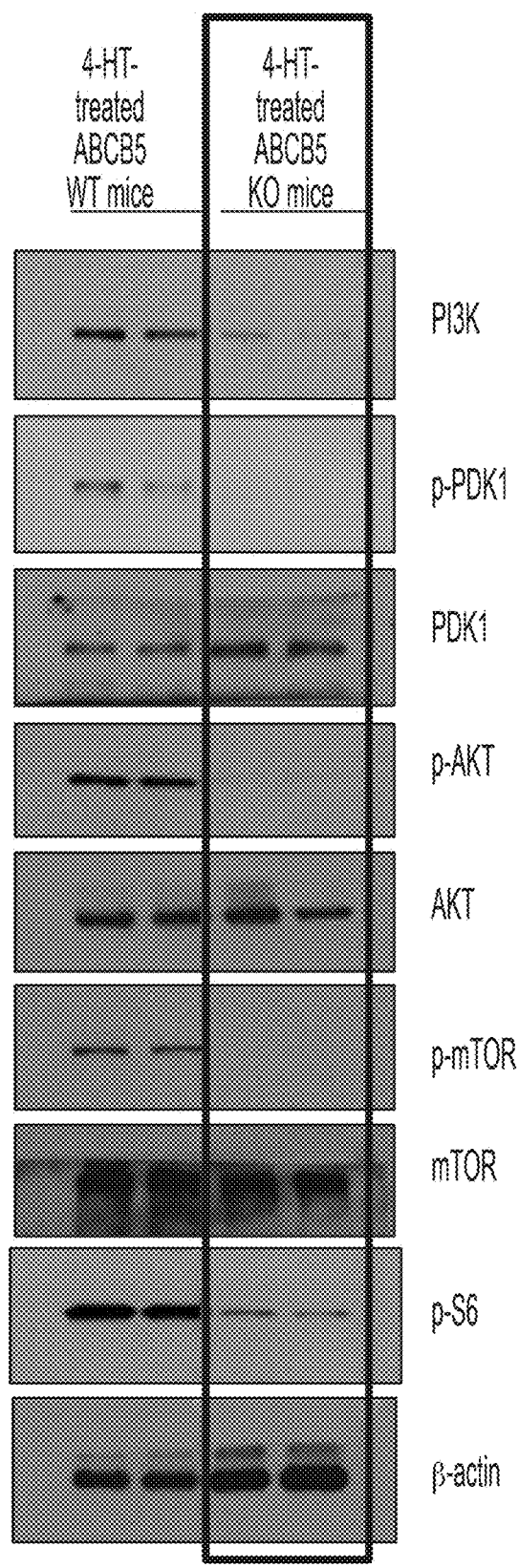
FIG. 5. ABCB5 is required to maintain the PIP2/PIP3-dependent PI3K/AKT signaling axis in malignant tumors and ABCB5 inhibition results in inhibition of the PI3K/AKT signaling axis and dependent tumor growth and therapeutic resistance. Analysis of an 4-HT treatment-inducible Tyr::CreER; BrafCA; Ptenlox/lox genetic mouse melanoma model on an ABCB5 WT or ABCB5 KO background revealed significant inhibition of the PI3K/AKT signaling axis in ABCB5 KO vs. ABCB5 WT tumors, with attenuated p-AKT, p-mTOR and p-S6 expression, amongst additional dysregulated molecules.

Example 7: ABCB5 is Required to Maintain the PIP2/PIP3-Dependent PI3K/AKT Signaling Axis in Malignant Tumors and ABCB5 Inhibition Results in Inhibition of the PI3K/AKT Signaling Axis and Dependent Tumor Growth and Therapeutic Resistance Analysis of an 4-HT treatment-inducible Tyr::CreER; BrafCA; Ptenlox/lox genetic mouse melanoma model on an ABCB5 WT or ABCB5 KO background revealed significant inhibition of the PI3K/AKT signaling axis in ABCB5 KO vs. ABCB5 WT tumors, with attenuated p-AKT, p-mTOR and p-S6 expression, amongst additional dysregulated molecules (see FIG. 5).

Figure 6:
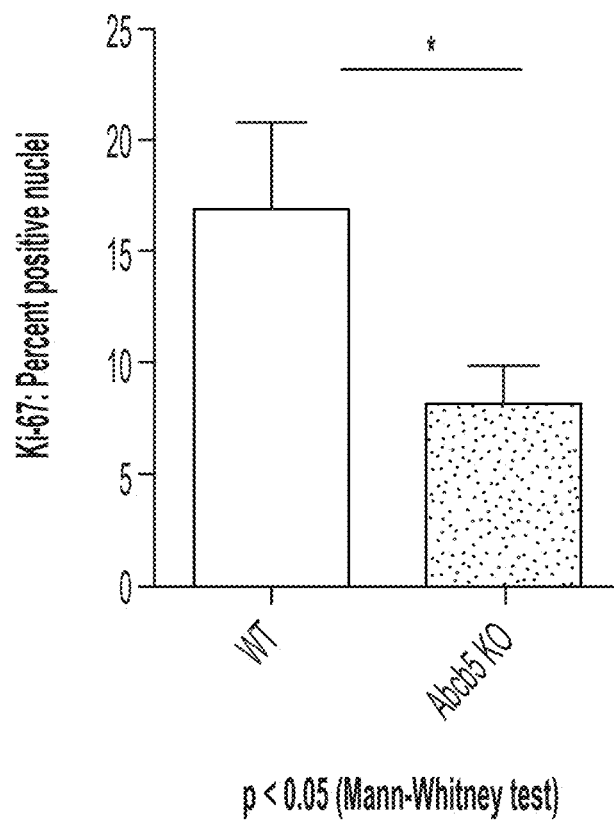
FIG. 6. ABCB5 KO status vs. ABCB5 WT status resulted in decreased tumor cell proliferation, as determined by determining the percentages of tumor cells staining positively for Ki-67, a proliferation marker.
Figure 7A:
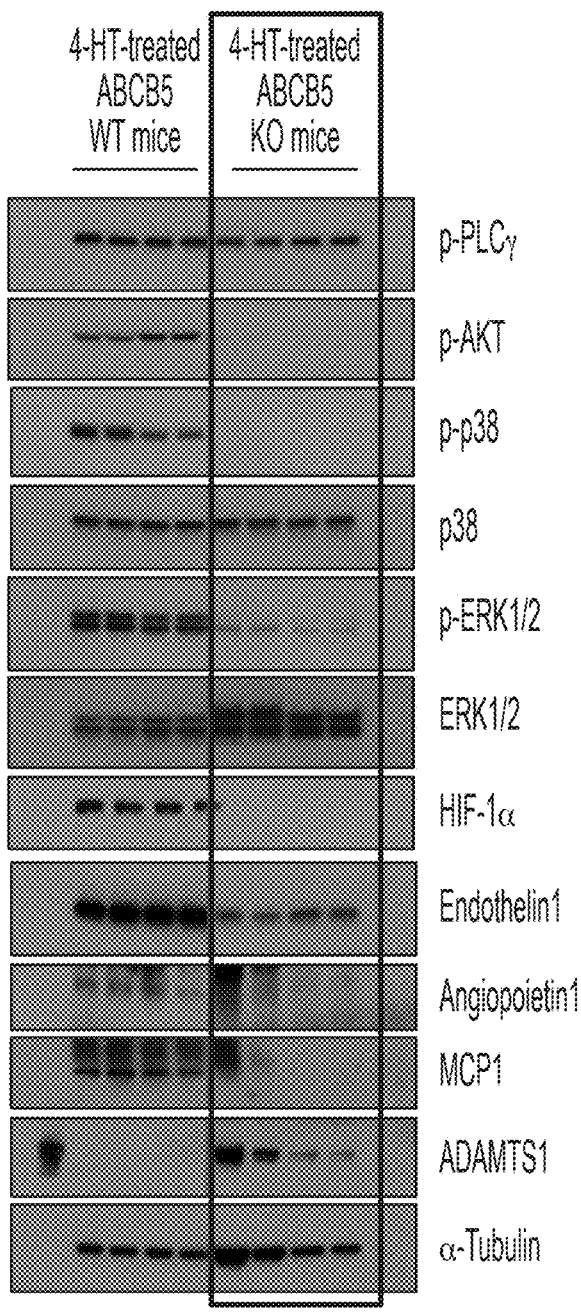
FIG. 7A-7B. ABCB5 KO status vs. ABCB5 WT status resulted in down-regulation of pro-angiogenic molecules (FIG. 7A, left panel), as well as, as a result, decreased CD31-positive microvessel density (FIG. 7A, right panel, and FIG. 7B).
Figure 7B:
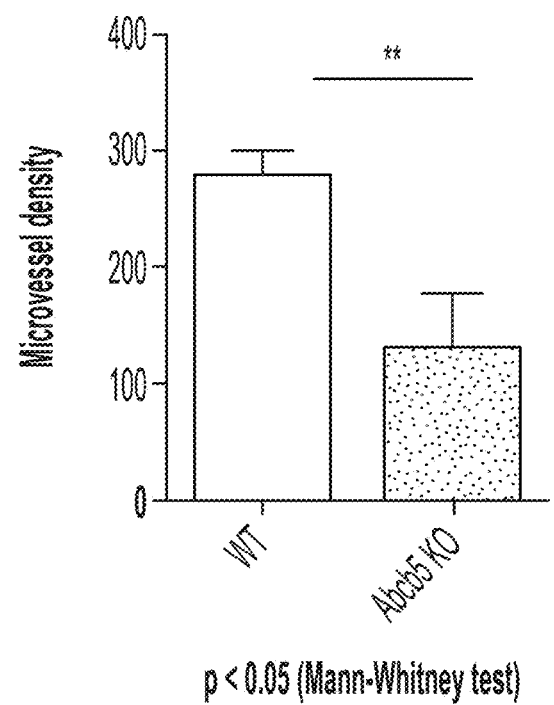

Furthermore, in this model, ABCB5 KO status vs. ABCB5 WT status resulted in decreased tumor cell proliferation, as determined by determining the percentages of tumor cells staining positively for Ki-67, a proliferation marker (see FIG. 6):

Additionally, in this model, ABCB5 KO status vs. ABCB5 WT status resulted in down-regulation of pro-angiogenic molecules (see FIG. 7, left panel), as well as, as a result, decreased CD31-positive microvessel density (see FIG. 7, right panels).

Particular ABCB5 monoclonal antibodies were also shown to disrupt the PIP2/PIP3-dependent PI3K/pAKT signaling axis in colorectal cancer (see Guo et al. J Biol. Chem 2018) with inhibited pAKT/AKT ratios as a result of treatment, and similar results have been obtained when examining ABCB5 monoclonal antibody effects on human melanoma cells, with significantly inhibited pAKT/AKT ratios as a result of treatment with those ABCB5 antibodies that also inhibit PIP2/PIP3 binding to ABCB5 and/or PIP2 to PIP3 conversion. These data show that ABCB5 functional blockade disrupts the PIP2/PIP3-dependent PI3K/pAKT signaling axis important for tumor growth and tumor angiogenesis, providing clear evidence for the anti-cancer therapeutic utility of functional blockade of ABCB5/PIP2/PIP3 receptor/ligand interactions.

Figure 9:
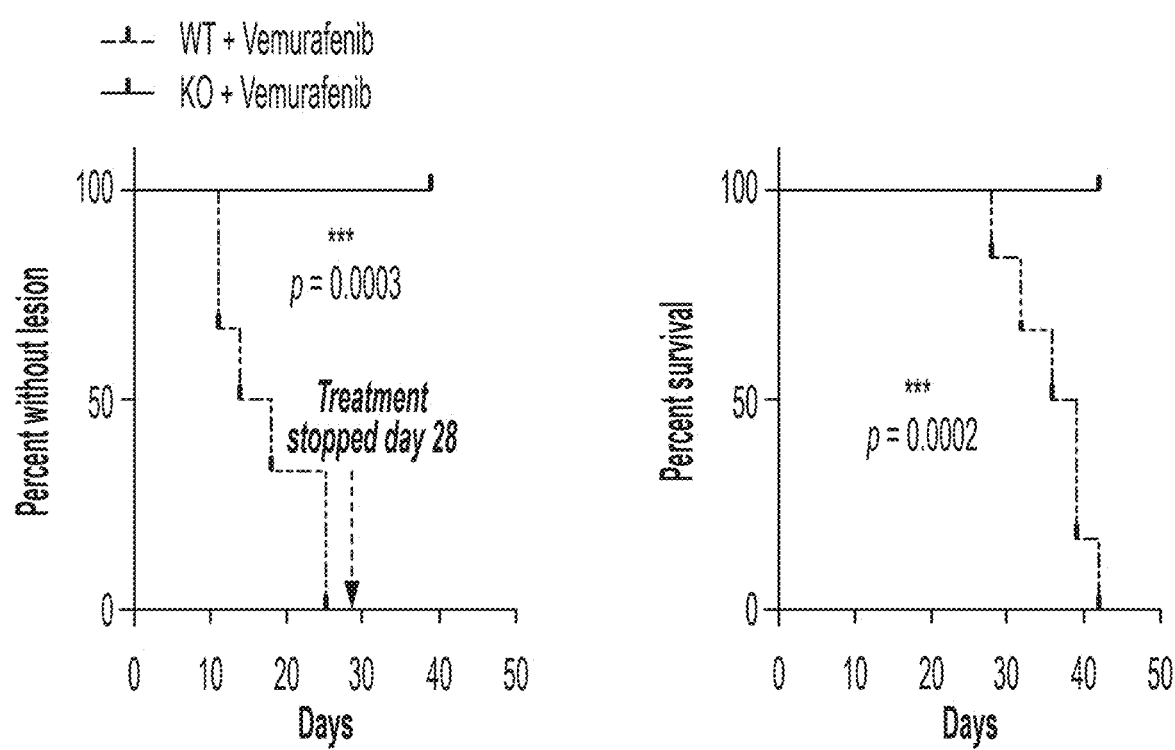
FIG. 9. ABCB5 plays critical role in tumor vemurafenib resistance, through its function in maintaining an intact PIP2/PIP3-dependent PI3K/pAKT signaling axis required for vemurafenib resistance. 4-HT treatment-inducible Tyr:: CreER; BrafCA; Ptenlox/lox genetic mouse melanoma model on an ABCB5 WT or ABCB5 KO background, ABCB5 KO status vs. ABCB5 WT status resulted in full sensitization to the effects of the BRAF inhibitor vemurafenib, resistance to which is driven in part by a functional PI3K/pAKT signaling axis. No tumor formation was observed upon genetic induction in vemurafenib-treated ABCB5 KO mice as opposed to ABCB5 WT mice that exhibited 100% formation of vemurafenib-resistant tumors (left panel), and survival was significantly extended in ABCB5 KO mice vs. ABCB5 WT mice (right panel).

Moreover, in the 4-HT treatment-inducible Tyr::CreER; BrafCA; Ptenlox/lox genetic mouse melanoma model on an ABCB5 WT or ABCB5 KO background, ABCB5 KO status vs. ABCB5 WT status resulted in full sensitization to the effects of the BRAF inhibitor vemurafenib, resistance to which is driven in part by a functional PI3K/pAKT signaling axis. No tumor formation was observed upon genetic induction in vemurafenib-treated ABCB5 KO mice as opposed to ABCB5 WT mice that exhibited 100% formation of vemurafenib-resistant tumors (see FIG. 9, left panel), and survival was significantly extended in ABCB5 KO mice vs. ABCB5 WT mice (see FIG. 9, right panel). These results reveal a critical role of ABCB5 in tumor vemurafenib resistance, through its function in maintaining an intact PIP2/PIP3-dependent PI3K/pAKT signaling axis required for vemurafenib resistance. These results also show that ABCB5 functional inhibition can be therapeutically employed to reverse melanoma BRAF inhibitor resistance.

Example 8: Identification of a Novel PIP2 Structure Accumulated in ABCB5 Knockout Tissue Identifies a Preferred Physiological Substrate for ABCB5-Dependent Phosphorylation to its PIP3 Form Quantitative lipid mass spectrometry analysis of skin tissue derived from ABCB5 wildtype (WT) or ABCB5 knockout (KO mice, detected a novel PIP2 form (PIP2 (6:0/18:0) @ 29.568051, i.e. PIP2 (6:0/18:0)-H, total fatty acid chain of 24:0, insaturation 0, Formula $C_{33}H_{65}O_{19}P_3$) specifically present in ABCB5 knockout tissue but not detectable at the detection threshold in ABCB5 wildtype skin (ABCB5 KO average: 7.79E+04+/−1.67E+04; WT average: not detected), indicating that this newly discovered PIP2 molecular variant not previously known in compound databases represents a preferred physiological substrate for ABCB5-dependent phosphorylation to its PIP3 form, i.e. the biologically active phosphorylated PIP3 form involved in ABCB5-dependent receptor tyrosine kinase or G protein coupled receptor signal transduction. A bioinformatically generated structural model of this novel PIP2 (6:0/18:0)-H molecule (total fatty acid chain of 24:0, insaturation 0, Formula $C_{33}H_{65}O_{19}P_3$) is illustrated.

Figure 10:
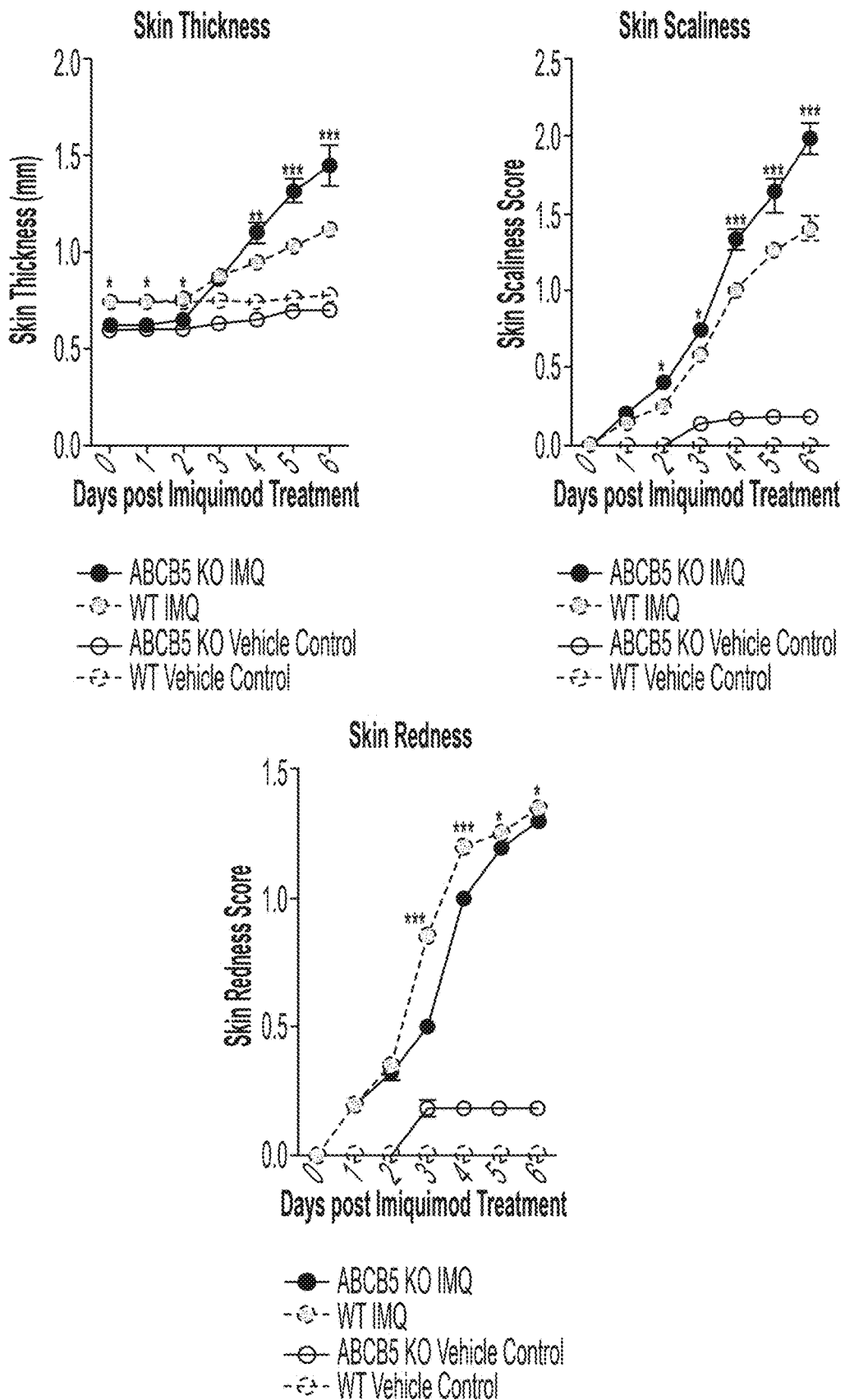
FIG. 10. Psoriasis was found to be exacerbated in a mouse model of imiquimod-induced psoriasis in ABCB5 knockout compared to ABCB5 wild-type mice.

This new PIP2 (6:0/18:0)-H molecule, or its phosphorylated form PIP3 (6:0/18:0)-H (Formula $C_{33}H_{65}O_{19}P_4$), represent compositions that can be used as therapeutic agents to enhance signaling by the various receptor tyrosine kinases or G Protein-coupled receptors listed above in those disease conditions where their signal transduction is impaired or where ABCB5 function or levels of ABCB5 expression are diminished, particularly in diseases associated with ABCB5+ stem cell deficits, such as deficient cutaneous wound healing, limbal stem cell deficiency, defective tissue regeneration in aging, and additional ABCB5 deficiency disorders such as, for example, psoriasis, which was found to be exacerbated in a mouse model of imiquimod-induced psoriasis in ABCB5 knockout compared to ABCB5 wild-type mice (see FIG. 10).

Example 9: Functional Dissection of ABCB5 Single Nucleotide Polymorphisms Reveal molecularABCB5 Ligand/Substrate Binding Sites Implicated in Downstream Molecular Effector Functions The structure of ABCB5 isoform 1 (1257 aa, NCBI Reference Sequence: NP_001157413.1) consists of two transmembrane domains (TMDs) with 6 transmembrane (TM) helices each, i.e. it comprises altogether 12 transmembrane helices (TMs 1-12). ABCB5 isoform 2 (812 aa, NCBI Reference Sequence: NP_848654.3) consists of one TMD with 6 transmembrane (TM) helices (TMs 1-6). TMs 1-6 of ABCB5 isoform 2 correspond to TMs 7-12 of ABCB5 isoform 1. TM12 of ABCB5 isoform 1, corresponding to TM6 of ABCB5 isoform 2. A non-synonymous single nucleotide polymorphism (SNP) in the coding region of ABCB5 (rs6461515), providing for AA 970 E>K in TM12 of ABCB5 isoform 1 and corresponding to AA 525 E>K in TM6 of ABCB5 isoform 2, was revealed herein to be critically required for ABCB5 function. The annotated reference E SNP (Glutamic acid/E/GAA) is hereby conserved across various species, including *Mus musculus*. However, the reference E SNP (Glutamic acid/E/GAA) represents actually the minor codon in *Homo sapiens*. Population diversity data show that the E525-encoding allele (Glutamic Acid, G genotype, codon GAA) is found at highest frequency in African populations, with G/G homozygosity being rare, as opposed to the K525-encoding allele (Lysine, A genotype, codon AAA) (data not shown).

Figure 11:
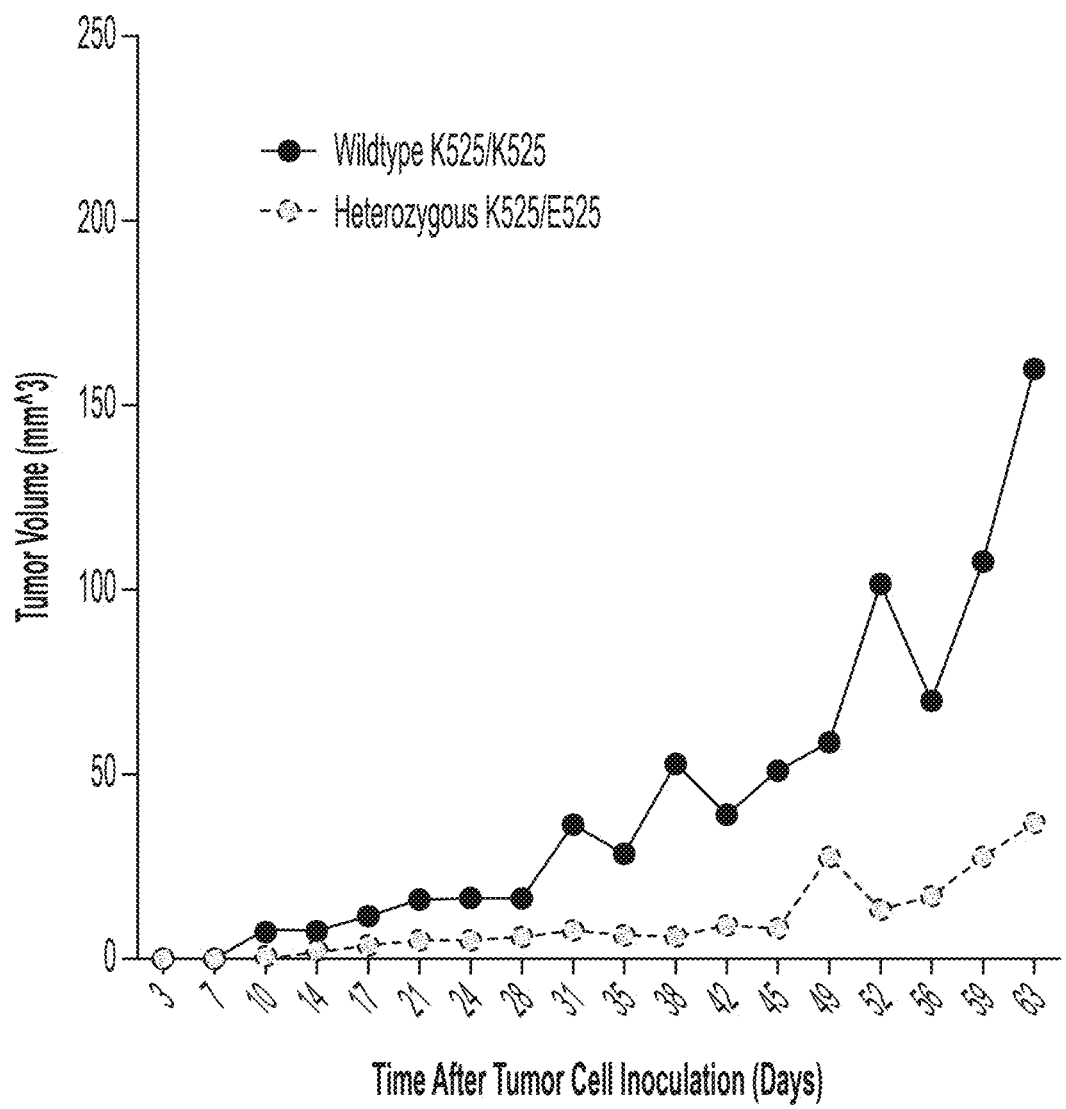
FIG. 11. Amino acid residue 525 of TM6 of ABCB5 isoform 2 as an important molecular switch in the quality of physiological ligand/substrate binding of ABCB5. The molecular switch from K (Lysine, codon AAA) to E (Glutamic Acid, codon GAA), was experimentally induced in one allele through Crispr/Cas9-mediated gene editing in at baseline exclusively ABCB5 isoform 2-expressing wildtype K525/K525 human melanoma cells, resulted in clonal heterozygous ABCB5 K525/E525 melanoma cell variants with impaired ABCB5 signaling function and resultant significantly inhibited ABCB5-driven tumor growth (P<0.05).

Human cancers express most frequently the K SNP (Lysine, codon AAA) according to the analysis. Importantly, the molecular switch from K (Lysine, codon AAA) to E (Glutamic Acid, codon GAA), experimentally induced in one allele through Crispr/Cas9-mediated gene editing in at baseline exclusively ABCB5 isoform 2-expressing wildtype K525/K525 human melanoma cells, resulted in clonal heterozygous ABCB5 K525/E525 melanoma cell variants with impaired ABCB5 signaling function and resultant significantly inhibited ABCB5-driven tumor growth (P<0.05) (see FIG. 11).

These results implicate amino acid residue 525 of TM6 of ABCB5 isoform 2 as an important molecular switch in the quality of physiological ligand/substrate binding of ABCB5, particularly of PIP2 and its phosphorylation product PIP3 that are known to transmit extracellular RTK-mediated signals to activate the downstream PI3K/pAKT signaling pathway essential for tumor formation and progression, with K525 (rs6461515) representing the more functional variant. Correspondingly, residue 970 in TM12 of ABCB5 isoform 1 is also implicated in physiological ligand/substrate binding of ABCB5. The two variant peptide sequences of ABCB5 isoform 2 are listed below along with their encoding RNA sequences (variant residues highlighted red), with the K525-containing molecule being the higher functional variant with regards to PIP substrate/ligand binding and downstream signaling function compared to the reference E525-containing molecule (SNP rs6461515):

```
ABCB5 isoform 2-E525 protein sequence (SEQ ID NO: 1):
MVDENDIRALNVRHYRDHIGVVSQEPVLFGTTISNNIKYGRDDVTDEEMERAAREANAYDF

IMEFPNKFNTLVGEKGAQMSGGQKQRIAIARALVRNPKILILDEATSALDSESKSAVQAALE

KASKGRTTIVVAHRLSTIRSADLIVTLKDGMLAEKGAHAELMAKRGLYYSLVMSQDIKKAD

EQMESMTYSTERKTNSLPLHSVKSIKSDFIDKAEESTQSKEISLPEVSLLKILKLNKPEWPFVV

LGTLASVLNGTVHPVFSIIFAKIITMFGNNDKTTLKHDAEIYSMIFVILGVICFVSYFMQGLFY

GRAGEILTMRLRHLAFKAMLYQDIAWFDEKENSTGGLTTILAIDIAQIQGATGSRIGVLTQN

ATNMGLSVIISFIYGWEMTFLILSIAPVLAVTGMIETAAMTGFANKDKQELKHAGKIATEALE

NIRTIVSLTREKAFEQMYEEMLQTQHRNTSKKAQIIGSCYAFSHAFIYPAYAAGFRFGAYLIQ

AGRMTPEGMFIVFTAIAYGAMAIGETLVLAPEYSKAKSGAAHLFALLEKKPNIDSRSQEGKK

PDTCEGNLEFREVSFFYPCRPDVFILRGLSLSIERGKTVAFVGSSGCGKSTSVQLLQRLYDPV

QGQVLFDGVDAKELNVQWLRSQIAIVPQEPVLFNCSIAENIAYGDNSRVVPLDEIKEAANAA

NIHSFIEGLPEKYNTQVGLKGAQLSGGQKQRLAIARALLQKPKILLLDEATSALDNDSEKVV

QHALDKARTGRTCLVVTHRLSAIQNADLIVVLHNGKI

KEQGTHQELLRNRDIYFKLVNAQSVQ

ABCB5 isoform 2-E525-encoding RNA sequence (SEQ ID NO: 2):
   1 attgcttctc ggccttttgg ctaagatcaa gtgtaatctg tgttctttt tatttggtca 61 tatcttccat tctttcttac ctaattcctc taatatctct ctgtgagcct aaaccaataa 121 ttatatatta cattctattg tctttcttat ataactgcag aaagataaat atcactttgt 181 ttgttcctgt aggttttctt tagtgtaatc catagcagtt attgcattgg agcagcagtc 241 cctcactttg aaaccttcgc aatagcccga ggagctgcct ttcatatttt ccaggttatt 301 gataagaaac ccagtataga taacttttcc acagctggat ataaacctga atccatagaa 361 ggaactgtgg aatttaaaaa tgtttctttc aattatccat caagaccatc tatcaagatt 421 ctgaaaggtc tgaatctcag aattaagtct ggagagacag tcgccttggt cggtctcaat 481 ggcagtggga agagtacggt agtccagctt ctgcagaggt tatatgatcc ggatgatggc 541 tttatcatgg tggatgagaa tgacatcaga gctttaaatg tgcggcatta tcgagaccat 601 attggagtgg ttagtcaaga gcctgttttg ttcgggacca ccatcagtaa caatatcaag 661 tatggacgag atgatgtgac tgatgaagag atggagagag cagcaaggga agcaaatgcg
```

-continued

```
 721 tatgatttta tcatggagtt tcctaataaa tttaatacat tggtagggga aaaaggagct
 781 caaatgagtg gagggcagaa acagaggatc gcaattgctc gtgccttagt tcgaaacccc
 841 aagattctga ttttagatga ggctacgtct gccctggatt cagaaagcaa gtcagctgtt
 901 caagctgcac tggagaaggc gagcaaaggt cggactacaa tcgtggtagc acaccgactt
 961 tctactattc gaagtgcaga tttgattgtg accctaaagg atggaatgct ggcggagaaa
1021 ggagcacatg ctgaactaat ggcaaaacga ggtctatatt attcacttgt gatgtcacag
1081 gatattaaaa aagctgatga acagatggag tcaatgacat attctactga agaaagacc
1141 aactcacttc ctctgcactc tgtgaagagc atcaagtcag acttcattga caaggctgag
1201 gaatccaccc aatctaaaga gataagtctt cctgaagtct ctctattaaa aattttaaag
1261 ttaaacaagc ctgaatggcc ttttgtggtt ctggggacat tggcttctgt tctaaatgga
1321 actgttcatc cagtattttc catcatcttt gcaaaaatta taaccatgtt tggaaataat
1381 gataaaacca cattaaagca tgatgcagaa atttattcca tgatattcgt cattttgggt
1441 gttatttgct ttgtcagtta tttcatgcag ggattatttt acggcagagc aggggaaatt
1501 ttaacgatga gattaagaca cttggccttc aaagccatgt tatatcagga tattgcctgg
1561 tttgatgaaa aggaaaacag cacaggaggc ttgacaacaa tattagccat agatatagca
1621 caaattcaag gagcaacagg ttccaggatt ggcgtcttaa cacaaaatgc aactaacatg
1681 ggactttcag ttatcatttc ctttatatat ggatgggaga tgacattcct gattctgagt
1741 attgctccag tacttgccgt gacaggaatg attgaaaccg cagcaatgac tggatttgcc
1801 aacaaagata agcaagaact taagcatgct ggaaagatag caactgaagc tttggagaat
1861 atacgtacta tagtgtcatt aacaagggaa aaagccttcg agcaaatgta tgaagagatg
1921 cttcagactc aacacagaaa tacctcgaag aaagcacaga ttattggaag ctgttatgca
1981 ttcagccatg cctttatata ttttgcctat geggcagggt ttcgatttgg agcctattta
2041 attcaagctg gacgaatgac cccagagggc atgttcatag tttttactgc aattgcatat
2101 ggagctatgg ccatcggaga aacgctcgtt ttggctcctg aatattccaa agccaaatcg
2161 ggggctgcgc atctgtttgc cttgttggaa aagaaaccaa atatagacag ccgcagtcaa
2221 gaagggaaaa agccagacac atgtgaaggg aatttagagt ttcgagaagt ctctttcttc
2281 tatccatgtc gcccagatgt tttcatcctc cgtggcttat ccctcagtat tgagcgagga
2341 aagacagtag catttgtggg gagcagcggc tgtgggaaaa gcacttctgt tcaacttctg
2401 cagagacttt atgaccccgt gcaaggacaa gtgctgtttg atggtgtgga tgcaaaagaa
2461 ttgaatgtac agtggctccg ttcccaaata gcaatcgttc ctcaagagcc tgtgctcttc
2521 aactgcagca ttgctgagaa catcgcctat ggtgacaaca gccgtgtggt gccattagat
2581 gagatcaaag aagccgcaaa tgcagcaaat atccattctt ttattgaagg tctccctgag
2641 aaatacaaca cacaagttgg actgaaagga gcacagcttt ctggcggcca gaaacaaaga
2701 ctagctattg caagggctct tctccaaaaa cccaaaattt tattgttgga tgaggccact
2761 tcagccctcg ataatgacag tgagaaggtg gttcagcatg cccttgataa agccaggacg
2821 ggaaggacat gcctagtggt cactcacagg ctctctgcaa ttcagaacgc agatttgata
2881 gtggttctgc acaatggaaa gataaaggaa caaggaactc atcaagagct cctgagaaat
2941 cgagacatat atttaagtt agtgaatgca cagtcagtgc agtgatgctg ttgaggtagc
3001 acatattttg atgttcgtgt aatgcaaaga aggagtacta ataaattact tggcaagctt
3061 tgatctcttt tattgcatat atcaataccct agaatcatgc tactcaagta catacatgtt
```

```
3121 ctattcacac accatctgac cttcagattt ttaaaaggaa gcaaaatttt gcttatttca 3181 tgtaagtgaa ataatgctta tatccttcac tttataaaac tattctagca catttgcttg 3241 taaagcagtt ttctacaagg tgaatttatt tcccatcaac ttctgctata aaatcggaaa 3301 tatgttttcca gggggaatat tatccaatta accatgttga aggttttagc aaaggcagtg 3361 taagatagag tggggcctgt agcattgcag ggagagtgtc tttcacttgg aatttttgttt 3421 tgcagcacat attacagtag ttttgctagt cccttttctc cagaccgtag ggatttctct 3481 caataagtat tcactatttc tctaaatttt attctatttt tttgttgagc agggaataga 3541 aaggattacg atgtaaaatt tctggggagga ttaggtagct atctcctact tcaccagtaa 3601 gtgaagtgcc tcacatgagc catcccaaag attcattatt ccaaaccttg ggtttggcag 3661 tataagtcac aggcctacct gtttatgaaa acttacttac ttaaaataag agctactttt 3721 gggccgggtg cggtggctca cgcctgtaat cccagaactt tgggaggccg aggagggcgg 3781 atcacttgag gtcaggagtt cgagaccage ctggccaaca tggtgaaacc ccgtctctac 3841 taaaaacaca aaaattagcc aatcttggtg gcgggcacct ggaatcccag ctacttggga 3901 ggctgaggca ggagaatcat ttgaacctag gaggcagagg ttgcagtgag ccgagatctc 3961 accactgcac tccagcctgc gcaacagagc gagactccat ctcaaaaaat aataaataag 4021 agctaattt attgtgggtg aaaatttta aacgtctttc tctataataa aataatttcc 4081 ttaaatttta tatatacttt atcatatata atgtgtgaat gatttaaag ttctgtgtaa 4141 ataacaatat tggtaaaatg agttacattt tcaacttact taaatatgta atgtcacctg 4201 gtgattttat cttattcttt cagtgtattt tcttccattt acacatttag ctagcctccc 4261 taaagtgtac tctaccaata attgaaatct tgttaaacaa aattaaaacc atttatatat 4321 tatgctgctt tctttaaaat gcaaaataaa aataagattg gggacttgag aatca
```

ABCB5 isoform 2-K525 protein sequence (SEQ ID NO: 3):
MVDENDIRALNVRHYRDHIGVVSQEPVLFGTTISNNIKYGRDDVTDEEMERAAREANAYDF

IMEFPNKFNTLVGEKGAQMSGGQKQRIAIARALVRNPKILILDEATSALDSESKSAVQAALE

KASKGRTTIVVAHRLSTIRSADLIVTLKDGMLAEKGAHAELMAKRGLYYSLVMSQDIKKAD

EQMESMTYSTERKTNSLPLHSVKSIKSDFIDKAEESTQSKEISLPEVSLLKILKLNKPEWPFVV

LGTLASVLNGTVHPVFSIIFAKIITMFGNNDKTTLKHDAEIYSMIFVILGVICFVSYFMQGLFY

GRAGEILTMRLRHLAFKAMLYQDIAWFDEKENSTGGLTTILAIDIAQIQGATGSRIGVLTQN

ATNMGLSVIISFIYGWEMTFLILSIAPVLAVTGMIETAAMTGFANKDKQELKHAGKIATEALE

NIRTIVSLTREKAFEQMYEEMLQTQHRNTSKKAQIIGSCYAFSHAFIYFAYAAGFRFGAYLIQ

AGRMTPEGMFIVFTAIAYGAMAIGKTLVLAPEYSKAKSGAAHLFALLEKKPNIDSRSQEGKK

PDTCEGNLEFREVSFFYPCRPDVFILRGLSLSIERGKTVAFVGSSGCGKSTSVQLLQRLYDPV

QGQVLFDGVDAKELNVQWLRSQIAIVPQEPVLFNCSIAENIAYGDNSRVVPLDEIKEAANAA

NIHSFIEGLPEKYNTQVGLKGAQLSGGQKQRLAIARALLQKPKILLLDEATSALDNDSEKVV

QHALDKARTGRTCLVVTHRLSAIQNADLIVVLHNGKI

KEQGTHQELLRNRDIYFKLVNAQSVQ

ABCB5 isoform 2-K525-encoding RNA sequence (SEQ ID NO: 4):
```
  1 attgcttctc ggccttttgg ctaagatcaa gtgtaatctg tgttcttttt tatttggtca 61 tatcttccat tctttcttac ctaattcctc taatatctct ctgtgagcct aaaccaataa 121 ttatatatta cattctattg tctttcttat ataactgcag aaagataaat atcactttgt 181 ttgttcctgt aggttttctt tagtgtaatc catagcagtt attgcattgg agcagcagtc 241 cctcactttg aaaccttcgc aatagcccga ggagctgcct ttcatatttt ccaggttatt
```

-continued

```
 301 gataagaaac ccagtataga taacttttcc acagctggat ataaacctga atccatagaa
 361 ggaactgtgg aatttaaaaa tgtttctttc aattatccat caagaccatc tatcaagatt
 421 ctgaaaggtc tgaatctcag aattaagtct ggagagacag tcgccttggt cggtctcaat
 481 ggcagtggga agagtacggt agtccagctt ctgcagaggt tatatgatcc ggatgatggc
 541 tttatcatgg tggatgagaa tgacatcaga gctttaaatg tgcggcatta tcgagaccat
 601 attggagtgg ttagtcaaga gcctgttttg ttcgggacca ccatcagtaa caatatcaag
 661 tatggacgag atgatgtgac tgatgaagag atggagagag cagcaaggga agcaaatgcg
 721 tatgatttta tcatggagtt tcctaataaa tttaatacat tggtagggga aaaaggagct
 781 caaatgagtg gagggcagaa acagaggatc gcaattgctc gtgccttagt tcgaaacccc
 841 aagattctga ttttagatga ggctacgtct gccctggatt cagaaagcaa gtcagctgtt
 901 caagctgcac tggagaaggc gagcaaaggt cggactacaa tcgtggtagc acaccgactt
 961 tctactattc gaagtgcaga tttgattgtg accctaaagg atggaatgct ggcggagaaa
1021 ggagcacatg ctgaactaat ggcaaaacga ggtctatatt attcacttgt gatgtcacag
1081 gatattaaaa aagctgatga acagatggag tcaatgacat attctactga agaaagacc
1141 aactcacttc ctctgcactc tgtgaagagc atcaagtcag acttcattga caaggctgag
1201 gaatccaccc aatctaaaga gataagtctt cctgaagtct ctctattaaa aattttaaag
1261 ttaaacaagc ctgaatggcc ttttgtggtt ctggggacat tggcttctgt tctaaatgga
1321 actgttcatc cagtattttc catcatcttt gcaaaaatta taaccatgtt tggaaataat
1381 gataaaacca cattaaagca tgatgcagaa atttattcca tgatattcgt cattttgggt
1441 gttatttgct tgtcagttta tttcatgcag ggattatttt acggcagagc aggggaaatt
1501 ttaacgatga gattaagaca cttggccttc aaagccatgt tatatcagga tattgcctgg
1561 tttgatgaaa aggaaaacag cacaggaggc ttgacaacaa tattagccat agatatagca
1621 caaattcaag gagcaacagg ttccaggatt ggcgtcttaa cacaaaatgc aactaacatg
1681 ggactttcag ttatcatttc ctttatatat ggatgggaga tgacattcct gattctgagt
1741 attgctccag tacttgccgt gacaggaatg attgaaaccg cagcaatgac tggatttgcc
1801 aacaaagata agcaagaact taagcatgct ggaaagatag caactgaagc tttggagaat
1861 atacgtacta tagtgtcatt aacaagggaa aaagccttcg agcaaatgta tgaagagatg
1921 cttcagactc aacacagaaa tacctcgaag aaagcacaga ttattggaag ctgttatgca
1981 ttcagccatg cctttatata ttttgcctat gcggcagggt ttcgatttgg agcctattta
2041 attcaagctg gacgaatgac cccagagggc atgttcatag tttttactgc aattgcatat
2101 ggagctatgg ccatcggaaa aacgctcgtt ttggctcctg aatattccaa agccaaatcg
2161 ggggctgcgc atctgtttgc cttgttggaa aagaaaccaa atatagacag ccgcagtcaa
2221 gaagggaaaa agccagacac atgtgaaggg aatttagagt ttcgagaagt ctctttcttc
2281 tatccatgtc gcccagatgt tttcatcctc cgtggcttat ccctcagtat tgagcgagga
2341 aagacagtag catttgtggg gagcagcggc tgtgggaaaa gcacttctgt tcaacttctg
2401 cagagacttt atgaccccgt gcaaggacaa gtgctgtttg atggtgtgga tgcaaaagaa
2461 ttgaatgtac agtggctccg ttcccaaata gcaatcgttc ctcaagagcc tgtgctcttc
2521 aactgcagca ttgctgagaa catcgcctat ggtgacaaca gccgtgtggt gccattagat
2581 gagatcaaag aagccgcaaa tgcagcaaat atccattctt ttattgaagg tctccctgag
2641 aaatacaaca cacaagttgg actgaaagga gcacagcttt ctggcggcca gaaacaaaga
```

```
-continued
2701 ctagctattg caagggctct tctccaaaaa cccaaaattt tattgttgga tgaggccact 2761 tcagccctcg ataatgacag tgagaaggtg gttcagcatg cccttgataa agccaggacg 2821 ggaaggacat gcctagtggt cactcacagg ctctctgcaa ttcagaacgc agatttgata 2881 gtggttctgc acaatggaaa gataaaggaa caaggaactc atcaagagct cctgagaaat 2941 cgagacatat attttaagtt agtgaatgca cagtcagtgc agtgatgctg ttgaggtagc 3001 acatattttg atgttcgtgt aatgcaaaga aggagtactt aataattact tggcaagctt 3061 tgatctcttt tattgcatat atcaatacct agaatcatgc tactcaagta catacatgtt 3121 ctattcacac accatctgac cttcagattt ttaaaaggaa gcaaaaattt gcttatttca 3181 tgtaagtgaa ataatgctta tatccttcac tttataaaac tattctagca catttgcttg 3241 taaagcagtt ttctacaagg tgaatttatt tcccatcaac ttctgctata aaatcggaaa 3301 tatgtttcca gggggaatat tatccaatta accatgttga aggttttagc aaaggcagtg 3361 taagatagag tggggcctgt agcattgcag ggagagtgtc tttcacttgg aattttgttt 3421 tgcagcacat attacagtag ttttgctagt ccctttctc cagaccgtag ggatttctct 3481 caataagtat tcactatttc tctaaatttt attctatttt tttgttgagc agggaataga 3541 aaggattacg atgtaaaatt tctgggagga ttaggtagct atctcctact tcaccagtaa 3601 gtgaagtgcc tcacatgagc catcccaaag attcattatt ccaaaccttg ggtttggcag 3661 tataagtcac aggcctacct gtttatgaaa acttacttac ttaaaataag agctactttt 3721 gggccgggtg cggtggctca cgcctgtaat cccagaactt tgggaggccg aggagggcgg 3781 atcacttgag gtcaggagtt cgagaccagc ctggccaaca tggtgaaacc ccgtctctac 3841 taaaaacaca aaaattagcc aatcttggtg gcgggcacct ggaatcccag ctacttggga 3901 ggctgaggca ggagaatcat ttgaacctag gaggcagagg ttgcagtgag ccgagatctc 3961 accactgcac tccagcctgc gcaacagage gagactccat ctcaaaaaat aataaataag 4021 agctaatttt attgtgggtg aaaattttta aacgtettte tctataataa aataatttcc 4081 ttaaatttta tatatacttt atcatatata atgtgtgaat gatttttaaag ttctgtgtaa 4141 ataacaatat tggtaaaatg agttacattt tcaacttact taaatatgta atgtcacctg 4201 gtgattttat ctttattctt cagtgtattt tcttccattt acacatttag ctagcctccc 4261 taaagtgtac tctaccaata attgaaatct tgttaaacaa aattaaaacc atttatatat 4321 tatgctgctt tctttaaaat gcaaaataaa aataagattg gggacttgag aatca
```

Additional residues involved in ABCB5 substrate binding based on bioinformatic analysis considerations are N702 and H706 in TM7 of ABCB5 isoform 1 corresponding to N257 and H261 in TM1 of ABCB5 isoform 2, as well as 857 A>T (rs80123476) in TM10 of ABCB5 isoform 1 corresponding to 412 A>T (rs80123476) in TM4 of ABCB5 isoform 2.

Additionally, the results to date have established that a subset of (Antibodies binding a 3-dimensional (i.e. circular form) of the extracellular loop), but not all, ABCB5-specific monoclonal antibodies are capable of inhibiting PIP1, PIP2 or PIP3 binding to ABCB5 and therefore ABCB5-mediated PIP-dependent signal transduction and pAKT phosphorylation. Therefore, ABCB5 monoclonal antibodies shown to inhibit the herein demonstrated ABCB5-dependent PIP1, PIP2 or PIP3 binding and PIP-dependent signal transduction and pAKT phosphorylation constitute novel compositions that are uniquely useful, for example, to therapeutically inhibit ABCB5-driven human cancer growth and progression through functional ABCB5 blockade and resultant inhibition of ABCB5-dependent receptor tyrosine kinase and G Protein coupled receptor signal transduction.

Example 10: Molecular Docking Modeling

Using bioinformatics approaches and structural data available for the ABCB5-homologous ABCB 1 protein, model 3D structures were created for both the ABCB5 isoform 2-K525 and ABCB5 isoform 2-E525 polypeptide sequences listed above. Additionally, 3D structures were created for the following ABCB5 ligands or competitive inhibitors, to facilitate molecular docking/binding modeling using the PyMOL software program package:

(a) PIP2 (6:0/18:0)-H, total fatty acid chain of 24:0, insaturation 0, Formula $C_{33}H_{65}O_{19}P_3$: This is a new PIP2 variant identified for the first time by mass spectrometry to be accumulated in ABCB5 KO mouse skin, indicating that this novel molecule may be a physiological substrate of ABCB5-dependent phosphorylation to PIP3, as described above. This molecule has not previously been known in compound databases (modeled structure shown above).

(b) PI (4,5) P2, diC8, Formula C25H49O19P3: This PIP2 variant was shown to bind to ABCB5 by SPR. It was obtained from Echelon Biosciences. Additional information on this molecule and its structure at CAS Registry Number (204858-53-7).

(c) Phosphatidylinositol C-8: PtdIns-(1,2-dioctanoyl) is a synthetic analog of natural phosphatidylinositol (PtdIns) containing C8:0 fatty acids at the sn-1 and sn-2 positions. It was shown, as described above, that this molecule can competitively inhibit PIP2 binding to ABCB5. More information on this molecule is as CAS Registry Number 899827-36-2.

The results revealed binding of all of the tested molecules, i.e. the natural ligand PIP2 (6:0/18:0)-H, PI (4,5) P2, diC8, and of the competitive inhibitor Phosphatidylinositol C-8, to either of the ABCB5 isoform 2-K525 or the ABCB5 isoform 2-E525 structures in close proximity of the determined AA525 substrate binding site and TM6 of the ABCB5 molecules. Additionally, the modeling results revealed higher affinity binding for PIP2 for ABCB5 isoform 2-K525, as opposed to ABCB5 isoform 2-E525. These data further support the experimental evidence of a critical role of the non-synonymous single nucleotide polymorphism (SNP) in the coding region of ABCB5 (rs6461515) that determines the AA 525 E vs. K residues in TM6 of ABCB5 isoform 2, which was revealed herein to be important for ABCB5 function, with ABCB5 isoform 2-K525 being the more functional ABCB5 variant with enhanced PIP2/PIP3 binding capacity and as a result improved signal transduction capacity.

All references cited herein are fully incorporated by reference. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A composition comprising a synthetic phospholipid, comprising a compound having the structure:

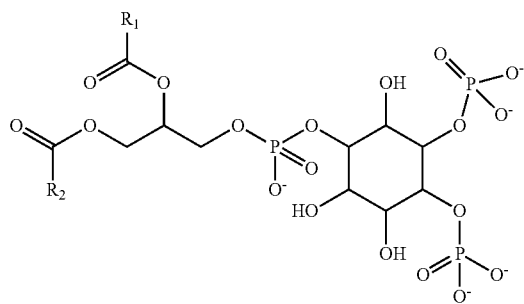

wherein the phospholipid comprises two fatty acids, wherein each of the fatty acids comprises a carboxyl linked to a carbon atom chain identified by $R_1$ and $R_2$ and wherein $R_1$ and $R_2$ independent of one another have a length defined by a number of carbon atoms acid chains; and wherein one of $R_1$ and $R_2$ has a length that is at least twice as long as the other of $R_1$ and $R_2$, and wherein the phospholipid has a formula: $C_{33}H_{65}Q_{19}P_3$.

2. The composition of claim 1, wherein the phospholipid comprises [PIP2 (6:0/18:0)-H]$^-$ and a pharmaceutically acceptable carrier.

3. A composition comprising a synthetic phospholipid, comprising a compound having the structure:

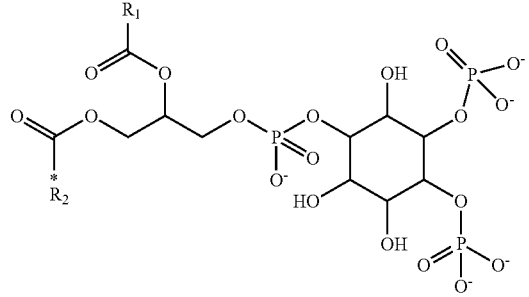

wherein the phospholipid comprises two fatty acids, wherein each of the fatty acids comprises a carboxyl linked to a carbon atom chain identified by $R_1$ and $R_2$ and wherein $R_1$ and $R_2$ independent of one another have a length defined by a number of carbon atoms acid chains; wherein one of $R_1$ and $R_2$ has a length that is at least twice as long as the other of $R_1$ and $R_2$, and wherein the composition enhances ABCB5-PIP2 pathway.

* * * * *